US012181565B2

United States Patent
Li et al.

(10) Patent No.: US 12,181,565 B2
(45) Date of Patent: Dec. 31, 2024

(54) AVIATION DETECT AND AVOID METHOD AND SYSTEM

(71) Applicant: SEAMATICA AEROSPACE LTD., St. John's (CA)

(72) Inventors: Yake Li, Ottawa (CA); Siu Donald O'Young, St. John's (CA); Maged E. Beshai, Maberly (CA)

(73) Assignee: SEAMATICA AEROSPACE LTD., St. John's (CA)

( * ) Notice: Subject to any disclaimer, the term of this patent is extended or adjusted under 35 U.S.C. 154(b) by 345 days.

(21) Appl. No.: 17/577,250

(22) Filed: Jan. 17, 2022

(65) Prior Publication Data

US 2022/0137206 A1 May 5, 2022

Related U.S. Application Data

(63) Continuation-in-part of application No. 16/276,053, filed on Feb. 14, 2019, now Pat. No. 11,226,410.
(Continued)

(51) Int. Cl.
*G01S 13/78* (2006.01)
*G01S 13/76* (2006.01)
*G01S 13/933* (2020.01)

(52) U.S. Cl.
CPC .......... *G01S 13/781* (2013.01); *G01S 13/762* (2013.01); *G01S 13/933* (2020.01)

(58) Field of Classification Search
CPC .... G01S 13/781; G01S 13/762; G01S 13/933; G01S 13/765; G01S 13/767; G01S 13/91;
(Continued)

(56) References Cited

U.S. PATENT DOCUMENTS 2,588,916 A   3/1952   Field
3,875,570 A   4/1975   Litchford
(Continued)

OTHER PUBLICATIONS

RTCA Paper No. 256-20/SC228-076, "Minimum Operational Performance Standards (MOPS) for Detect and Avoid (DAA) Systems", RTCA DO-365B, Prepared by SC-228 (Sep. 16, 2020), online: www.rtca.org.
(Continued)

*Primary Examiner* — Vladimir Magloire
*Assistant Examiner* — Michael W Justice
(74) *Attorney, Agent, or Firm* — IP-MEX Inc.; Victoria Donnelly

(57) ABSTRACT

A detect-and-avoid system for an ownship aircraft is disclosed. The system has a control station in communication with an ownship aircraft, and a Passive Secondary Surveillance Radar (PSSR) system at the ownship aircraft. The PSSR is equipped to receive a reply from a target object, in response to an interrogation signal of staggered P1 and P3 pulses sent by a narrow-beam antenna of a Secondary Surveillance Radar (SSR) to the target object, and also to receive P2 pulses transmitted by a wide-beam antenna of the SSR. A pulse repetition frequency (PRF) pattern for the staggered interrogation signal is determined, followed by estimating a transmit time of the interrogation signal, and determining a position of the target object. A corresponding detect-and-avoid method is also disclosed.

20 Claims, 31 Drawing Sheets

Related U.S. Application Data

(60) Provisional application No. 62/630,362, filed on Feb. 14, 2018.

(58) Field of Classification Search
CPC ............ G01S 13/913; G01S 2013/916; G08G 5/0013; G08G 5/0008; G08G 5/0078; G08G 5/0082
USPC .................... 342/32, 37, 455, 29, 30, 36, 39
See application file for complete search history.

(56) References Cited

U.S. PATENT DOCUMENTS

| | | | |
|---|---|---|---|
| 3,895,382 A | | 7/1975 | Litchford |
| 4,021,802 A | | 5/1977 | Litchford |
| 4,027,307 A | | 5/1977 | Litchford |
| RE29,260 E | * | 6/1977 | Litchford .............. G01S 13/781 342/147 |
| 4,060,805 A | | 11/1977 | McComas |
| 4,109,248 A | | 8/1978 | Knowles et al. |
| 4,115,771 A | | 9/1978 | Litchford |
| 4,128,839 A | | 12/1978 | McComas |
| 4,196,434 A | | 4/1980 | Funatsu |
| 4,293,857 A | | 10/1981 | Baldwin |
| 4,319,243 A | | 3/1982 | Vachenauer et al. |
| 4,418,349 A | | 11/1983 | Hofgen et al. |
| 4,486,755 A | | 12/1984 | Hulland |
| 4,642,648 A | | 2/1987 | Hulland |
| 4,782,450 A | * | 11/1988 | Flax ...................... G01S 13/933 342/32 |
| 4,910,526 A | | 3/1990 | Donnangelo et al. |
| 5,075,694 A | | 12/1991 | Donnangelo |
| 5,081,457 A | * | 1/1992 | Motisher ............... G01S 13/933 342/40 |
| 5,140,328 A | | 8/1992 | Litchford |
| 5,173,706 A | | 12/1992 | Urkowitz |
| 5,196,856 A | * | 3/1993 | Litchford ................ G01S 13/76 342/455 |
| 5,198,823 A | * | 3/1993 | Litchford .............. G01S 13/762 342/429 |
| 5,223,847 A | | 6/1993 | Minter |
| 5,239,310 A | | 8/1993 | Meyers |
| 5,506,590 A | | 4/1996 | Minter |
| 6,285,318 B1 | | 9/2001 | Schoen |
| 6,344,820 B1 | | 2/2002 | Shiomi et al. |
| 6,985,103 B2 | | 1/2006 | Ridderheim et al. |
| 7,006,032 B2 | * | 2/2006 | King ...................... G01S 3/023 342/29 |
| 7,570,194 B2 | | 8/2009 | Galati |
| 7,800,541 B2 | | 9/2010 | Moshfeghi |
| 9,218,741 B2 | | 12/2015 | Wu |
| 9,250,317 B1 | | 2/2016 | Wang |
| 9,291,699 B2 | | 3/2016 | Sadr et al. |
| 9,658,325 B2 | | 5/2017 | Harvey |
| 9,734,723 B1 | | 8/2017 | Bruno et al. |
| 9,881,506 B1 | | 1/2018 | Gentry |
| 10,339,819 B1 | | 7/2019 | Gentry |
| 10,743,141 B2 | | 8/2020 | Fairbanks et al. |
| 11,313,960 B2 | | 4/2022 | Yamanouchi |
| 2005/0156777 A1 | * | 7/2005 | King .................... G08G 5/0021 342/29 |
| 2008/0039988 A1 | | 2/2008 | Estabrook |
| 2013/0009823 A1 | | 1/2013 | Wang |
| 2013/0176163 A1 | | 7/2013 | Margolin |
| 2015/0331099 A1 | | 11/2015 | Wu |
| 2016/0025849 A1 | | 1/2016 | Wang |
| 2016/0033630 A1 | | 2/2016 | Harvey |
| 2018/0172797 A1 | | 6/2018 | Hauswald et al. |
| 2018/0204469 A1 | | 7/2018 | Moster |

OTHER PUBLICATIONS

Shiomi et al, "Development of Mobile Passive Secondary Surveillance Radar", ICAS 2012, 28th International Congress of the Aeronautical Sciences, pp. 1-6.

Shiomi et al, "Development of Passive Surveillance Radar", ICAS 2014, 29th Congress of the International Council of the Aeronautical Sciences, pp. 1-9.

DO-365 "Minimum Operational Performance Standards (MOPS) for Detect and Avoid (DAA) System", Appendix C, RTCA, May 31, 2017, pp. C1-C6.

"Minimum Operational Performance Standards for Air Traffic Control Radar Beacon System / Mode Select (ATCRBS / 4 Mode S) Airborne Equipment", RTCA, Inc., RTCA DO-181E, Washington, DC, Mar. 17, 2011.

* cited by examiner

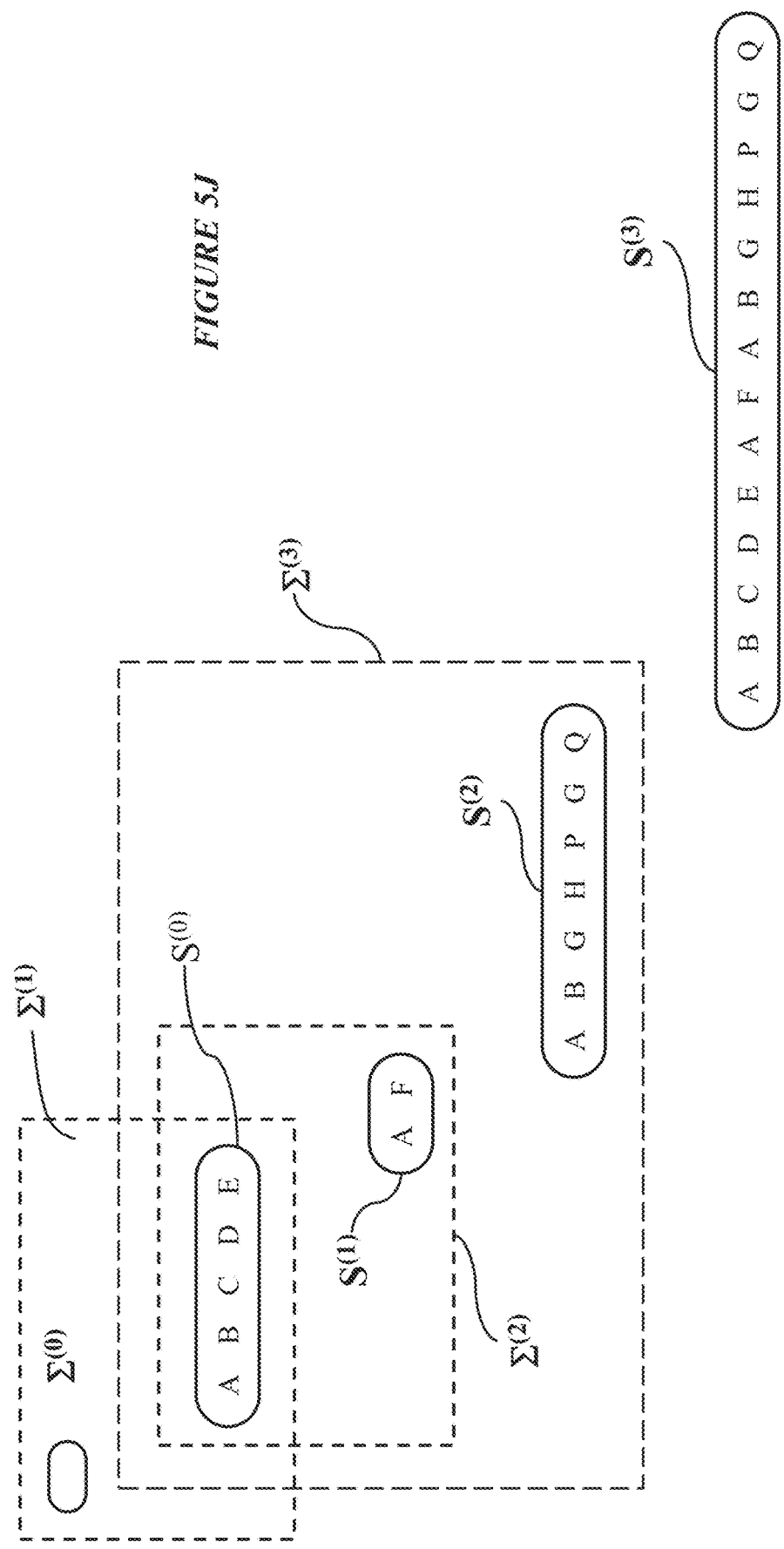

AVIATION DETECT AND AVOID METHOD AND SYSTEM

RELATED APPLICATIONS

This application is a continuation-in-part of U.S. application Ser. No. 16/276,053, filed on Feb. 14, 2019, titled "Method and system for tracking objects using passive secondary surveillance radar", which claims the benefit of the U.S. provisional patent application Ser. No. 62/630,362 filed on Feb. 14, 2018, the entire contents of which are incorporated herein by reference.

FIELD OF THE INVENTION

The present invention relates to tracking aerial, nautical or ground objects, and in particular to aviation detect and avoid method and system tracking objects in aviation systems using a passive secondary surveillance radar (PSSR).

BACKGROUND OF THE INVENTION

Secondary Surveillance Radar (SSR) systems have been used around the world in air traffic control applications to track positions of an aircraft in the sky and inform pilots in other aircraft accordingly. Precision and efficiency of such tracking systems are particularly crucial at and near the airports where a higher density of flying objects (small or large planes, helicopters, etc.) are present. As such, the SSR systems are often supplemented with other auxiliary systems. Such auxiliary system is a Passive Secondary Surveillance Radar (PSSR) system that operates as a slave system to the conventional master SSR system.

According to the aviation standards, such as the "Minimum Operational Performance Standards (MOPS) for Air Traffic Control Radar Beacon System (ATCRBS) Airborne Equipment" from Radio Technical Commission for Aeronautics (RTCA, Inc.), an air traffic control system comprises an SSR main rotating antenna transmitting narrow interrogation beams which is assisted with an omni-directional antenna transmitting a related signal. The air traffic control relies on transponders located in an aircraft to reply to interrogation beams to signal their identity as well as their altitude. The transponder reply signal is broadcast at another standard frequency (for example 1090 MHz). Every interrogation message is composed by three pulses, P1, P2 and P3 at a given standard frequency (for example 1030 MHz). P1 and P3 pulses can only be received when the aircraft is in the coverage of a main antenna beam (main lobe width of 2 to 3 degrees). Outside of the main lobe, P1 and P3 are weaker than the P2 pulse. This means that a target object, for example a target aircraft, can only receive valid interrogation, and then responds when it is in the main lobe of the main antenna beam. The P2 pulse, also referred to as Side Lobe Suppression (SLS) signal, is always synchronized with the P1 pulse and transmitted by the omni-directional antenna (hence referred to as omni signal) exactly 2 µs after the P1 pulse. The P3 pulse is used to determine whether the current message is a mode A or mode C interrogation by delaying with different time intervals (8 µs or 21 µs) from a corresponding P1 pulse. In a transponder, that an aircraft is obliged to have, if a received P2 is weaker than P1 by 9 dB, a response to the interrogation is sent; otherwise, the interrogation is ignored. The delay between a reception of the interrogation pulse and the transmission of the reply or response is exactly 3 µs for any transponder. Also, the interrogation time interval is large enough that a response to an interrogation will surely be received before the next interrogation is sent.

The prior art discloses a Passive Secondary Surveillance Radar (PSSR) system that operates as a slave system to a conventional master SSR system. The PSSR system, which comprises an omni-directional antenna and another antenna, is placed on the ground or on an airplane with known locations relative to the master SSR. The SSR interrogation signals are received at the PSSR station as well as at a target aircraft. The transponder's reply signal is also received by the PSSR station. The PSSR uses the received P1-P3 pulses or P2 pulses to derive the interrogation time of the SSR, and to further calculate the sum of distances from the aircraft to the SSR and from the aircraft to the PSSR by measuring the time it takes to receive a signal send to the aircraft plus the reply signal.

The SSR antenna and system have evolved for decades including hardware modifications to omni-directional antennas and various interrogation patterns, including staggered interrogation pattern.

To avoid ambiguity or interference in crowded air space, the SSR normally staggers the time intervals between successive interrogations in a fixed pattern. This is referenced as "staggered pattern" or "pulse repetition frequency (PRF) pattern" in the present application. The staggered pattern may differ for different SSR configurations and providers.

Therefore, there is a need to develop improved methods and SSR system that would work reliably for new hardware designs of omni-directional antennas and staggered interrogation patterns.

Also, accuracy of the time measurement is important for PSSR applications. Because a signal travels at the speed of light, so a relatively small error in time measurement could result in a large distance error. This would be extremely dangerous in a crowed air space. In this case, even a GPS based time measurement would not be sufficiently precise or reliable for collision avoidance.

When the target object is not equipped with a transponder which replies to an SSR interrogation, a method for detecting its existence and giving an estimate of its position need be developed, along with the detect and avoid aviation system.

A ground based PSSR system would receive a reduced signal strength because the SSR antenna is not designed to cover the ground area, and because ground structures can affect the strength of the interrogation signals. Moreover, a pilot of an aircraft will not be informed immediately after the target object is detected, increasing the chance of midair collision.

Therefore, there is a need in the industry for the development of an improved detect and avoid aviation system, and a method and PSSR system that would enable reliable detection of target objects.

SUMMARY OF THE INVENTION

It is an objective of the present invention to provide a method to detect a transponder-equipped aircraft or an aircraft without a transponder accurately and constantly. In particular, there is an object of the present invention to provide a method and system for detecting target objects for omni-directional antennas that transmit P2 SLS pulses not within 360 degrees in azimuth, but covering only limited angle coverage, for example about 80 degrees (or any other limited angle) at the front side and the back side of the main SSR antenna, and therefore when P2 pulses are not always available for an observer during the rotation of the SSR antenna. Thus, it is another object of the present invention to provide a method and system for detecting target objects when the prior art does not work, for example when the ownship is out of the coverage of the SSR main beam and the SLS beam at the time it receives a transponder reply from the target object.

In accordance with an aspect, the invention provides a method for detecting and avoiding a target object. The method is based on determining a position of the target object. A Passive Secondary Surveillance Radar (PSSR), placed at a distance from a Secondary Surveillance Radar (SSR) performs processes of: determining a pulse repetition frequency (PRF) pattern for staggered interrogation pulses (P1, P2, P3) of the Secondary Surveillance Radar (SSR); receiving a reply from the target object in response to an interrogation signal comprising a P3 pulse sent from the SSR to the target object; and estimating a transmit time of the P3 pulse of the interrogation signal based on a reception time of the reply, and the PRF pattern.

The position of the target object is then determined based an altitude information h of the target object contained in the reply, a location of the SSR, the estimated transmit time of the P3 pulse of the interrogation signal, and the reception time of the reply. The P2 and P3 pulses are synchronized to respective P1 pulses with respective first and second predefined time gaps.

Upon detecting successive P2 pulses during a time-window where the PSSR is within range of a wide-beam antenna of the SSR, a time-ordered sequence of intervals separating the successive P2 pulses is formed.

If at least two successive congruent segments of the time-ordered sequence are identified, a pulse repetition pattern of P2 pulses is determined as one of the segments, subject to the constraint that a number of intervals of the segments is within the range of an initial length lower bound and a predefined length upper bound. The PRF pattern is derived based on the pulse repetition pattern of P2 pulses and corresponding values of the first and second predefined time gaps.

Determining the position of the target object enables controlling a specific moving object so as to avoid the target object.

During a time-window where the PSSR is within range of a narrow-beam antenna of the SSR, P1 and P3 pulses are detected and a value of the second predefined time gap between P3 and P1 pulses is determined, thereby an interrogation mode of the SSR is determined.

The process of forming the time-ordered sequence comprises initializing an array of intervals and initializing a first pointer of the array.

The process of identifying congruent segments of the time-ordered sequence comprises: finding a primary string of adjoining intervals, of the time-ordered sequence, in which a first interval is distinct from any other interval with a last interval preceding an interval that equals the first interval; examining a candidate string of adjoining intervals of maximum congruence to the first string, following the last interval; and subject to a determination that the candidate string is fully congruent with the first string, determining the first string as the PRF pattern.

Subject to a determination that the candidate string is not fully congruent with the first string: the candidate string is appended to the primary string and the last interval is updated to be the end interval of the candidate string.

The primary string and the candidate string are continually stored in the array of intervals.

The process of determining of the PRF pattern is terminated subject to a determination that either the primary string or the candidate string comprises a number of intervals exceeding the predefined length upper bound.

In order to verify correct identification of the PRF pattern, the pulse repetition pattern of P2 pulses is used as a reference string, and the number of intervals of the reference string as a reference length. Continuing to receive P2 pulses, consecutive strings of intervals between successive pulses are formed, where each consecutive string comprises a number of intervals equal to the reference length. A number of consecutive strings that are congruent with the reference string is then determined. Subject to a determination that the number of consecutive strings at least equals a predefined congruence lower bound, correctness of detected pattern is ascertained.

If the number of consecutive strings is less than the congruence lower bound, the initial length lower bound is reset to a higher value not exceeding the predefined length upper bound, and the process of determining the PRF pattern is revisited with the increased length lower bound.

In one implementation, determining a number of consecutive strings that are congruent comprises sequentially determining congruence of two successive strings, starting with the reference string.

The process of determining congruence of any two strings comprises determining a respective absolute value of a difference between each interval of one of the strings and an interval of a corresponding positions of the other string. Congruence is ascertained subject to a determination that the respective absolute value is below a first prescribed tolerance level.

In accordance with another aspect, the invention provides a detect-and-avoid system for an ownship aircraft. The system comprises a control station in communication with an ownship aircraft for controlling the ownship aircraft and a Passive Secondary Surveillance Radar (PSSR) system, at the ownship aircraft, in communication with the control station, the PSSR.

The ownship PSSR comprises a first receiver for receiving a reply from a target object wherein the reply is responsive to an interrogation signal comprising P1 and P3 pulses sent by a narrow-beam antenna of a Secondary Surveillance Radar (SSR) to the target object; a second receiver for receiving a stream of P2 pulses from the SSR, the P2 pulses being transmitted in a staggered pattern by a wide-beam antenna of the SSR; and a first processor coupled to the first receiver and the second receiver.

A second processor of the PSSR executes instructions to: determine a pulse repetition frequency (PRF) pattern for staggered interrogation pulses (P1, P2, P3) of the SSR, the P2 and P3 pulses being synchronized to respective P1 pulses with respective first and second predefined time gaps; estimate a transmit time of the interrogation signal based on a reception time of the reply, and the PRF pattern; and determine the position of the target object based on an altitude information of the target object provided in the reply, a location of the SSR, the transmit time of the interrogation signal, and the reception time of the reply.

During a time-window where the PSSR is within range of the wide-beam antenna, the instructions cause the second processor to detect successive P2 pulses, form a time-ordered sequence of intervals separating the successive P2 pulses, identify at least two successive congruent segments of the time-ordered sequence, and determine a pulse repetition pattern of P2 pulses as one of the segments subject to the constraint that a number of intervals of the one of the segments is within predefined lower and upper bounds.

During a time-window where the PSSR is within range of the narrow-beam antenna, the instructions cause the second processor to detect P1 and P3 pulses, determine a value of the second predefined time gap between P3 and P1 pulses, thereby determining an interrogation mode of the SSR, and derive the PRF pattern based on the pulse repetition pattern of P2 pulses and corresponding values of the first and second predefined time gaps.

The first processor continually determines inter-pulse intervals and stores the intervals in a buffer. The second processor independently reads individual inter-pulse intervals and executes the instructions. Thus, the pulse acquisition and inter-pulse measurement timescale is decoupled from processing timescale. The second processing unit is configured to ensure that a mean execution time per interval does not exceed a mean inter-pulse interval.

The detect-and-avoid system further comprises ground-based PSSR equipment installed within a ground-based surveillance system, the PSSR equipment being communicatively coupled to respective interface equipment within the control station.

A comparator unit, communicatively coupled to the respective interface equipment, comprises a respective processor configured to: receive data relevant to safety of the ownship generated at the PSSR system of the ownship; receive data relevant to safety of the ownship generated at the ground-based PSSR equipment; and perform comparative data analysis to enhance safety measures.

In accordance with a further aspect, the invention provides an engine for detecting a PRF pattern from a stream of pulses. the engine comprising: a first processing unit configured to: initialize an array of inter-pulse intervals, set a state to 0, and set a lower bound of an PRF pattern as a reference index of the array; and continually receive pulses, determine inter-pulse intervals; and placing the inter-pulse intervals in a buffer.

A second processing unit is configured identify a PRF pattern.

While the state is 0, the second processing unit compares each read interval from the buffer with a reference interval at the reference index, continues to read intervals from the array subject to a determination that each read interval differs from the reference interval; and switches to state-1 if any read interval equals the reference interval.

While the state is 1, the second processing unit compares each retrieved interval from the buffer with a prior interval stored at a respective designated index of the buffer, continues to read intervals from the array subject to a determination that each retrieved interval equals the prior interval, and switches to state-0 if a retrieved interval differs from the prior interval.

The PRF pattern is determined as comprising the intervals read during state-1 when the number of intervals read during uninterrupted presence in state-1 equals the total number of previously read intervals.

The buffer is managed as a circular buffer and has a sufficient storage capacity to hold a number of intervals at least equal to double a predefined upper bound of the number of intervals of a PRF pattern.

The second processing unit is configured to realize a mean processing time per interval not exceeding a mean inter-pulse interval.

According to another aspect of the invention, there is provided a method for determining a pulse repetition frequency (PRF) pattern for a staggered interrogation signal of a Secondary Surveillance Radar (SSR), the method comprising: at a Passive Secondary Surveillance Radar (PSSR) spaced apart from the SSR: (a) receiving side lobe suppression pulses P2 of the staggered interrogation signal comprising pulses (P1, P2, P3), the pulses P1, P3 generated by a main narrow-beam antenna of the SSR, and the pulse P2 generated by a wide-beam antenna of the SSR, the wide-beam antenna having an angular aperture, the pulse P2 synchronized with the pulse P1 and P3 with a predefined time delay; and provided the PSSR is within the angular aperture of the wide-beam antenna: i) receiving a first and second successive P2 pulses, each having a respective pulse reception time, determining a first time interval between the first and second successive P2 pulses, and storing the first time interval as a time-ordered sequence of time intervals; ii) receiving a new P2 pulse and determining a new time interval between said new P2 pulse and a last received P2 pulse; iii) provided said new time interval does not match the first time interval, adding said new time interval to the time-ordered sequence and repeating the steps (ii) to (iii); and iv) provided said new time interval matches the first time interval, and the time ordered sequence starts repeating itself from the first time interval and the new time interval, determining the PRF pattern for the staggered interrogation sequence of pulses based on those time intervals that are between the first time interval and the new time interval.

According to yet another aspect of the invention there is provided an apparatus for determining a pulse repetition frequency (PRF) pattern for a staggered interrogation signal of a Secondary Surveillance Radar (SSR) comprising:

a memory device in a Passive Secondary Surveillance Radar (PSSR) spaced apart from the SSR having computer executable instructions stored thereon, causing a processor to:
(a) receive side lobe suppression pulses P2 of the staggered interrogation signal comprising pulses (P1, P2, P3), the pulses P1, P3 generated by a main narrow-beam antenna of the SSR, and the pulse P2 generated by a wide-beam antenna of the SSR, the wide-beam antenna having an angular coverage, the pulse P2 synchronized with the pulse P3 with a pre-defined time delay; i) provided the PSSR is within the angular coverage of the wide-beam antenna, receive a first and second successive P2 pulses, each having a respective pulse reception time, determining a first time interval between the first and second successive P2 pulses, and storing the first time interval as a time-ordered sequence of time intervals; ii) receive a new P2 pulse and determining a new time interval between said new P2 pulse and a last received P2 pulse; iii) provided said new time interval does not match the first time interval, add said new time interval to the time-ordered sequence and repeating the steps (ii) to (iii); and iv) provided said new time interval matches the first time interval, and the time ordered sequence starts repeating itself from the first time interval and the new time interval, determine the PRF pattern for the staggered interrogation sequence of pulses based on those time intervals that are between the first time interval and the new time interval.

According to yet another aspect of the invention there is provided a method for determining the interrogation mode of each interrogation inside the stagger interrogation pattern for a SSR, the method comprising: i) receiving successive P1 and P3 pulse pairs, either from the main lobe or the side lobe of the SSR antenna, and determining the interrogation mode of each P1-P3 pair; ii) finding the P1-P3 pulse pair sequence inside the stored interrogation staggered pattern and marking the matched section of the stagger pattern with the corresponding interrogation mode; iii) expanding the interrogation mode of that section to the whole stagger pattern so that the interrogation mode of each of the interrogations inside the staggered pattern can be determined; iv) storing the staggered pattern and its corresponding interrogation mode pattern in storage device for future calibration; v) expanding the staggered pattern and its corresponding interrogation mode pattern to the time periods when neither P2 nor P1-P3 pair can be received.

According to one more aspect of the invention there is provided an apparatus for determining the interrogation mode of each interrogation inside the stagger interrogation pattern for a SSR, the apparatus comprising a memory device storing computer readable instructions causing a processor to: i) receive successive P1 and P3 pulse pairs, from the main lobe or the side lobe of the SSR antenna, and determine the interrogation mode of each P1-P3 pair; ii) find the P1-P3 pulse pair sequence inside the stored interrogation staggered pattern and mark the matched section of the interrogation pattern with the corresponding interrogation mode; iii) expand the interrogation mode of that section to the whole staggered pattern so that the interrogation mode of each of the interrogations inside the staggered pattern can be determined; iv) store the staggered pattern and its corresponding interrogation mode pattern in a storage device for future calibration; v) expand the staggered pattern and its corresponding interrogation mode pattern to the time periods when neither P2 nor P1-P3 pair can be received.

According to yet one more aspect of the invention there is provided a method for determining a position of a target object without a transponder, regardless of the target object being within the SSR main beam or SLS beam, based on the staggered interrogation pattern, the method comprising i) receiving the interrogation signal reflected from the target object close to the ownship; ii) searching the staggered pattern and determining the transmission time of the reflected interrogation; iii) determining an angle of arrival of the reflected interrogation using the dual receiving channel; iv) calculating an estimated position of the target object using the method used in the PSSR system.

According to yet one more aspect of the invention, there is provided a method for determining a pulse repetition frequency (PRF) pattern for a staggered interrogation signal of a Secondary Surveillance Radar (SSR), the method comprising: at a Passive Secondary Surveillance Radar (PSSR) spaced apart from the SSR: detecting side lobe suppression pulses P2 of the staggered interrogation signal comprising pulses (P1, P2, P3), the pulses P1-P3 generated by a main antenna of the SSR, and the pulse P2 generated by a wide-beam antenna of the SSR, the wide-beam antenna having a beam-width, the pulses P2 synchronized with the pulses P1-P3 with a predefined time delay, comprising:

provided the PSSR is within the beam-width of the wide-beam antenna:
i) detecting multiple P2 pulses; ii) forming a time-ordered sequence of P2 pulse intervals; iii) determining a repeating sequence of intervals in the time-ordered sequence of P2 pulse intervals; and iv) deriving the PRF pattern for the staggered interrogation signal of the SSR based on the repeating sequence of intervals.

The method further comprises predicting a transmit time for P1 pulse based on said PRF pattern provided the PSSR is outside the beam-width of the wide-beam antenna, thereby determining the transmit time for the P1 pulse when P2 pulses from the wide-beam antenna are not detectable.

The step of detecting of multiples P2 pulses comprises detecting successive P2 pulses. The step of forming a time-ordered sequence of P2 pulse intervals further comprises detecting a first and second successive P2 pulses, each having a respective pulse detection time, determining a first time-interval between the first and second successive P2 pulses, and storing the first time-interval as the time-ordered sequence of P2 pulses.

The step of determining a repeating sequence of intervals in the time-ordered sequence of P2 pulse intervals further comprises:
iii-1) receiving a new P2 pulse and determining a new time interval between said new P2 pulse and a last received P2 pulse; and iii-2) provided said new time-interval does not match the first time-interval, adding said new time-interval to the time-ordered sequence of P2 pulse intervals and repeating the steps (iii-1) to (iii-2).

Additionally, the step of deriving the PRF pattern for the staggered interrogation signal of the SSR based on the repeating sequence of intervals further comprises: provided said new time-interval matches the first time-interval, and the sequence of intervals starts repeating itself, determining the PRF pattern based on the repeating sequence of intervals. Furthermore, the PRF pattern can be updated by applying statistical processing or averaging of the determined PRF pattern and the PSSR is one of a stationary PSSR and a mobile PSSR and The present invention allows determining a position of a target object using the transmit time of the P1 pulse and/or P3 pulse and a reply message from said target object received at said PSSR, wherein said reply message is in response to receiving the P1 pulse and/or P3 pulse at said target object. Additionally, determining the position comprises determining a position of an aerial, nautical or ground object.

The method further comprises determining an interrogation pattern of the PRF pattern wherein said determining comprises (i) determining an interrogation sequence of said main antenna based on P1-P3 pulse combinations; (ii) matching said interrogation sequence in said PRF pattern; and (iii) determining the interrogation pattern of said PRF pattern.

The method of the present invention further comprises a calibration operation to compensate for time drift due to electronics within said PSSR to improve a time accuracy of said transmit time of P1 pulse.

According to yet another aspect of the invention, there is provided a method for determining the interrogation pattern for a PRF pattern comprising, at a PSSR spaced apart from the SSR, the steps of (i) detecting the P1-P3 pulses combination with or without P2 pulses (ii) determining the interrogation mode of each pulse combination (iii) determining the interrogation mode sequence using the P1-P3 combinations (iv) matching the combinations in the stagger pattern and (v) determining the interrogation mode for all interrogations in the stagger pattern.

The method further comprises determining the PRF pattern, using only the main antenna signal, when the ownship is too far from the SSR that an SLS signal cannot be received.

The present invention also provides a method for a three dimensional (3D) positioning a target object without a transponder using a reflection of the interrogation signal and a phased array receiver based on positioning principles of the PSSR. A coherent processing can also be performed on multiple received reflections to enhance the signal strength.

According to yet one more aspect of the invention, there is provided an apparatus for determining a pulse repetition frequency (PRF) pattern for a staggered interrogation signal of a Secondary Surveillance Radar (SSR) comprising:
- a memory device having computer executable instructions stored thereon, causing a processor to:
  - detect side lobe suppression pulses P2 of the staggered interrogation signal comprising pulses P1, P2, P3, the pulses P1 and P3 generated by a main antenna of the SSR, and the pulse P2 generated by a wide-beam antenna of the SSR, the wide-beam antenna having a beam-width, the pulse P2 synchronized with the pulses P1 and P3 with a predefined time delay, comprising:
  - provided the PSSR is within the beam-width of the wide-beam antenna:
    - i) detecting multiple P2 pulses and forming a time-ordered sequence of P2 pulse intervals;
    - (ii) determining a repeating sequence of intervals in said time-ordered sequence of P2 pulse intervals; and
    - (iii) deriving the PRF pattern for the staggered interrogation signal of the SSR based on the repeating sequence of intervals.

The computer executable instructions further cause the processor to determine an interrogation pattern of said PRF pattern based on P1-P3 pulses combinations.

The computer executable instructions also cause the processor to predict a transmit time for P1 and/or P3 pulse based on said PRF pattern when the PSSR is outside the beam-width of the wide-beam antenna.

The computer executable instructions further cause the processor to determine a position of a target object using the transmit time of the P1 and/or P3 pulse, the target object being one of an aerial, nautical or ground object.

According to yet one more aspect of the invention, there is provided a method for determining a position of a target object, comprising: processing at an onboard Passive Secondary Surveillance Radar (PSSR) system, signals received from a Secondary Surveillance Radar (SSR) to identify a plurality of P2 Pulses, wherein said P2 pulses are transmitted in a staggered pattern through a wide-beam antenna having a beam-width and wherein said PSSR can detect the P2 pulses when it is within said beam-width of said wide-beam antenna; forming a time-ordered sequence of P2 pulse intervals from said P2 pulses; determining a pulse repetition frequency (PRF) pattern of said P2 pulses, based on an identification of a repeating sequence of intervals in said time-ordered sequence of P2 pulse intervals; receiving a reply from the target object wherein said reply is responsive to an interrogation signal comprising a P1 pulse sent by the SSR to said target object; estimating a transmit time of said P1 pulse interrogation signal based on a reception time of said reply and the PRF pattern of the P2 pulses; and determining the target object position based on the target object altitude information h contained on said reply and on a localization operation using PSSR system location, SSR location, said transmit time of said P1 pulse interrogation signal and said reception time of said reply.

An interrogation pattern of said PRF pattern is further determined based on P1-P3 pulse combinations.

Because the P2 pulse is synchronized to said P1 pulse interrogation signal with a predefined time delay, the PRF pattern of the P1 pulses can be determined by applying a time shift equal to said predefined time delay to the PRF pattern of the P2 pulses.

According to yet one more aspect of the invention, there is provided a Passive Secondary Surveillance Radar (PSSR) system for determining a position of a target object, comprising: a first receiver for receiving a reply from the target object wherein said reply is responsive to an interrogation signal comprising a P1 and a P3 pulse sent by a Secondary Surveillance Radar (SSR) to said target object; a second receiver for receiving from said SSR a plurality of P2 Pulses, wherein said P2 pulses are transmitted in a staggered pattern through a wide-beam antenna having a beam-width and wherein said second receiver can detect the P2 pulses when it is within the beam-width of said wide-beam antenna; and a memory device having computer executable instructions stored thereon, causing a processor to: process said plurality of P2 Pulses to form a time-ordered sequence of P2 pulse intervals; determine a pulse repetition frequency (PRF) pattern of said P2 pulses, based on an identification of a repeating sequence of intervals in said time-ordered sequence of P2 pulse intervals; estimate a transmit time of said P1 pulse interrogation signal based on a reception time of said reply and the PRF pattern of the P2 pulses; and determine the target object position based on an altitude information of the target object present on said reply and on a localization operation using a location of the PSSR system, a location of the SSR, said transmit time of said P1 pulse interrogation signal and said reception time of said reply.

The PSSR system comprises a mixer and a local oscillator for translating the reply into an intermediate frequency band reply signal and for translating the P2 pulses into an intermediate frequency band P2 pulses; and a single channel high-speed Analog-to-Digital Converter (ADC) for digitizing said intermediate frequency band reply signal and said intermediate frequency band P2 pulses and transmitting digitized intermediate frequency band reply signal and digitized intermediate frequency band P2 pulses to said processor.

Alternatively, the PSSR system may comprise a first mixer and a first local oscillator for translating the reply into a baseband reply signal; a second mixer and a second local oscillator for translating the P2 pulse into a base band P2 pulses; and a dual channel high-speed Analog-to-Digital Converter (ADC) for sampling said baseband reply signal and said baseband P2 pulse and transmitting sampled baseband reply signal and sampled baseband P2 pulses to said processor.

In addition, the location of the PSSR is determined using a GPS unit, the location of the SSR being a fixed location known to the PSSR system.

According to yet another aspect of the invention, there is provided a Passive Secondary Surveillance Radar (PSSR) system in which the second receiver further receives a plurality of interrogation signals from said SSR, wherein said interrogation signals are transmitted in a staggered pattern through the main antenna having a beam-width and wherein said second receiver can detect the interrogation signals when it is within the beam-width of said main antenna (MA); and the computer executable instructions further cause the processor to process said plurality of interrogations to form a time-ordered sequence of interrogation mode; determine an interrogation pattern of said PRF pattern, based on matching of the MA interrogation sequence in said time-ordered stagger pattern sequence; process said plurality of interrogation signals to form a rotation profile of the main antenna of the SSR; wherein said rotation profile and said interrogation pattern are used in estimating said transmit time of said P1 pulse.

A Passive Secondary Surveillance Radar (PSSR) can determine the position of a target object when the target object is in the main (P1, P3-pulse) beam of a Secondary Surveillance Radar (SSR) but requires the PSSR to be simultaneously within the main (P1, P3-pulse) beam or the wider (P2-pulse) beam of the said SSR. A method for determining a staggered pattern and interrogation mode pattern from a staggered interrogation signal of a SSR is disclosed. This method enables a PSSR to work not only inside but also outside the wider P2 pulse beam. At a PSSR spaced apart from the SSR, P2 pulses of the staggered interrogation signal (P1, P2, P3) are detected, where P1 and P3 are generated by a main narrow-beam antenna of the SSR, and P2 is generated by a wide-beam antenna of the SSR having a beam-width. P2 pulses are synchronized in time with P3 pulses. Provided the PSSR is within the beam-width of the wide-beam antenna, multiple P2 pulses are detected as time-ordered sequence of P2 pulse intervals. A repeating sequence of time intervals in the time-ordered sequence can be determined, and the stagger pattern is determined based on the determined repeating sequence. In another case, when the PSSR is too far from the SSR, and P2 pulses are too weak to be detected, the staggered pattern can be determined using only the stronger P1 and P3 pulses from the narrow-beam signal of the main antenna (MA main lobe) using longer observation time. The interrogation mode pattern can be determined by comparing the said staggered pattern with the narrow-beam P1 and P3 signals. A transmit time of the P1 and/or P3 pulse is predicted based on said staggered pattern and said interrogation mode pattern. When the target object does not have a transponder, the positioning principle of the PSSR can also be used to determine a 3D position of the target object using the reflected interrogation signal from the target object, an angle of arrival measured from a phase array receiver, and a precise time of the interrogation predicted from the PRF or staggered pattern. Corresponding system is also provided.

Thus, an improved method and system for passive secondary surveillance radar (PSSR) tracking have been provided.

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which:

FIG. 2B-1 illustrates an interrogation signal at 1030 MHz received by the ownship 140 in the configuration of FIG. 2A;

FIG. 2B-2 illustrates a reply signal at 1090 MHz received by the ownship 140 in the configuration of FIG. 2A;

FIG. 2D-1 illustrates an interrogation signal at 1030 MHz received by the ownship 140 in the configuration of FIG. 2C;

FIG. 2D-2 illustrates a reply signal at 1090 MHz received by the ownship 140 in the configuration of FIG. 2C;

FIG. 5J illustrates phases of determining a PRF pattern for the sequence of inter-pulse intervals of FIG. 5I using the method of FIG. 5E;

DETAILED DESCRIPTION OF EMBODIMENTS

Figure 1:
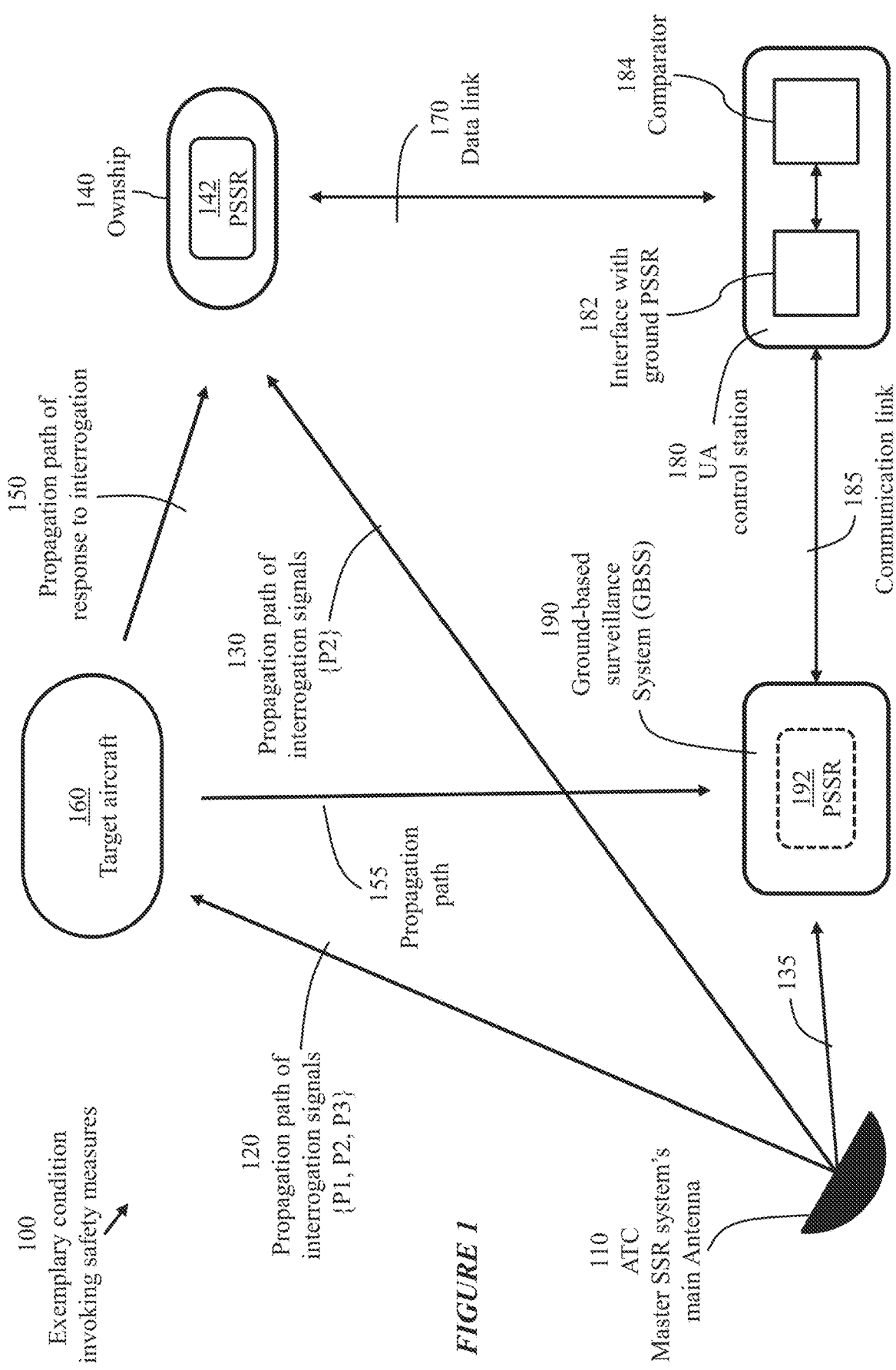
FIG. 1 illustrates an SSR center and ownship having a PSSR system on board for detecting a target object.

The terms "Unmanned Aerial Vehicle" (UAV) and "Unmanned Aircraft" (UA) are used synonymously.

Although the disclosed features are described with reference to unmanned aircraft, the features also apply to a piloted aircraft. The term "Ownship" is used to refer to an Unmanned Aerial Vehicle, an Unmanned Aircraft, or a piloted aircraft.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and/or implementations described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

It would be beneficial for an aircraft to have a PSSR system onboard to be able to detect positions of other aircraft in its vicinity. Preferably, it would be highly beneficial to take advantage of the existing systems and infrastructure to do so and in compliance with the aviation standards. In this description, the aircraft that carries the on board PSSR is referred to as the ownship ("our" aircraft) to distinguish it from the "another" aircraft (also referred to as a target object) whose location needs to be determined. The teachings of this invention are not limited to detecting aircraft. Any flying object (for example a drone) may be detected as long as it is equipped with functioning transponders. Moreover, in some embodiments the ownship may be a vehicle on the ground or water which is a special case of the most general 3-dimensional (3D) teachings.

FIG. 1 illustrates a generic configuration 100 in which the present invention can be deployed showing the ownship 140, having a Passive Secondary Surveillance Radar (PSSR) system on board (shown in FIG. 3), in relation to the master SSR system 110 and a target object represented as target object 160.

A major difference between the present approach of FIG. 1 and the prior art systems is that the PSSR of the ownship 140 is airborne and it works even when the ownship cannot receive any signals from the SSR. In the generic configuration 100, the SSR 110 transmits interrogation signals P1, P2 and P3 that can be received at the target object 160, the transmission path is represented as path 120. P1 and P3 pulses are transmitted through a narrow beam antenna of the SSR 110. The interrogation signals include the side lobes suppression pulses P2 that the SSR 110 transmits through a wide-beam antenna that can be received at the ownship 140. This is represented as path 130. The target object 160 broadcast reply is received at the ownship 140 through transmission path 150 for further processing to derive information necessary to locate and identify the target object 160 as will be described hereinafter.

The successive interrogations transmitted by the SSR 110 are not equally spaced for modern SSR system. They follow a fixed pulse repetition frequency (PRF) pattern, which is called 'staggered PRF'. This PRF pattern needs to be determined before a correct interrogation time can be predicted when the ownship is not covered by the Main Antenna (MA) and SLS beam. The determination of the PRF or stagger pattern based on the main-lobe observation can be slow and unreliable solely because only 7 to 10 interrogations can be observed at the ownship 140 within every rotation of the SSR 110 antenna. If the PRF pattern is long, it will take a longer time to determine the PRF pattern, which slows down the positioning of the target object long enough to cause midair collision hazards. A faster way of determining the PRF pattern is to use P2 pulses. Hundreds of P2 pulses can be observed in each rotation of the SSR 110 antenna, and therefore the PRF pattern is very likely to be determined within a small section of each rotation of the SSR 110 antenna. This greatly increase the speed of the algorithm and hence improve the safety of the ownship 140.

Current implementation of the antenna for P2, although referred to in some literature as omni-directional antenna, is actually a wide-beam antenna covering about 80 degrees of the front and the back of the MA for a total of about 160 degrees. It is understood that teachings of the present invention also apply for any other limited angle apart from about 80 degrees, covering less than 180 degrees of the front and less than 180 degrees of the back of the MA. In such situation, the ownship 140 can only receive the P2 when it is in its coverage area or beam-width and hence the ownship 140 in operation will not receive any reference signal from the SSR for about 200 degrees within a complete rotation of the SSR 110 antenna.

The present application provides a method to estimate the P2 pulses transmit times with an incomplete observation of the P2 pulses as will be described below.

A Detect-and-Avoid (DAA) system includes a Ground-Based Surveillance System (GBSS) 190 and an UA Control Station 180. The GBSS has a dual communication link 185 to the UA Control Station 180. The UA control station has a dual data link 170 to the ownship 140.

Optionally, PSSR equipment 192 may also be installed within the GBSS 190, in which case the PSSR sends information relevant to the target object 160 to an interface unit 182 installed within the UA control station which may relay the information to the ownship if the airborne PSSR 142 is perceived to be malfunctioning. If both PSSR 142 and PSSR 192 are used, there may be benefits of comparing their results. A comparator unit 184 may be installed in the UA control station 180 for his purpose. PSSR 192 may have a propagation path 135 from SSR 110.

The comparator unit 184 is communicatively coupled to interface unit 182 and comprises a respective processor configured to: receive data relevant to safety of the ownship generated at the PSSR system of the ownship; receive data relevant to safety of the ownship generated at the ground-based PSSR equipment; and perform comparative data analysis to enhance safety measures.

Figure 2A:
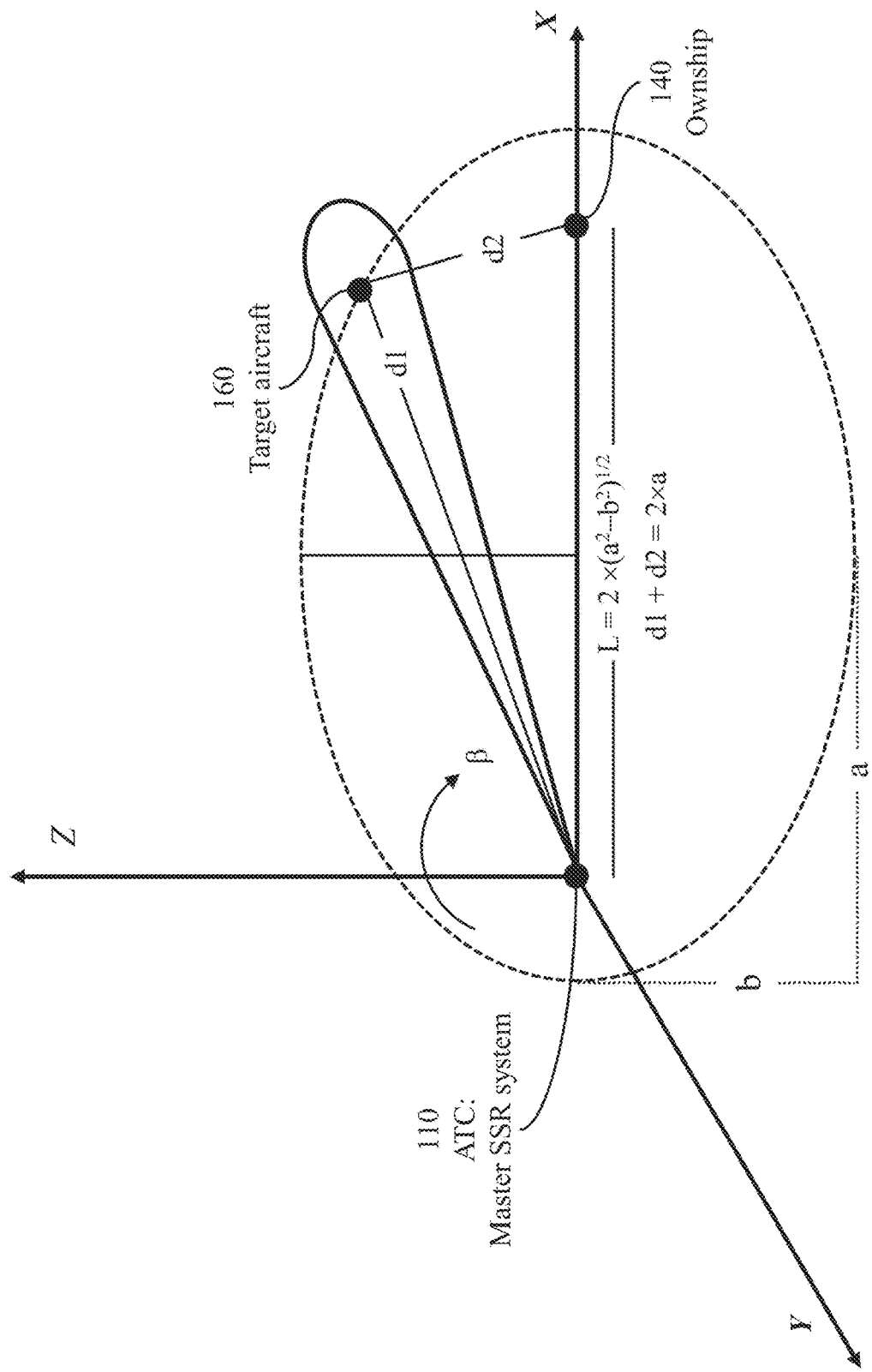
FIG. 2A illustrates relative positions of the SSR center, the ownship, and the target object of the system of FIG. 1 used for calculation of the position of the target object.

FIG. 2A illustrates a geometry of the above configuration in FIG. 1 where the SSR 110 and ownship 140 are shown as the two focal points. The SSR 110 is shown to be on the origin of the XYZ Cartesian coordinate system. Generally, in a 3-dimensional (3D) space, the surface composed by the points from which the sum of the distances to the two focal points is a constant is known to be a spheroid. For the purpose of the discussion, an elliptical cross-section of the spheroid on a 2-dimensional (2D) plane shown is sufficient because the altitude of the target object can be determined by its Mode C reply message. The 2D plane contains the major axis of the 3D spheroid. Mathematically, the coordinates of the target object 160 can be obtained from the following equations:

$$x = \frac{2b^2c \pm \sqrt{4b^4c^2 - 4(b^2 + a^2 \tan^2(2\pi - \beta))(b^2c^2 + a^2h^2 - a^2b^2))}}{2(b^2 + a^2 \tan^2(2\pi - \beta))}$$

$$y = x \tan(2\pi - \beta)$$

$$z = -h$$

where a and b are defined in FIG. 2A; c=L/2, h is the altitude of the target object 160, and β is the angle from X-axis clockwise to the center of the Main Antenna (MA), ranging from 0 to 360 degrees. The above equations are obtained from the real spheroid geometry in 3D instead of the depicted ellipse. That is because neither of the ownship 140 and the target object 160 is at the same altitude of SSR 110. Other techniques that can be used to localize the target object 160 include multilateration and triangulation techniques and are well known to those skilled in the art.

The geometry depicted in FIG. 2A, illustrates the case where the target object 160 is within the beam-width or coverage area of the SSR 110 MA main-lobe while the ownship 140 is outside of that radiation field. Additionally, because the wide-beam antenna coverage is ±40 degrees wide around the MA, the ownship 140 is within its coverage area and therefore the ownship 140 can see the P2 pulses transmitted by the wide-beam antenna of the SSR 110; however, ownship can see neither P1 nor P3 pulses. In this geometry the ownship 140 can detect both the P2 pulses and the reply signals from the target object 160.

Figures 2, 2B:
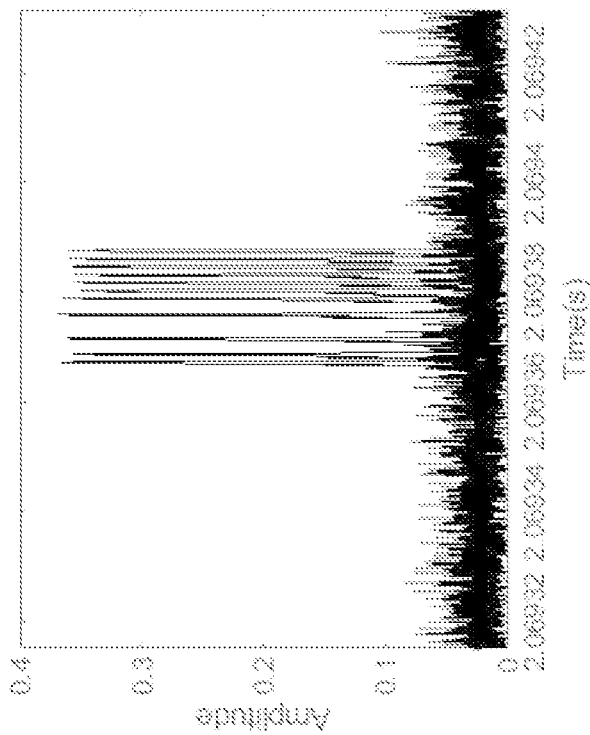
Figures 1, 2B:
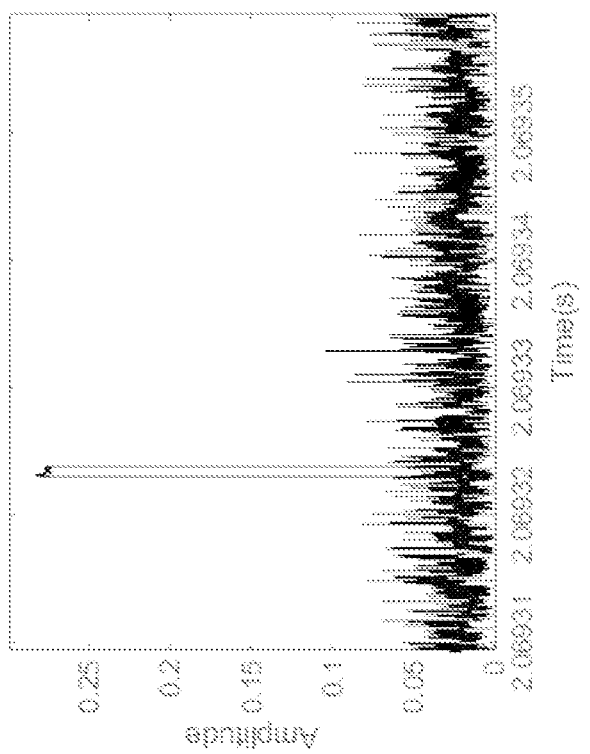

FIGS. 2B-1 and 2B-2 show the signals received by the ownship 140, with the reply at 1090 MHz from the target object 160 being shown in FIG. 2B-2, and the P2 pulse at 1030 MHz, corresponding to an interrogation signal that triggers the reply, being shown in FIG. 2B-1. The group of the solid line pulses is one complete reply message triggered by the interrogation corresponding to the P2 pulse. In this geometry the ownship 140 can readily detects the P2 pulses. The method of the invention reads the time instances of this P2 pulses and applies the algorithms described below to determine the stagger or PRF pattern of the P2 pulses and therefore predict the occurrences of the P2 pulses even when it cannot be observed at the ownship 140. The transmit time of the P1 pulse can then be derived from the occurrences of the P2 pulses, and transmit time of P3 pulse can also be derived once the interrogation pattern is determined.

Figure 2C:
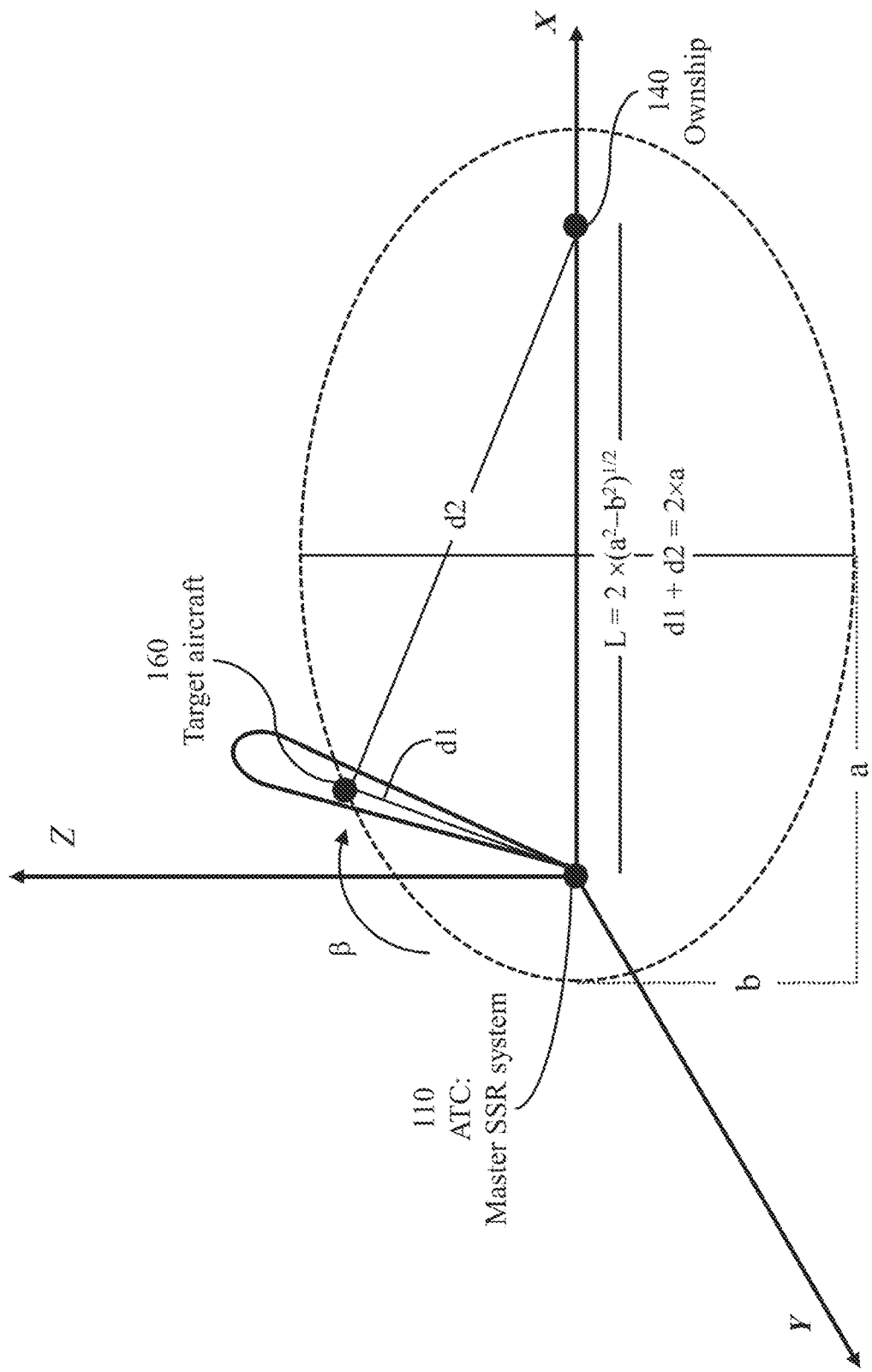
FIG. 2C illustrates relative positions of the SSR center, the ownship, and the target object of the system of FIG. 1 where the ownship is outside the wide-beam antenna coverage.
Figures 2, 2D:
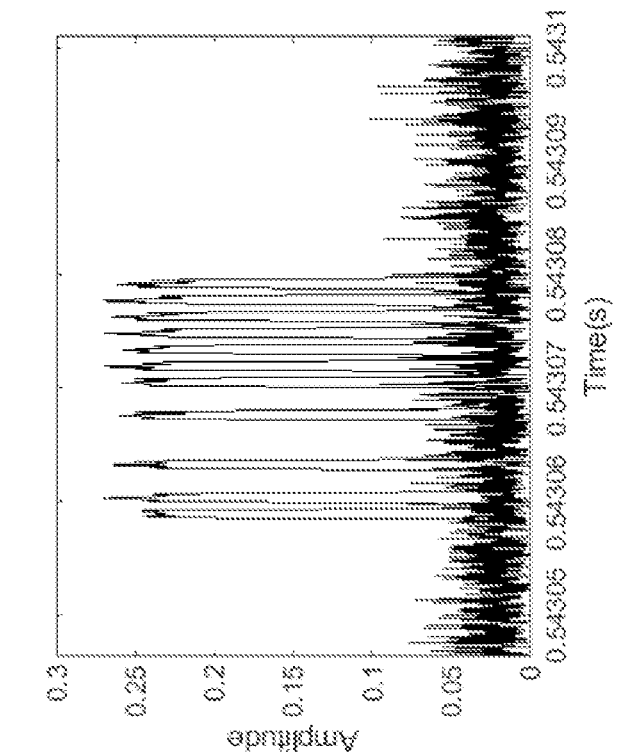
Figures 1, 2D:
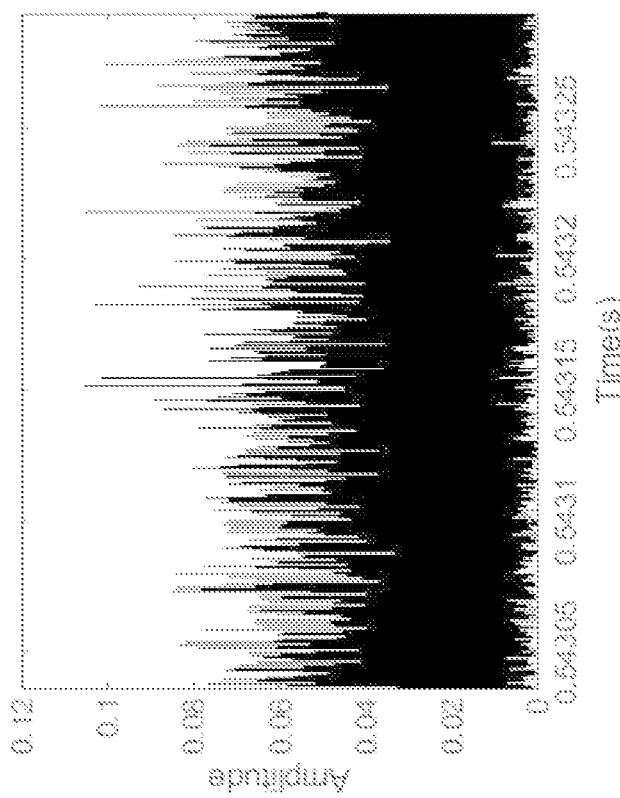

FIG. 2C shows another geometry corresponding to the case where the angle between the main-lobe of the SSR 110 Main Antenna and the X-axis is almost 90 degrees. The wide-beam transmission does not cover the ownship 140 area. In this geometry only the 1090 MHz reply from the target object 160 is observed, while none of the pulses comprising an interrogation signal is observed. The signals observed by the ownship 140 are shown in FIGS. 2D-1 and 2D-2. FIG. 2D-1 illustrates a signal around the 1030 MHz received by the ownship 140, and FIG. 2D-2 illustrates the 1090 MHz reply signal. As can be seen, the 1030 MHz receiver channel only shows noise, while none of the P1, P2 or P3 pulses is received. In this case, the device has to predict the interrogation that triggers the reply received by the ownship 140 using the PRF pattern of the P2 pulses to be able to position the target object 160.

For calculating the sum of the distance d1 from the SSR to target object 160 and the distance d2 from target object to ownship in this case, the time interval between the leading edge of the predicted P2 (the transmit time of the P2 pulse can be predicted for the case shown in FIG. 2D using the algorithm described below) and the reply message as shown in FIG. 2D should be calculated. Assume the stagger pattern and its interrogation mode have been determined using the algorithms described below, and the time between the assumed P2 pulse to the reply is α1 seconds, then the sum distance can be $d_t = d_1 + d_2$ calculated as:

$dt = c(\alpha 1 - 6e - 6 - 3e - 6) + L$ for Mode A interrogation; and $dt = c(\alpha 1 - 19e - 6 - 3e - 6) + L$ for Mode C interrogation;

where c is the speed of light, L is the distance between the SSR and the ownship as shown in FIG. 2C. $d_t$ is actually the parameter 2a in FIG. 2A. The reply message is transmitted after the transponder receives the P3 pulse. Therefore, for different modes, the reply time that is lagging the P2 pulse time is different. In Mode A interrogation, the P3 pulse is sent 6 microseconds after the P2 is transmitted, while in Mode C interrogation, the P3 pulse is sent 19 microseconds after P2. This is why for different interrogation modes, the formula above to calculate the sum distance is different. And for this reason, to profile and predict the interrogation mode of each interrogation in the stagger pattern is very important. The 3 microseconds in both equations are the fixed transponder delay.

Figure 3:
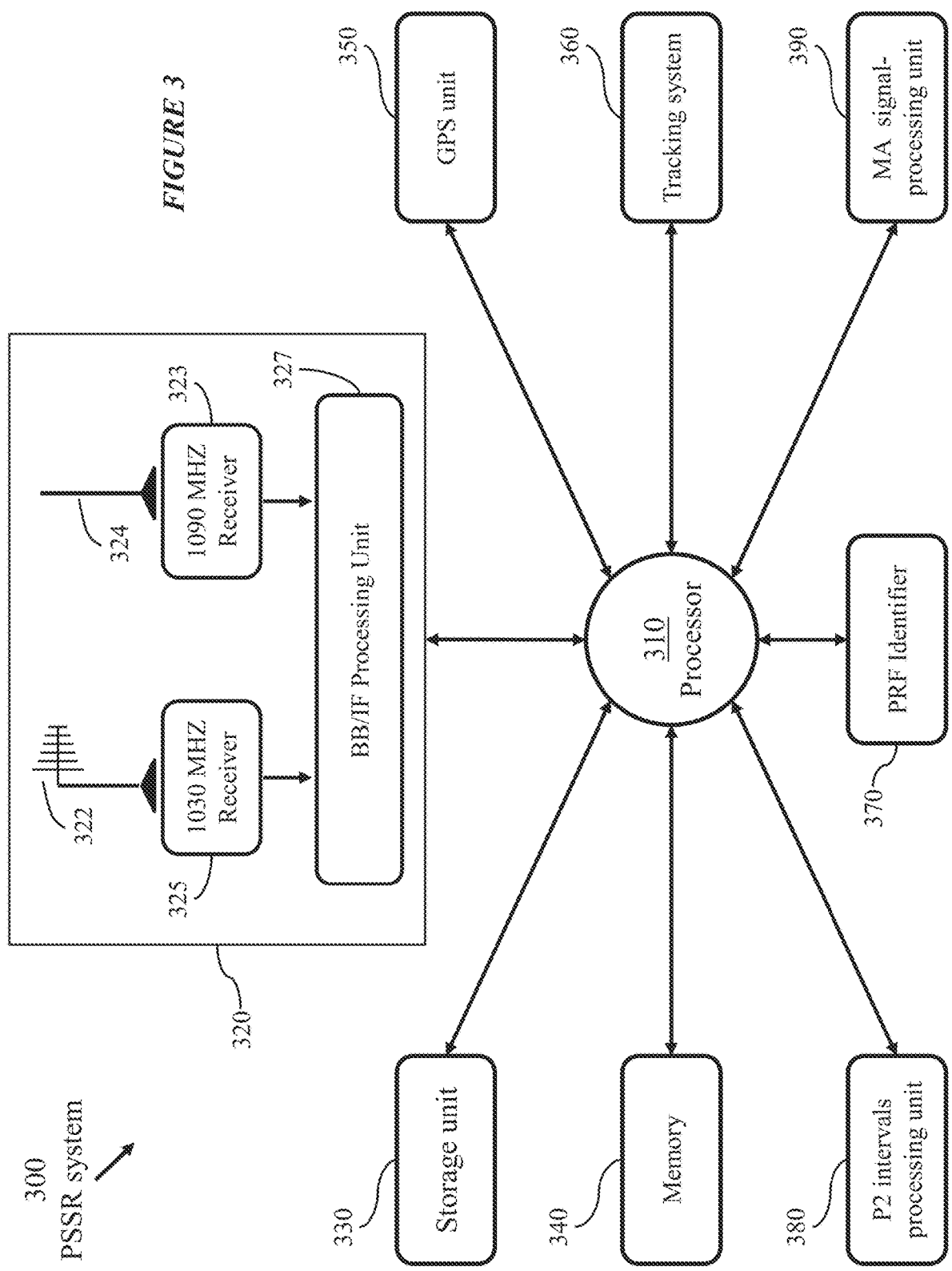
FIG. 3 illustrates various components of a mobile PSSR system.

FIG. 3 illustrates a Passive Secondary Surveillance Radar system PSSR 300 embedded in the ownship 140 for detecting a target object such as target object 160 and determining its positional information.

The PSSR system 300 comprises a receiver unit 320 for receiving, through an antenna system (322, 324) SSR mode C, all-call, and roll-call interrogations signals 130 comprising P1, P2 and P3 pulses and Mode A/C replies 150 from the target object 160. In a preferred embodiment, the receiver unit 320 comprises an omni-directional antenna 324 (such as a dipole). Since transponders generally use an omni-directional antenna, the ownship 140 can always receive reply messages from the target object 160. The receiver unit 320 may further comprise a directional antenna 322, for example for detection of the signals transmitted by the SSR 110 to enhance the SSR range when needed. Optionally, a multiple antenna array may be added to the receiver unit 320 to estimate the angle of arrival (AOA) of the target object 160 reply signal, which is useful for the case when the target object does not have a transponder.

The receiver unit 320 comprises a 1030 MHz receiver 325 connected to the directional antenna 322 or to the omni-directional antenna 324 through splitter (not shown) for detecting the interrogation signals transmitted by the SSR through the narrow-beam antenna (P1, P3) or the SLS signal (P2 pulse) through the wide-beam antenna of the SSR 110. The 1030 MHz receiver 325 is tuned to the 1030 MHz frequency band for receiving and filtering P2 as well as P1 and P3 signals in that frequency band. The receiver unit 320 comprises also a 1090 MHz receiver 323 tuned to 1090 MHz frequency band for receiving and filtering signals around 1090 MHz through the omni-directional antenna 324. The 1090 MHz receiver 323 detects reply signals from target object 160 which are transmitted at the 1090 MHz frequency. Both the 1030 MHz receiver 325 and 1090 MHz receiver 323 are connected to a Baseband/Intermediary Frequency (BB/IF) processing unit 327 for receiving the signals detected by the receiver 325 and receiver 323 and converting them into a baseband or into an intermediary frequency using a local oscillator as will be described in FIGS. 6A and 6B, respectively. The BB/IF processing unit 327 digitizes the received signals and pass the digitized signals along to a processor 310 for further processing. Processor 310 may be implemented as an assembly of multiple hardware processors arranged in multiple processing units.

In one embodiment processor 310 provides the processing power for performing the operations of the present invention. The processor 310 can be a micro-controller or a microprocessor or any processor device capable of executing the operations of the present invention, such processor devices are well known to those skilled in the art. The processor 310 receives digital signals from the receiver unit 320 and executes operations dictated by operating modules embedded or connected to the processor 310. In this embodiment a P2 intervals processing unit 380, along with the processor 310, process the signals corresponding to the P2 pulses for determining the time intervals between P2 Pulses received at the PSSR 300. The P2 intervals processing unit 380 creates a time-ordered sequence of P2 Pulse intervals that are stored in a memory device 340. The time-ordered sequence of P2 Pulse intervals is a sequence of intervals formed from the received P2 pulses and ordered according to the reception time of the P2 pulses. As an example, for 4 pulses received respectively at times $t_0$, $t_1$, $t_2$ and $t_3$, the time-ordered sequence of pulse intervals would be ordered as intervals $I_1$, $I_2$ and $I_3$ with $I_n$ formed from P2 pulses received at time n and at time n−1. The P2 intervals processing unit 380 adds as well any new interval determined from a new P2 pulse and the last received P2 pulse to the time-ordered sequence of pulse intervals, and compares the new interval to the previously stored pulse intervals in the time-ordered sequence of pulse intervals. The PRF Identifier 370 based on the result of that comparison applies a procedure to identify a repeating sequence of intervals and determine the PRF pattern. The procedures applied by the P2 intervals processing unit 380 and the PRF identifier 370 would be described in detail with regard to FIG. 5A.

In another embodiment processor 310 communicates with the SSR main antenna (MA) signal processing unit 390. The MA signal processing unit 390 identifies and decodes the Mode A/C messages that includes P1 and P3 pulses, no matter whether P2 is stronger or weaker than P1. These messages could come from the main lobe or side lobe of the MA. The main functions of the MA signal processing unit 390 include two parts: i) to determine the pattern of the interlaced Mode A/C interrogation, which is the interrogation pattern. This pattern could be ACACAC or AACAAC, etc. With the MA interrogation sequence and the interval between successive interrogations, a match of the MA pattern inside the whole stagger pattern can be found, and further to determine the type for every interrogation in the stagger pattern; ii) to determine the mechanical rotation of the MA. The procedures applied by the MA signal processing unit 390 will be described in detail with regard to FIG. 5B.

As illustrated in FIG. 3, the PSSR 300 relies on a data storage system 330 and a memory 340 both connected to the processor 310 to store data and information necessary to its operation. Permanent or long-term data such as SSR location, PRF pattern once identified can be stored in the data storage 330 while short-term data such as time-ordered sequence of pulse intervals, cached data or other program instructions can be stored in the memory 340.

The PSSR system 300, in a preferred embodiment, comprises a Global Positioning System (GPS) unit 350 for determining the location of the ownship 140. All the information related to the position and trajectory of the ownship 140 as well as the target object 160 is displayed on a display for advising the pilot of the ownship 140. In one embodiment, the display is part of a tracking system 360 that monitors the relative distance between the two objects (target object 160 and ownship 140). The tracking of the position and trajectory of the ownship 140 and target object 160 on the display provides a visual cue to the pilot of the ownship 140 to know the relative spacing between the ownship 140 and target object 160 and to take appropriate measures to mitigate any potential problem. More importantly, this allows the prediction of the target object movement based on the previous detection results and provide a confident estimation of the position of the target object even when the detection of the target object is missed in several detections. Additionally, an audio alarm system may be provided as part of the tracking system 360 to alert the pilot as well. Alternatively, the display may be standalone or shared with other components such as a computing device within the ownship 140 and/or the GPS unit 350 and the tracking system 360.

Figure 4:
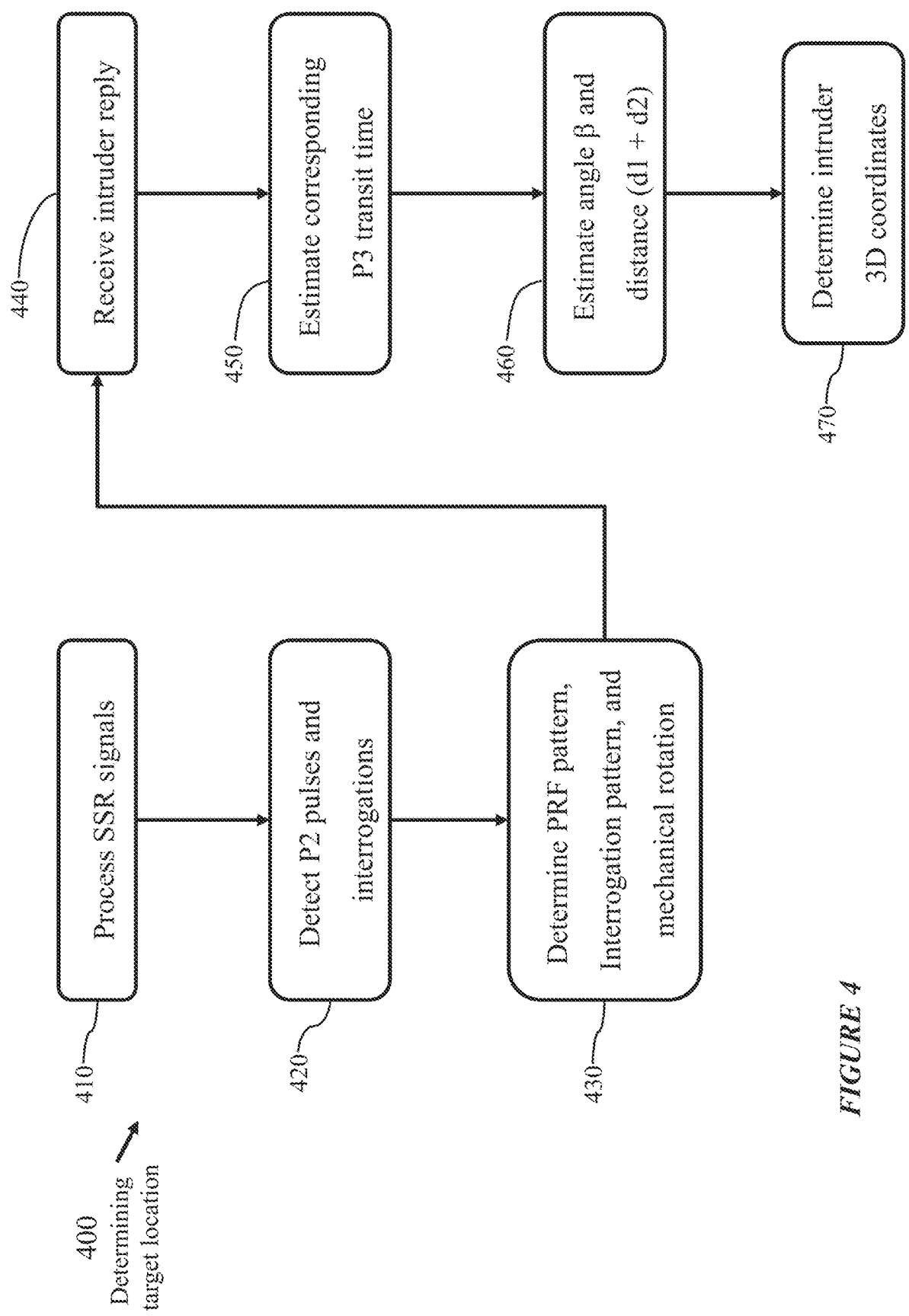
FIG. 4 is a flowchart depicting a method of determining a position of the target object, in accordance with an embodiment of the present invention.

A general operation of the PSSR 300 for finding location information of a target object such as target object 160 will now be described using an exemplary method depicted in the flowchart 400 of FIG. 4. At step 410 the PSSR receives signals transmitted by the SSR 110 at the 1030 MHz frequency band. The signals are received through the 1030 MHz receiver 325 which processes the signals as described in FIG. 3 and passes the information to the BB/IF processing unit 327 at step 420 for detecting the P2 pulses from the signals received. The reception times of the P2 pulses are as well recorded for the computation of the P2 pulses intervals. After detecting the P2 pulses and the interrogation sequence, a PRF determining step 430 applies a PRF identification procedure to identify a repetition pattern and corresponding interrogation type of the P2 pulses based on time intervals of the detected P2 pulses and the interrogations inside the MA. FIG. 5 will detail the procedure used by step 430 to determine the PRF (or stagger) and interrogation pattern of the P2 pulses.

As stated above one objective of the PSSR is to determine a position of a target object such as a target object 160 and display its positional information on a display of the ownship 140. For that purpose, the PSSR 300 onboard the ownship 140 receives reply signals at step 440 from the target object 160 and determines the reception time of the reply signal. The target object 160 transmits the reply signal in response to receiving from the SSR 110 an interrogation signal comprising P1 and P3 pulses transmitted through the main lobe of the narrow-beam antenna of the SSR 110. The reply signal contains the target object 160 identification information as well as its current altitude information. At step 450 the PSSR 300 uses the reception time of the reply signal from the target object 160 and the estimated interrogation signal from SSR 110 to determine the ellipse shown in FIG. 2A and FIG. 2C. As stated above, the P2 pulse is synchronized with the P3 pulse with a predefined time interval equal to 6 microseconds for Mode A interrogation and 19 microseconds for Mode C interrogation. Therefore, the PRF of the P2 pulses mimics the PRF of the P3 pulses albeit with a 6 or 19 microseconds time shift. The PRF of the P2 pulses also mimics the PRF of the P1 pulses with a 2 microseconds time shift. The critical point in measuring the position of the target object 160 is to estimate or predict when (and mode) the interrogation signal is transmitted from the SSR 110. In the case the reply signal is received while the PSSR 300 is within the coverage area of the SSR wide-beam antenna as depicted in FIG. 2A, the P2 pulse is then readily detectable from the wide-beam antenna and the PSSR 300 can directly estimate the transmit time of the interrogation signal P1 through the detection of P2 pulse and the estimation of the corresponding mode of this P2 pulse.

Alternatively, for the time/angles when the P2 pulses are not observed or too weak to be identified, which corresponds to the scenario depicted in FIG. 2C, the transmit time of the interrogation signal is not known directly, and hence need to be predicted in real time based on the stagger pattern and interrogation pattern determined. In this scenario, the PSSR 300 predicts a transmit time of the interrogation signal P3 based on the stagger pattern and corresponding interrogation mode identified at step 430. Because the interrogation signal P3 is always synchronized with the P2 pulse, when the transmit time and corresponding interrogation mode of a P2 pulse is known, the end of the transmit time of the interrogation signal associated with this given P2 is known. The transmit time of the P1 pulse can as well be derived from the PRF pattern based on the known time delay between the 2 pulses.

At step 460, the PSSR 300 estimates the angle β and the sum of the distances $d_1$ and $d_2$ described with regards to FIG. 2A based on the interrogation mode, transmit time and reply signal reception time. Using the mechanical pointing direction of the SSR MA and the ellipse determined by the sum of the distance $d_1$ and $d_2$, in the flowchart at step 470, the PSSR 300 can estimate the 3D coordinates of the target object 160. the 3D coordinates can be estimated using in particular the spheroid equations described with regards to FIG. 2A.

Figure 5A:
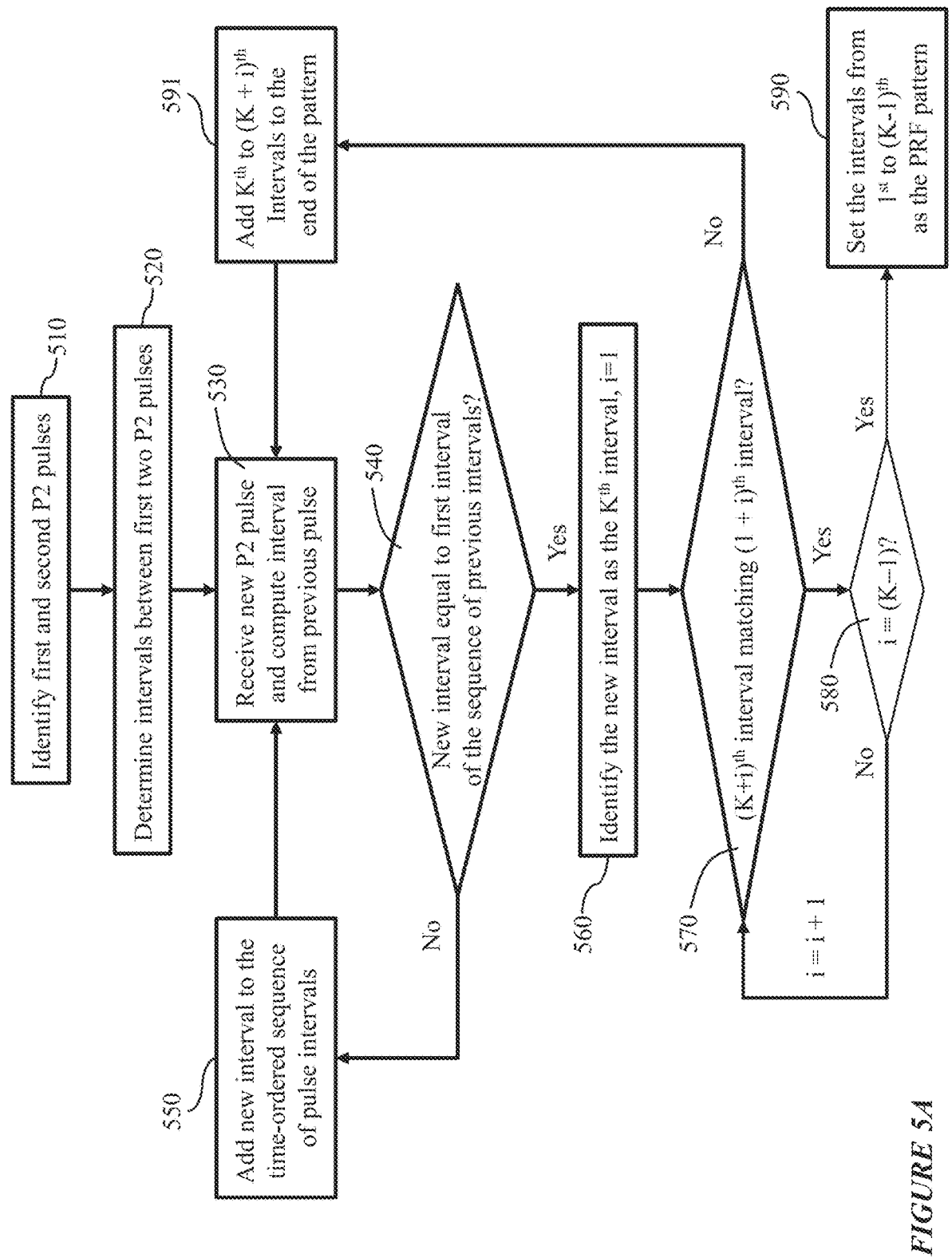
FIG. 5A is a flowchart depicting a method of detecting a PRF pattern from a stream of pulses, in accordance with an embodiment of the present invention.

FIG. 5A details the operation of step 430 for determining the PRF or stagger pattern of the flowchart 400. At step 510 the $1^{st}$ and $2^{nd}$ P2 pulses are identified and a 1St interval between the two pulses is determined at step 520. The 1St interval is used as the initial interval of the time ordered-sequence of pulse intervals. When a new pulse is received, a new interval is computed at step 530, in the present invention, computing a new interval is based on a new pulse and the last valid received pulse, as stated previously in the description of FIG. 3.

The identification of the PRF pattern is based on an identification of a repeating sequence of intervals within the time-ordered sequence of pulse intervals as defined previously. The PSSR 300 at step 540 compares the new interval with the first interval and if there is no match the new interval is added to the time-ordered sequence of pulse intervals at step 550 and the flowchart loops back to step 530 to receive a new P2 pulse and determine a new interval.

If at step 540 a new interval matches the 1St interval, the procedure for identifying the repeating sequence starts at step 560 with said new interval identified as the $K^{th}$ interval. The $i^{th}$ (i from 1) interval after the $K^{th}$ interval will be examined one by one to see if it matches the $1+i^{th}$ interval until a) if i reaches (K−1), then the intervals before $K^{th}$ are the stagger or PRF pattern (1 to k−$1^{th}$); or b) if the $i^{th}$ interval after $K^{th}$ does not match $1+i^{th}$ interval, then all the intervals between $K^{th}$ (include $K^{th}$) and K+$i^{th}$ (include K+$i^{th}$) will be added to the end of the stagger pattern and the algorithm goes back to 530 to continue to examine new arrived P2 pulses.

Although the flowchart of FIG. 5A compares at step 540 the new interval to the 1St interval, the comparison could be performed between the new interval and a previous $m^{th}$ interval and therefore the PRF pattern would be the intervals between the $m^{th}$ and the $K^{th}$ interval.

Figure 5B:
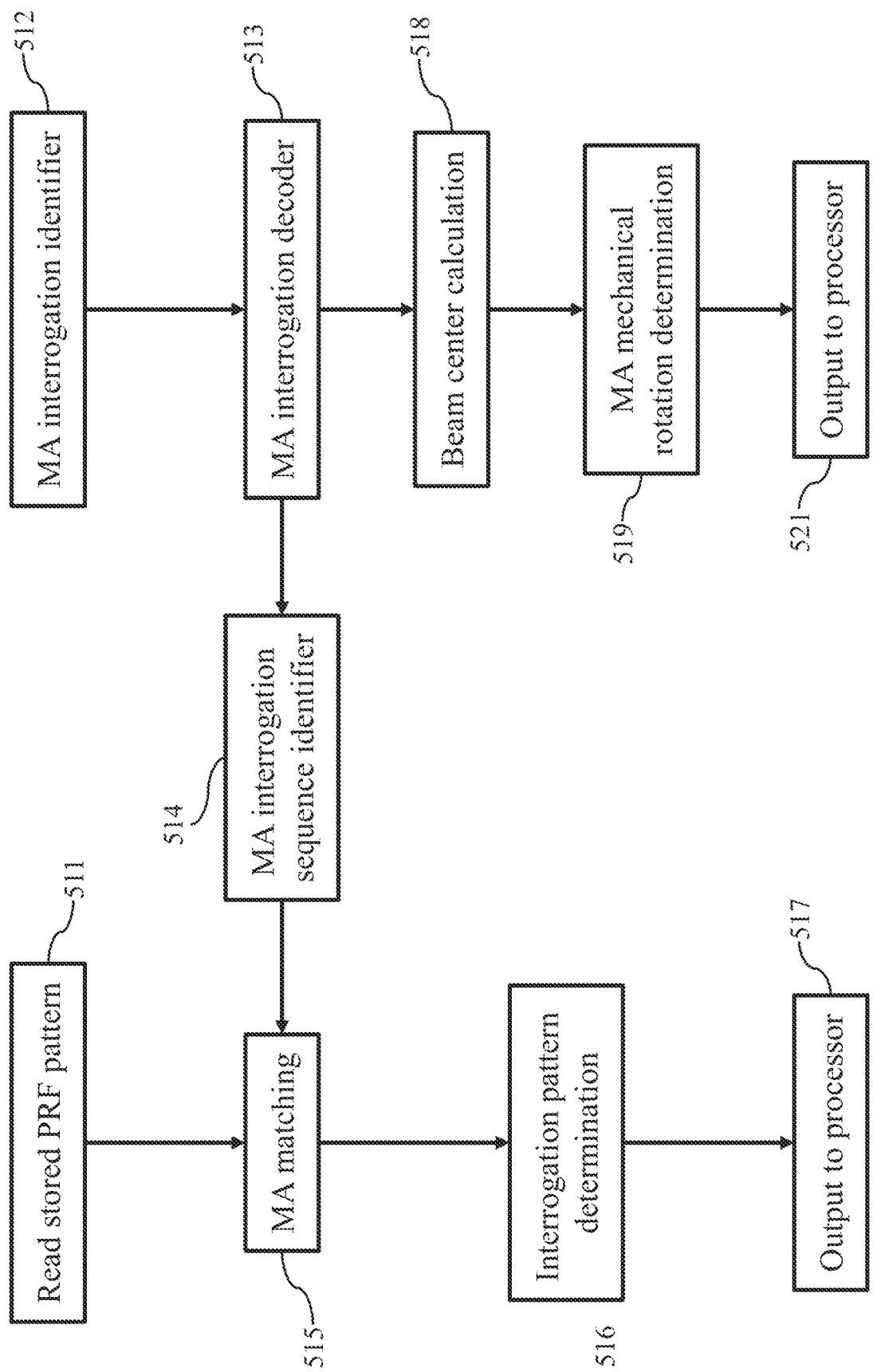
FIG. 5B is a flowchart depicting a method of obtaining an interrogation pattern.

FIG. 5B details the operation of step 430 for determining the interrogation pattern and mechanical rotation. Step 511 reads the PRF pattern determined and stored from the procedure shown by FIG. 5A. Step 512 identifies the valid P1-P3 or P1-P2-P3 pulse combinations. The confirmation of the pulse is based on the evaluation of its adjacent samples. If a sample passed a threshold set based on the average of the samples close to it, it will be considered to belong to a pulse. Other similar techniques to determine a pulse are well-known in the art, so the detection of a pulse is not limited to the one described above. For a valid interrogation combination, each pulse should have 2 microseconds pulse width. If only P1 and P3 pulses are detected, they should either be 8 microseconds apart for Mode A interrogation or 21 microseconds apart for Mode C interrogation. If P2 pulse is also present, it should be 2 microseconds away from the P1 pulse. Step 513 determines the interrogation mode based on the time interval between P1 and P3 pulses. For interrogation pattern determination, the interrogation mode sequence received from MA is passed to step 514, in which the interrogation repetition pattern is determined. For example, the MA interrogation sequence could be ACACACA if 7 valid interrogation combinations are received.

Because the SSR normally does not change the interrogation pattern during operation, the algorithm will identify one Mode A after one Mode C as the repetition pattern of the SSR. Then the step 515 will search through the stored PRF or stagger pattern for a match of the intervals among the received MA interrogations and mark the matched section with the corresponding interrogation mode. After that, step 516 will mark the rest of the interrogations in the stagger pattern with the interrogation sequence identified in 514, so that the interrogation mode of all the interrogations inside the stagger pattern is known. The staggered pattern together with the interrogation pattern are then output to the processor so that the transmit time and mode of any predicted interrogation are determined.

In step 518, the time center of the valid interrogations can be calculated, which represents the time when the center of the MA points to the ownship. With two of this time information, the rotation period can be calculated. Because the SSR rotates at a constant speed, the pointing angle of the SSR MA can be estimated for any given time instance. This information is also passed to processor to estimate the angle β in FIG. 2A or FIG. 2C.

The accuracy of the positioning of the target object 160 is very sensitive to the accuracy of the time measurement because the distance used in the algorithm is calculated by the product of the time and the speed of light.

Figure 5C:
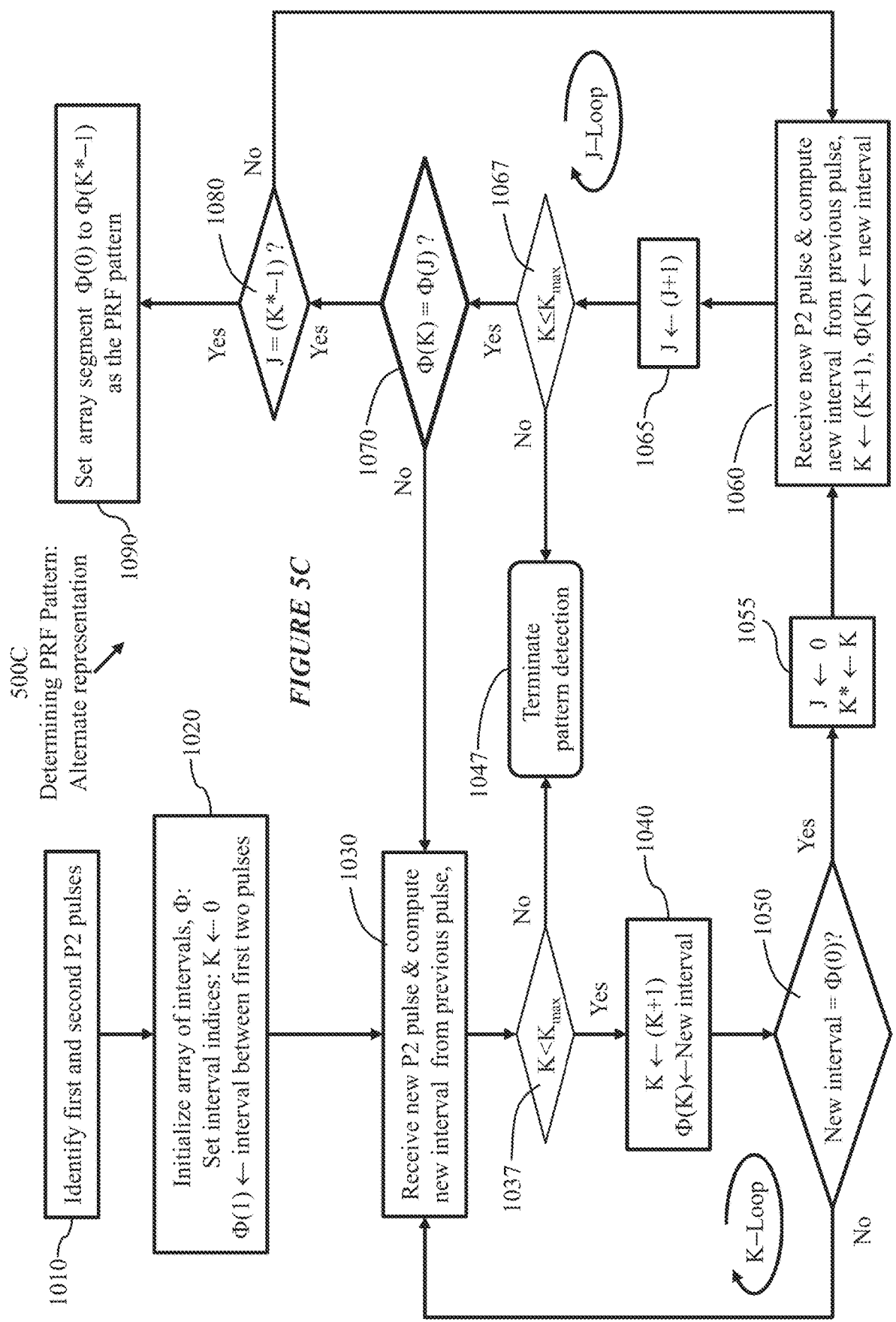
FIG. 5C is a flowchart depicting a variation of the method of FIG. 5A for detecting a PRF pattern from a stream of pulses, in accordance with an embodiment of the present invention.

FIG. 5C illustrates a method 500C of determining a PRF pattern similar to the method of FIG. 5A. Process 1010 receives two successive pulses and determines a value of the (time) interval between the two pulses.

Process 1020 initializes an array, denoted Φ, for storing values of successive intervals of a PRF pattern to be detected from a series of pulses, placing the interval between the first two pulses in array Φ at an index, K, set to equal 0. Thus, Φ(0) holds the first captured interval which is used as a reference interval during the process of populating array Φ.

Process 1030 continually receives pulses and determines inter-pulse intervals. For each received pulse, process 1040 increases the index, K, setting K←(K+1), and stores a respective inter-pulse interval in array Φ at index K. If process 1037 determines that K reached a predefined upper bound $K_{max}$, the pattern detection process is terminated (process 1047).

Process 1050 compares a current interval value, Φ(K), with the reference interval Φ(0). If Φ(K) is determined to be different from Φ(0), process 1050 determines that the sequence of intervals corresponding to the sought PRF pattern is incomplete and returns to step 1030 to obtain another inter-pulse interval. Processes 1030, 1040, and 1050, which are recursively activated, form a "K-Loop" of processing.

If Φ(K) is determined to be equal to Φ(0), process 1050 tests the possibility that a forthcoming succession of inter-pulse intervals may be congruent with the sequence {Φ(0) to Φ(K−1)}, in which case the sequence {Φ(0) to Φ(K−1)} is considered to be the sought PRF pattern. Process 1050 then leads to process 1055 which initializes a count, J, as zero, and retains the respective value of K, denoted K*, which will be needed to identify the PRF pattern according to the array segment {Φ(0) to Φ(K*−1)}.

Process 1060 starts a recursive procedure to determine whether a sequence of inter-pulse intervals of forthcoming pulses is congruent with the sequence {Φ(0) to Φ(K*−1)}. Process 1060 continues process 1030 of receiving new pulses and determining corresponding inter-pulse intervals. With each determined new interval, index K is increased, setting K←(K+1), and a value of new interval is placed in Φ(K). The count, J, is increased, setting J←(J+1), in process 1065. If process 1067 determines that K has exceeded the predefined upper bound $K_{max}$, the pattern detection process is terminated (process 1047). Otherwise, process 1070 compares current stored interval Φ(K) with previously stored interval Φ(J).

If Φ(K)=Φ(J), process 1070 leads to step 1080 which concludes the PRF-detection process if J=(K*−1), which indicates that the sequence {Φ(K*) to Φ(2×K*−1)} is congruent with the sequence {Φ(0) to Φ(K*−1)} which would then be considered, in process 1090, to represent the sought PRF pattern.

If Φ(K)≠Φ(J), process 1070 leads to step 1030 which continues to receive new pulses with array Φ already storing intervals of indices K* to (K*+J).

Processes 1060, 1065, 1070, and 1080, which are recursively activated, form an "J-Loop" of processing. The method is based on flip-flopping between the K-Loop and the J-Loop, until process 1090 is reached.

Consider, for example, a case of receiving a succession of pulse having inter-pulse intervals of values:

"A, B, C, D, E, A, F, A, B, G, H, P, G, Q, A, B, C, D, E, A, F, A, B, G, H, P, G, Q", where the individual interval values {A, B, C, D, E, F, G, H, P, Q} are distinctly different.

Process 1010 receives two successive pulses and determines a value "A" of the (time) interval between the two pulses, which is the reference interval.

Process 1020 sets index K of an array, Φ, to zero, with Φ(0)←A.

Process 1030 receives a new pulse after a time interval "B" from the time of receiving the previous pulse. Process 1040 increases the index, K, setting K←(K+1)=1, and stores the interval "B" in Φ(1).

Process 1050 compares Φ(1) with Φ(0), which are different, and returns to process 1030 to receive the next pulse after a time interval "C". Process 1040 increases K to 2 and stores the value C at Φ(2).

Likewise, array Φ stores interval D and E at Φ(3) and Φ(4) with the index K increased to K=4 in process 1040.

Process 1030 receives successor pulse after an interval "A" and process 1040 increases K to K=5, placing the new value "A" in Φ(5). Process 1050 then determines that Φ(5)=Φ(0), and switches from the K-Loop to the J-Loop. Process 1055 sets a count, J, to 0 and retains the current value of K, denoted K*.

Process 1060 receives a subsequent pulse after a time interval "F" and increases K to K=6, storing the interval in Φ(6). Process 1065 increases J to J=1, then process 1070 determines that Φ(6)≠Φ(1) thus the sequence segment {Φ(5), Φ(6)} cannot be part of a replica of the captured sequence {Φ(0), Φ(1), Φ(2), Φ(3), Φ(4)}. The detection process then switches back to the K-Loop where process 1030 receives a new pulse after a time interval "A". Process 1040 increases the index K to K=7 and sets Φ(7)=A. So far, the array segment {Φ(0) to Φ(7)} stores "A, B, C, D, E, A, F, A".

The method then explores the possibility that the last entry "A" is a start of a replica of array segment "A, B, C, D, E, A, F" and switches the pattern-detection process to the J-Loop. Process 1055 sets the count J to 0 and retains the current value of K as K* so that, if the last pulse interval is a start of a replica, then the array segment {Φ(0) to Φ(K*−1)} is considered to represent the sought PRF pattern. Process 1060 of the J-Loop receives a new pulse after a time interval "B", increasing the index K to K=8. Process 1065 increases the count J to J=1 and process 1070 compares Φ(8) to Φ(1) Since Φ(8)=Φ(1)=B, there is still the possibility that inter-pulse intervals of forthcoming pulses will belong to the sought PRF pattern. Process 1080 compares determines that J≠(K*−1), J being 1 and K* being 7. Thus, J-Loop processing continues with process 1060 receiving a new pulse after a time interval "G". The index K is increased to K=9, Φ(9)=G. Process 1065 increases J to J=2 and process 1070 determines that Φ(9)≠Φ(2). The pattern-detection process switches to the K-Loop where process 1030 receives a new pulse after a time interval "H", Process 1040 increases K to K=10, setting Φ(10)=H. Process 1050 of the K-Loop determines that Φ(10)≠Φ(0), hence process 1030 is revisited. Upon receiving three more pulses after time intervals "P", "G", and "Q", the K-Loop increases K to K=13 with Φ(11)=P, Φ(12)=G, Φ(13)=Q.

Within the K-Loop, process 1030 receives a subsequent pulse after a time interval "A". Process 1040 increases K to 14, setting Φ(14)=A. Process 1050 determines that Φ(14)=Φ(0), hence, the pattern-detection process switches to the J-Loop.

Following the criterion of process 1070 for remaining within the J-Loop, process 1060 of the J-Loop receives new pulses after time intervals: "B, C, D, E, A, F, A, B, G, H, P, G, Q", which meet the criterion of process 1070 for remaining within the J-Loop leading to meeting the condition J=(K*−1)=13. Thus, the array segment {Φ(0) to Φ(13)} of 14-time intervals represents the sought PRF pattern.

Table-I below illustrates the above pattern-detection process.

TABLE I

Walkthrough of the algorithm of FIG. 5C

| Pulse index | Interval value | K Interval index | Φ(K) | J | Φ(J) | Φ(K) = Φ(I) ? | K* | Loop |
|---|---|---|---|---|---|---|---|---|
| 0 | | | | | | | | |
| 1 | A | 0 | A | — | — | — | — | K-Loop |
| 2 | B | 1 | B | — | — | — | — | |
| 3 | C | 2 | C | — | — | — | — | |
| 4 | D | 3 | D | — | — | — | — | |
| 5 | E | 4 | E | — | — | — | — | |
| 6 | A | 5 | A | 0 | A | Y | 5 | |
| 7 | F | 6 | F | 1 | B | N | 5 | J-Loop |
| 8 | A | 7 | A | 0 | A | Y | 7 | K-Loop |
| 9 | B | 8 | B | 1 | B | Y | 7 | J-Loop |

TABLE I-continued

Walkthrough of the algorithm of FIG. 5C

| Pulse index | Interval value | K Interval index | Φ(K) | J | Φ(J) | Φ(K) = Φ(I) ? | K* | Loop |
|---|---|---|---|---|---|---|---|---|
| 10 | G | 9 | G | 2 | C | N | 7 | |
| 11 | H | 10 | H | 2 | D | N | 7 | K-Loop |
| 12 | P | 11 | P | 2 | E | N | 7 | |
| 13 | G | 12 | G | 2 | A | N | 7 | |
| 14 | Q | 13 | Q | 2 | F | N | 7 | |
| 15 | A | 14 | A | 0 | A | Y | 14 | |
| 16 | B | 15 | B | 1 | B | Y | 14 | J-Loop |
| 17 | C | 16 | C | 2 | C | Y | 14 | |
| 18 | D | 17 | D | 3 | D | Y | 14 | |
| 19 | E | 18 | E | 4 | E | Y | 14 | |
| 20 | A | 19 | A | 5 | A | Y | 14 | |
| 21 | F | 20 | F | 6 | F | Y | 14 | |
| 22 | A | 21 | A | 7 | A | Y | 14 | |
| 23 | B | 22 | B | 8 | B | Y | 14 | |
| 24 | G | 23 | G | 9 | G | Y | 14 | |
| 25 | H | 24 | H | 10 | H | Y | 14 | |
| 26 | P | 25 | P | 11 | P | Y | 14 | |
| 27 | G | 26 | G | 12 | G | Y | 14 | |
| 28 | Q | 27 | Q | 13 | Q | Y | 14* | |
| 29 | | | | | | | | |

*J = (K*−1), hence array segment Φ(0) to Φ(J) holds the PRF cyclic pattern

Figure 5D:
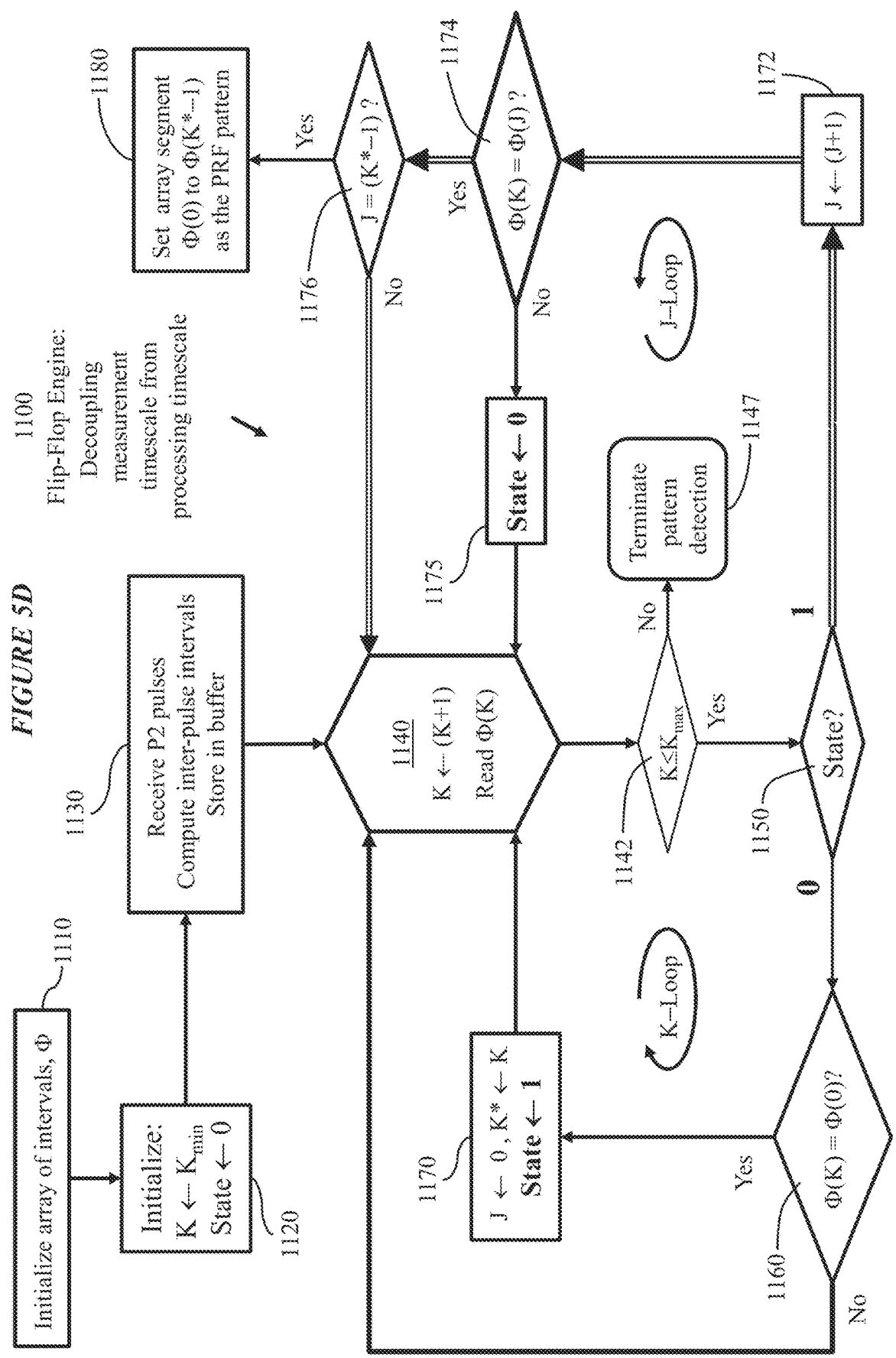
FIG. 5D illustrates an engine 1100 for detecting a PRF pattern from a stream of pulses, in accordance with an embodiment of the present invention.

FIG. 5D illustrates an engine 1100 for detecting a PRF pattern from a stream of pulses. The engine continually receives pulses and stores inter-pulse intervals in a buffer using an appropriate data structure, such as a simple array denoted Φ. The buffer is preferably managed as a circular buffer having a storage capacity, in terms of a number of stored entries (stored records), exceeding the maximum permissible number of pulses per PRF pattern. Note that with continuous pulse reception, the number of inter-pulse intervals per PRF pattern equals the number of pulses per PRF pattern.

A processor continually reads the values of the stored intervals and implements processor-executable instructions to identify a cyclic PRF pattern. Executing the instructions need not be coordinated with the instants of time of receiving the pulses and measurement of inter-pulse time intervals. Thus, the measurement timescale is decoupled from the processing time scale.

The buildup of the sequence of inter-pulse (time) intervals may start with a segment of array Φ comprising a number of entries equal to a specified lower bound of a length of the sequence. The specified lower bound is a design parameter.

Process 1110 initializes array Φ of inter-arrival intervals either as an array of sufficient number of entries each initialed as a null entry (such as a value of zero, since an inter-pulse interval cannot be equated to zero), or initializing a WRITE-index and a READ-index of Φ to ensure that any entry being read corresponds to an already inserted interval.

As in the method of FIG. 5C, the engine switches between a "K-Loop" and a "J-Loop" based on current and prior interval values placed in array Φ. The process of pattern detection is said to be in "state 0" when the K-Loop is active, and in "state 1" when the J-Loop is active.

Process 1120 initializes the state as 0, to start processing within the K-Loop. An initial segment of array Φ including entries {Φ(0) to Φ($K_{min}$)} is selected (setting $K_{min}$) as a "seed" for building up a sequence of records, $K_{min}$ being a logical address that equals a specified minimum pattern length, in terms of a number of intervals, minus 1 (since the entry indices of array Φ start with 0).

Process 1130 receives the pulses, determines inter-pulse intervals, and stores same into a memory device at storage entries of Φ logically indexed sequentially in steps of 1, starting with 0.

Process 1140 sequentially increases the current index K, setting K←(K+1), and reads a corresponding interval value from the (circular) buffer. If process 1142 determines that K has exceeded the predefined upper bound $K_{max}$, the pattern detection process is terminated (process 1147). Otherwise, process 1150 branches to either the K-Loop or the J-Loop. Starting with state 0 (initialized in process 1130), process 1150 leads to process 1160 which compares Φ(K) with Φ(0). Notably, in the first activation of the K-Loop, the first inspected interval is the interval immediately following the specified initial segment {Φ(0) to Φ($K_{min}$)}, which is Φ($K_{min}$+1), K being increased to ($K_{min}$+1) in process 1140. If Φ(K) ≠ Φ(0), process 1160 leads to process 1140 which increases K (setting K←(K+1)) and reads a corresponding interval from the (circular) buffer. Circulating the K-Loop, increasing K and executing processes {1160, 1140, 1150, 1160, ... }, continues until a value of Φ(K) equals Φ(0) at which point process 1160 leads to process 1170 to switch to the J-Loop in order to determine whether a replica of the sequence of intervals so far identified in the K-Loop can be found in subsequent intervals in array Φ.

Process 1170 resets the state to 1, initializes a count J to 0, and retain a current value of K as K*, thus setting the sequence {Φ(0) to Φ(K*−1)} as a reference base. If a replica of the reference base is identified in the (circular) buffer, the reference base is considered the sought PRF pattern. The reference base is updated with each activation of process 1170, i.e., with each transition from the K-Loop to the J-Loop. Process 1170 leads to process 1140 which increases the index K, reads a corresponding value Φ(K) from the (circular) buffer, and proceeds to process 1150 which directs the process of pattern detection to process 1172 of the J-Loop since that state is 1. Process 1172 increases the count J, setting J←(J+1), and proceeds to process 1174 which compares Φ(K) to Φ(J).

If process 1174 determines that Φ(K)≠Φ(J), there is no chance that a replica of the reference base {Φ(0) to Φ(K*−1)} will be encountered within the J-Loop. Thus, process 1174 proceeds to process 1175 to switch the state from 1 to 0, leading to process 1150 branching to the K-Loop.

If process 1174 determines that Φ(K)=Φ(J), there is still a chance that a replica of the reference base {Φ(0) to Φ(K*−1)} will be encountered, thus the state remains to be 1. Process 1174 proceeds to process 1176. If process 1176 determines that J is less than (K*−1), process 1140 is activated to read another interval, maintaining the state as 1, hence process 1150 will continue to lead to the J-Loop.

As new entries of array Φ are read in process 1140, the J-Loop either:
identifies a segment {Φ(K*) to Φ(K*+J)} which is short of complete congruence with the segment {Φ(0) to Φ(K*−1)}, thus returns control to the K-Loop in process 1175; or determines in process 1176 that a complete congruence has been found, then proceeds to conclude the pattern identification process in process 1180.

Figure 5E:
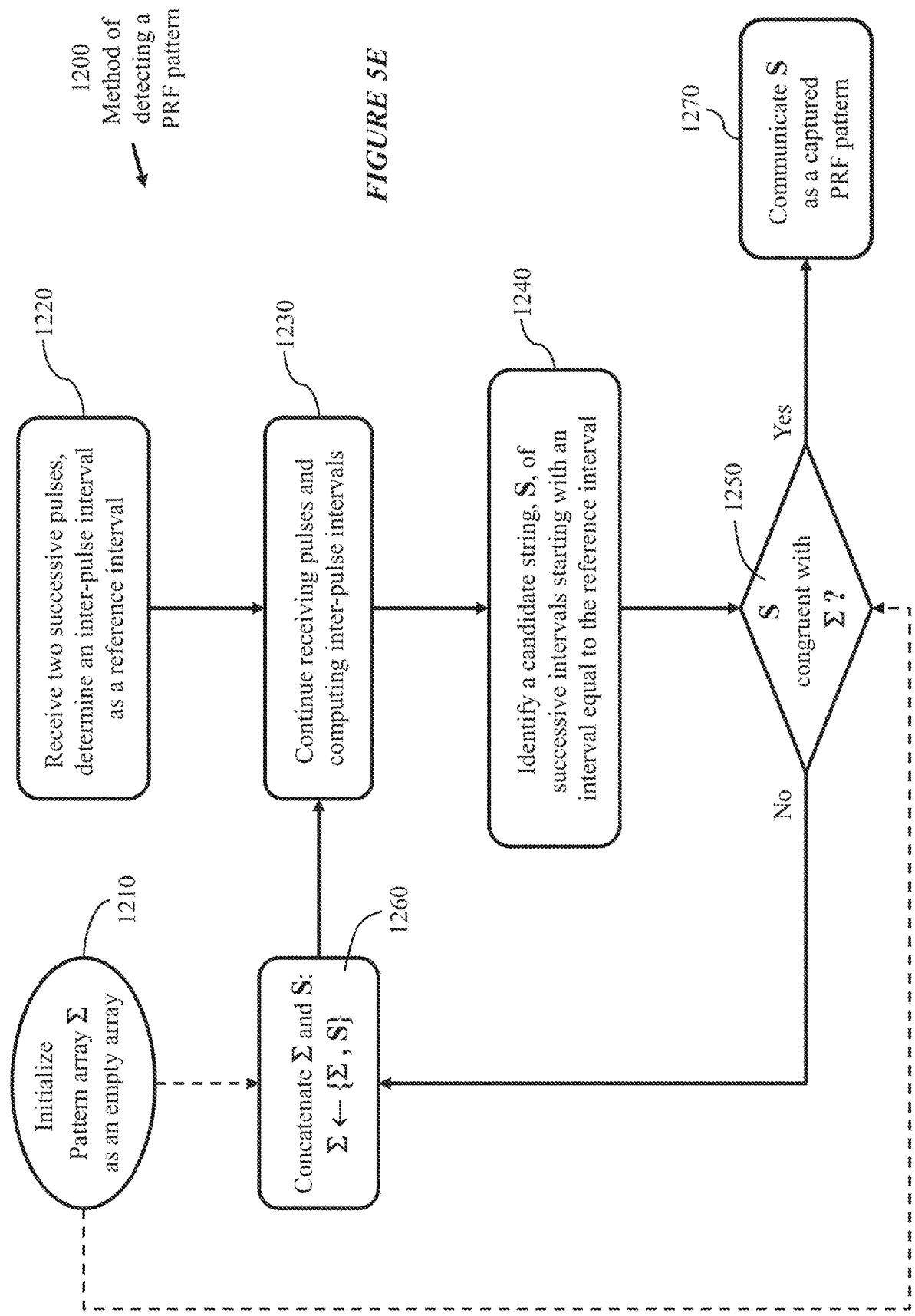
FIG. 5E illustrates a generalized method for determining a PRF pattern from a stream of pulses, in accordance with an embodiment of the present invention.

FIG. 5E illustrates a generalized method 1200 for determining a PRF pattern from a stream of pulses. The method is implemented at a PSSR comprising a processor and memory devices. Process 1210 initializes a pattern string, denoted Σ, for holding values of successive inter-pulse intervals, as an empty string, with a number of stored interval values set to zero. The initial size of string Σ is supplied to processes 1250 and 1260. Process 1220 receives two pulses and measures the interval between them which used as a reference interval. Process 1230 continually receives pulses and determines respective inter-pulse intervals. The values of the inter-pulse intervals are presented to process 1240. Process 1240 identifies a candidate string of intervals, denoted S. A candidate string starts with an interval value determined to be equal to the reference interval (process 1220) and satisfies one of two conditions:
(1) where any interval of the candidate string is different from an interval of a same index of a current pattern string, each of the string intervals, beyond the first interval, have a value distinctly differentiable from the value of the reference interval; or
(2) each interval of the candidate string is determined to be equal to an interval of a same index of a current pattern string—in which case the candidate string is considered to be the sought PRF pattern.

Process 1250 determines congruence, or otherwise, of a candidate string S with pattern string Σ. Initially, pattern string Σ is empty, hence process 1250 determines that strings Σ and S are not congruent and process 1260 is activated.

Process 1260 appends candidate string S to pattern string Σ to produce a current pattern string Σ. The first activation of process 1260 yields a pattern string Σ which is identical to the first candidate string S. With process 1230 continuing indefinitely to receive pulses and determine inter-pulse intervals, process 1240 is revisited to determine a current candidate string S, starting with an interval value deemed to be equal to the reference interval with remaining interval differing from the reference interval. Process 1250 is revisited to compare the current candidate string with the current pattern string.

If the two strings are congruent, the current pattern string Σ is considered to represent the PRF pattern, and process 1270 is activated to communicate string S (or string Σ) to other system components. If the current pattern string Σ and the current candidate string S are not congruent, process 1260 is revisited to append the current candidate string to the current pattern string.

With process 1230 continuing indefinitely to receive pulses and determine inter-pulse intervals, activation of processes 140, 1250, and 1260 continues until a candidate string, S, is captured and found to be congruent to the latest pattern string Σ.

As an example, process 1220 receives two pulses and measures the interval between them to equal "A". The value "A" is used as a reference interval. Process 1230 continually receives pulses and determines respective inter-pulse intervals to be "B, C, D, E, A, F, A, B, G, H, P, G, Q, A, B, C, D, E, A, F, A, B, G, H, P, G, Q", where the individual interval values {A, B, C, D, E, F, G, H, P, Q} are distinctly different. The inter-pulse intervals may be held in a circular buffer to decouple the pulse rate from the latency of processing circuitry.

The iterative procedure of FIG. 5E updates the contents of pattern string Σ and candidate string S until process 1270 is reached. For clarity in tracking the changes of the two strings, the strings are further identified as $\Sigma^{(j)}$ and $S^{(j)}$, where "j" is an iteration index, j, j≤0, being an integer. $\Sigma^{(0)}$, an empty string, is a first pattern string and $S^{(0)}$, is a first candidate string. Process 1260 appends $S^{(j)}$ to $\Sigma^{(j)}$ to produce $\Sigma^{(j+1)}$.

A first visit to process 1240 identifies a first candidate string $S^{(0)}$ as {A, B, C, D, E}. $S^{(0)}$ starts with interval value "A", which equals the reference interval, and contains four other intervals which individually have values differing from the reference interval. Each of the intervals included in $S^{(0)}$ differs from an interval of a same index in $\Sigma^{(0)}$, which, so far, is empty. Thus, interval "A" that follows received interval "E" cannot be included in $S^{(0)}$. $\Sigma^{(0)}$ and $S^{(0)}$ are not congruent leading to a first visit to process 1260 which appends $S^{(0)}$ to $\Sigma^{(0)}$ to produce a second pattern string $\Sigma^{(1)}$ as {A, B, C, D, E}.

Subsequently, a second visit to process 1240 identifies a second candidate string of $S^{(1)}$ as {A, F}. $S^{(1)}$ starts with interval value "A", which equals the reference interval, and contains a second interval that differs from the reference interval. Since interval "F" differs from the second interval, "B", of $\Sigma^{(1)}$, interval "A" that is received following interval "F", cannot be included in $S^{(1)}$. $\Sigma^{(1)}$ and $S^{(1)}$ are not congruent. A second visit to process 1260 appends $S^{(1)}$ to $\Sigma^{(1)}$ to produce a third pattern string $\Sigma^{(2)}$ as {A, B, C, D, E, A, F}.

A third visit to process 1240 identifies a third candidate string of $S^{(2)}$ as {A, B, G, H, P, G, Q}. $S^{(2)}$ starts with interval value "A", which equals the reference interval, and contains six other intervals each of which differing from the reference interval. Interval "G" of $S^{(2)}$ differs from the corresponding interval, "C", of $\Sigma^{(2)}$, hence interval "A", that is received after interval "Q", cannot be included in $S^{(2)}$. $\Sigma^{(2)}$ and $S^{(2)}$ are not congruent. Hence, process 1250 leads to a third visit to process 1260 which appends $S^{(2)}$ to $\Sigma^{(2)}$ to produce a third pattern string $\Sigma^{(3)}$ as {A, B, C, D, E, A, F, A, B, G, H, P, G, Q}.

A fourth visit to process 1240 identifies a fourth candidate string of $S^{(3)}$ as {A, B, C, D, E, A, F, A, B, G, H, P, G, Q}. $S^{(3)}$ starts with interval value "A", which equals the reference interval, and contains thirteen other intervals each of which being equal to an interval of a same index in $\Sigma^{(3)}$. $\Sigma^{(3)}$ and $S^{(3)}$ are congruent. Thus, process 1250 leads to process 1270 which communicates $S^{(3)}$ to other system components as the sought PRF pattern.

The buildup of the pattern string $\Sigma^{(0)}$ to $\Sigma^{(3)}$ is summarized in the Table-II below.

TABLE II

Steps of determining the PRF pattern

| Iteration Index (j) | Pattern string $\Sigma^{(j)}$ | Candidate string $S^{(j)}$ |
|---|---|---|
| 0 | Empty | {A, B, C, D, E} |
| 1 | {A, B, C, D, E}. | {A, F} |
| 2 | {A, B, C, D, E, A, F}. | {A, B, G, H, P, G, Q} |
| 3 | {A, B, C, D, E, A, F, A, B, G, H, P, G, Q}. | {A, B, C, D, E, A, F, A, B, G, H, p, G, Q} |

Figure 5F:
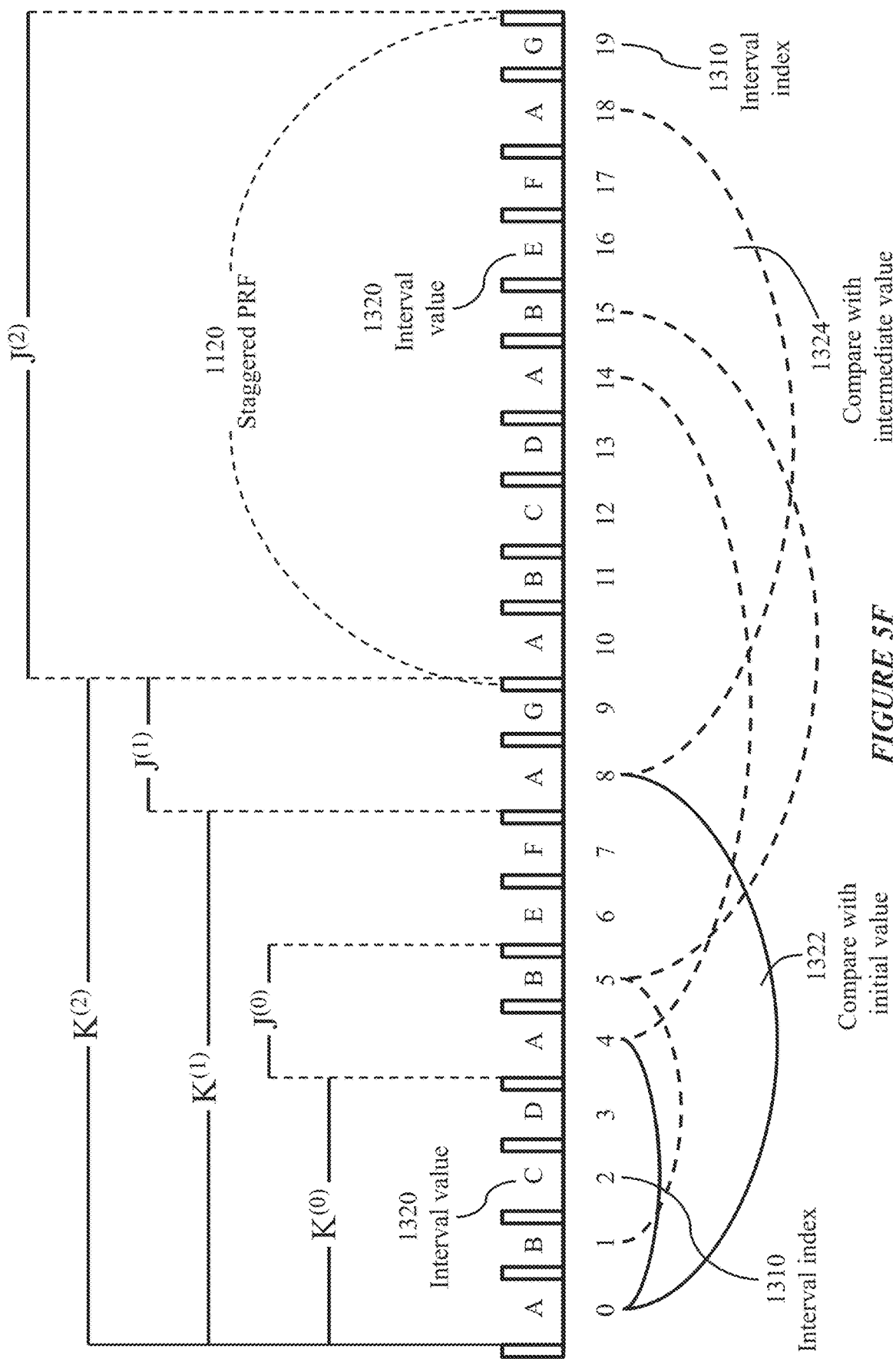
FIG. 5F illustrates an exemplary application of the method of FIG. 5C for identifying a PRF pattern, in accordance with an embodiment of the present invention.

FIG. 5F illustrates the underlying principle of the first method, illustrated in FIG. 5C, of identifying the pattern of a staggered PRF stream. A stream of pulses detected at a receiver have inter-pulse intervals of values:

{A, B, C, D, A, B, E, F, A, G, A, B, C, D, A, B, E, F, A, G, . . . }, where the values A, B, C, D, E, F, and G distinctly different.

A set of intervals identified in a first round of the K-Loop (FIG. 5C) is identified as $K^{(0)}$ to include {A, B, C, D} of indices 0, 1, 2, and 3, respectively. The K-Loop recognizes that the interval "A" of index 4 as a potential beginning of a subsequent cycle of the sought PRF pattern then transfers the pattern-detection process to the J-Loop.

A set of intervals identified in a first round of the J-Loop is identified as $J^{(0)}$ to include the interval "A" of index 4, interval "B" of index 5. The J-Loop determines that interval "E" of index 6 belongs to the sought pattern, then transfers the pattern-detection process to the K-Loop.

A set of intervals identified in a second round of the K-Loop is identified as $K^{(1)}$ which includes $K^{(0)}$, intervals {A, B, E} of indices 4, 5, and 6 transferred from the J-Loop, and interval "F" of index 7. The second round of the K-Loop also captures interval "A" of index 8 and decides that the interval may be a beginning of a subsequent cycle of the sought PRF pattern. Thus, the K-Loop transfers the pattern-search process to the J-Loop.

A set of intervals identified in a second round of the J-Loop is identified as $J^{(1)}$ which includes interval "A" of index 8, transferred from the K-Loop and interval "G" of index 9. The J-Loop recognizes that interval "G" cannot belong to a replica of the so-far accumulated segment of the PRF pattern and returns the pattern-detection process to the K-Loop. Array $\Phi$ now holds a sequence of intervals {A, B, C, D, A, B, E, F, A, G}. Process 1030 of the K-Loop (FIG. 5C) receives a new pulse after a time interval "A" which is placed in array $\Phi$ at index 10 in process 1040. Process 1050 determines that the new interval "A" may be a beginning of a replica of the so-far accumulated sequence {A, B, C, D, A, B, E, F, A, G}.

Thus, the K-Loop transfers the pattern-detection process to the J-Loop, with the count J set to 0 and K*=K, which is then equal to 10. The J-Loop receives a new pulse after a time interval "A" which is equal to $\Phi(0)$, then receives a pulse after a succeeding time interval "B", which equals $\Phi(1)$, and eight pulses after successive time intervals of "C", "D", "A", "B", "E", "F", "A", and "G", which are respectively equal to $\Phi(2)$, $\Phi(3)$, $\Phi(4)$, $\Phi(5)$, $\Phi(6)$, $\Phi(7)$, $\Phi(8)$, and $\Phi(9)$. At this point, the count J in the J-Loop is 9 which equals (K*−1). Process 1080 then leads to process 1090 which identifies the sequence {$\Phi(0)$ to $\Phi(K^*-1)$} as representing the sought PRF pattern. The last round of the J-Loop produces the entire pattern $J^{(2)}$.

It is important to note that both the K-Loop and the J-Loop place successive intervals in a common memory holding array $\Phi$.

Figure 5G:
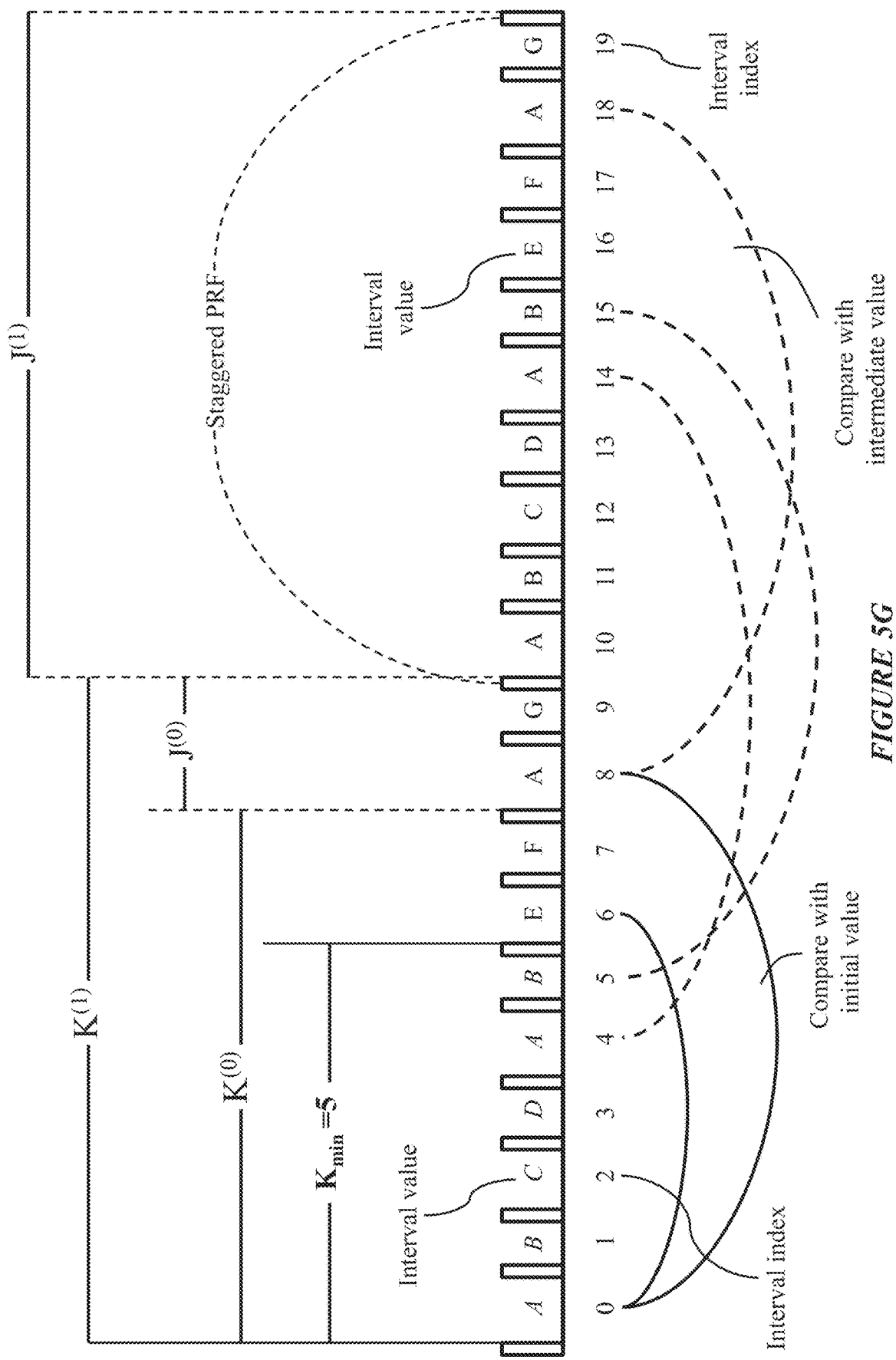
FIG. 5G illustrates an exemplary application of the engine of FIG. 5D for identifying a PRF pattern from the same stream of pulses used in the illustration of FIG. 5C, but with a specified minimum length of the PRF pattern, in accordance with an embodiment of the present invention.

FIG. 5G illustrates an exemplary application of the engine of FIG. 5D for identifying a PRF pattern from the same stream of pulses used in the illustration of FIG. 5C, but with a specified minimum length of the PRF pattern.

As described above, the method of FIG. 5D starts the pattern-detection process with any specified value of a lower bound of the PRF pattern. The sequence of inter-pulse intervals of the PRF pattern are indexed in steps of 1 starting with 0. Thus, the parameter $K_{min}$ is the lower bound minus 1.

With $K_{min}=5$, for example, the inter-pulse intervals {$\Phi(0)$ to $\Phi(5)$}, which are {A, B, C, D, A, B} are considered to be a segment of the sequence of inter-pulse intervals of the entire PRF pattern. A first round of the K-Loop identifies intervals "E", and "F" (of indices 6 and 7) as belonging to the pattern, hence $K^{(0)}$ is {A, B, C, D, A, B, E, F}, and reads interval "A", from the buffer (process 1120), which equals $\Phi(0)$. Process 1160 then transfers execution of the pattern-detection process to the J-Loop which identify interval "G" as belonging to the pattern, then transfer execution of the pattern-detection process to the K-Loop which, in turn transfers execution of the process to the J-Loop after reading interval "A" of index 10. The last round of the J-Loop produces the entire pattern $J^{(1)}$).

Figure 5H:
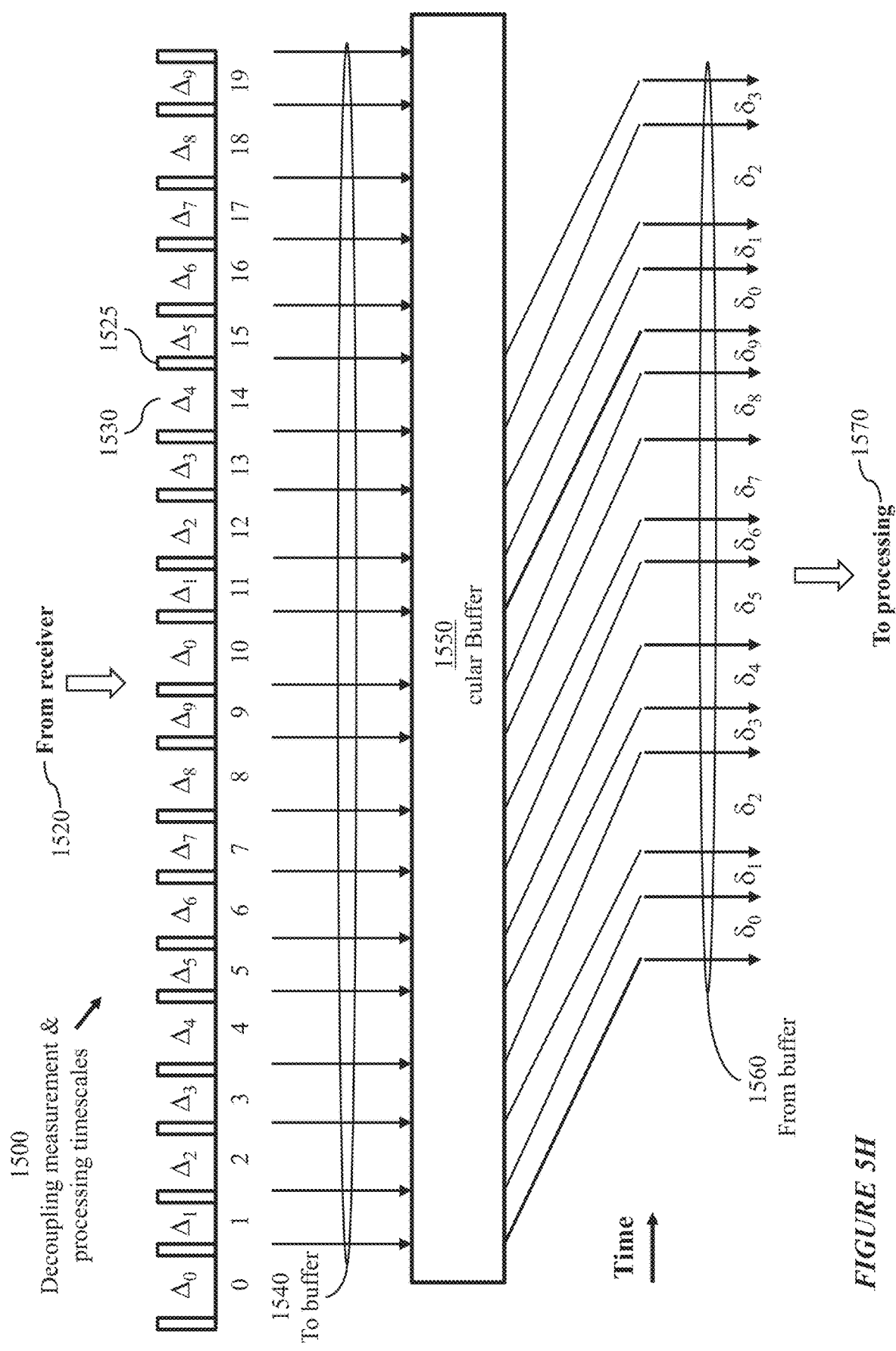
FIG. 5H illustrates a process of decoupling a measurement timescale from a processing time scale, in accordance with an embodiment of the present invention.

FIG. 5H illustrates an arrangement 1500 for decoupling the pulse reception and inter-pulse measurement timescale from the processing timescale. As described above with reference to FIG. 5C, the processes executed following determination of an inter-pulse interval differ according to values of prior intervals. The stream of P2 pulses comprises pulses having different inter-pulse periods. Thus, both the inter-pulse intervals and the requisite inter-pulse processing effort are time varying and generally uncorrelated. Thus, the smallest inter-pulse interval may coincide with the largest requisite processing effort. This suggests decoupling the processes of pulse acquisition and interval calculation from the processes of PRF-pattern buildup emanating from process 1140 (FIG. 5D).

In accordance with an embodiment, process 1130 continually determines inter-pulse intervals and stores same in a (circular) buffer, specifically in array $\Phi$ as described above with reference to FIG. 5D. Process 1140 independently reads individual inter-pulse intervals and for each inter-pulse interval, relevant processes are executed before accessing the (circular) buffer to read a subsequent interval. Overall, the mean interval-processing rate cannot exceed the mean pulse-arrival rate.

As illustrated in FIG. 5H, a stream of pulses 1525 is acquired from a receiver (process 1520) and inter-pulse time intervals 1530 are determined. The inter-pulse time intervals are stored (process 1540) in circular buffer 1550 and read one at a time after performing respective processes (process 1560) and supplied (process 1570) to process 1140 of the engine of FIG. 5D. The inter-pulse time intervals for a recurring PRF pattern, denoted $\Delta_0$ to $\Delta_9$, are time varying and the inter-pulse processing durations, denoted $\delta_0$ to $\delta_9$, are time varying.

Figure 5I:
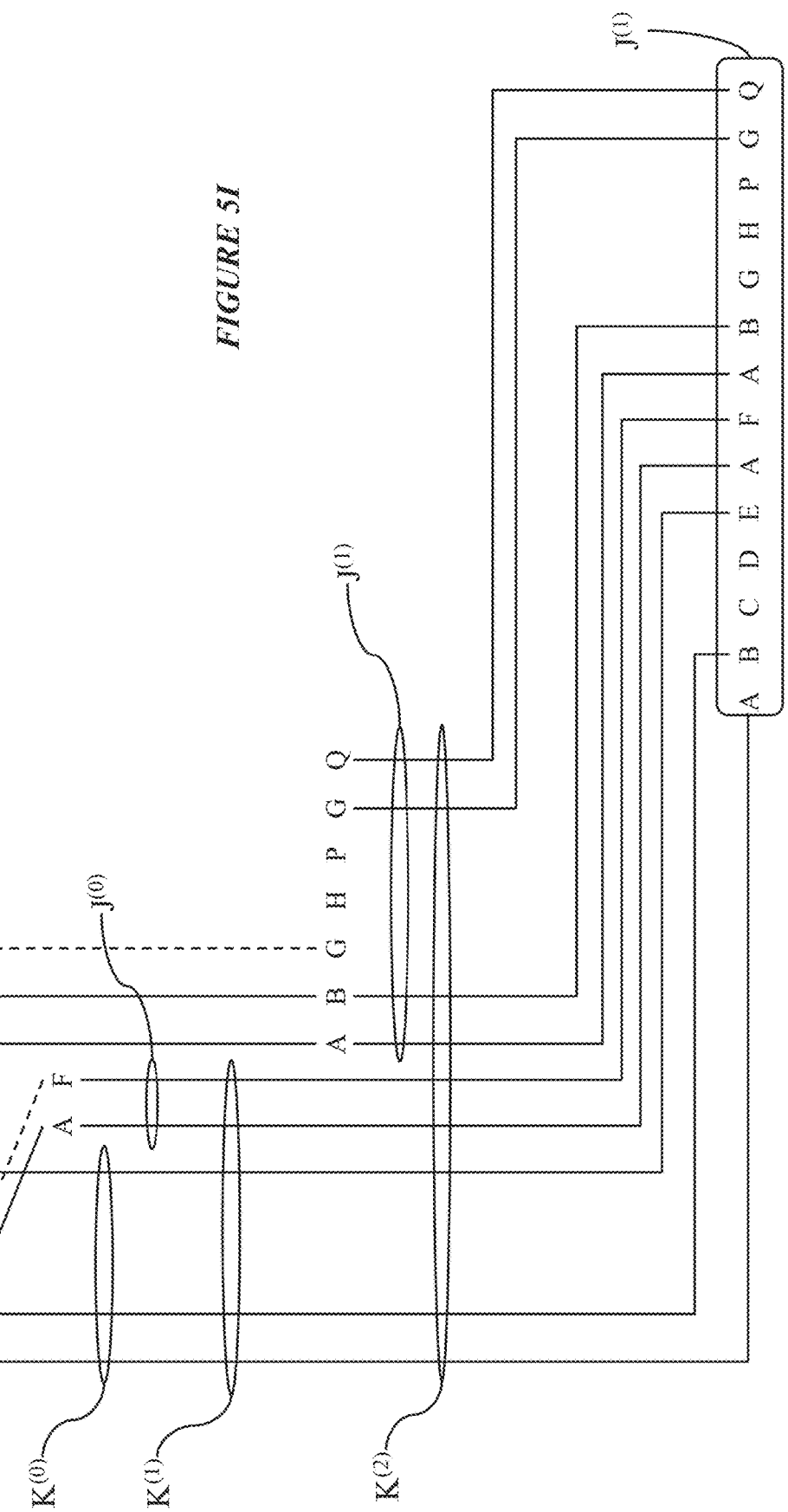
FIG. 5I illustrates phases of determining a PRF pattern for an exemplary sequence of inter-pulse intervals using the method of FIG. 5C.

FIG. 5I illustrates phases of determining a PRF pattern for an exemplary sequence of inter-pulse intervals using the method of FIG. 5C.

FIG. 5J illustrates phases of determining a PRF pattern for the sequence of inter-pulse intervals of FIG. 5I using the method of FIG. 5E.

Figure 5K:
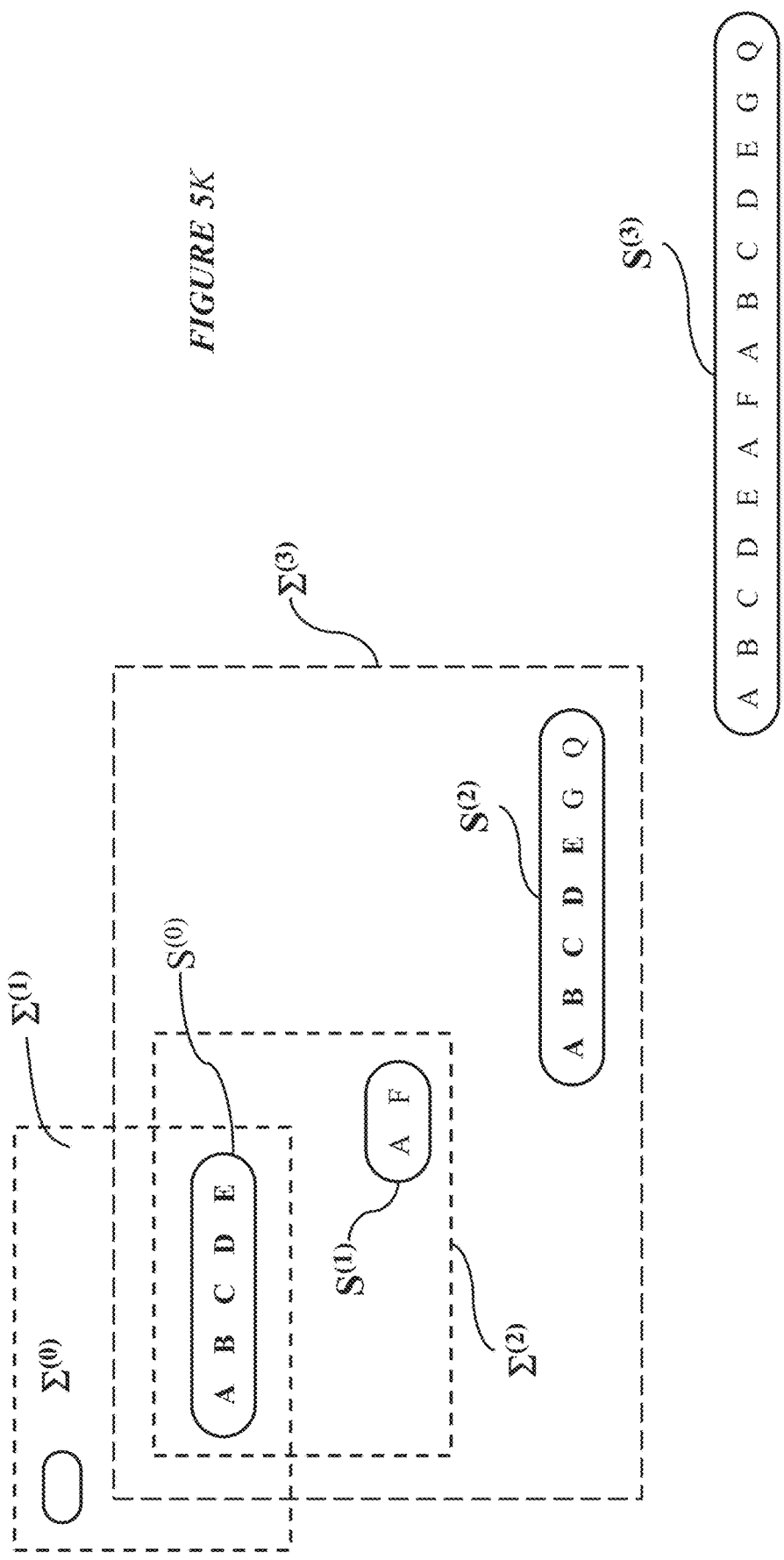
FIG. 5K illustrates phases of determining a PRF pattern for another sequence of inter-pulse intervals of FIG. 5I using the method of FIG. 5E.

FIG. 5K illustrates phases of determining a PRF pattern for another sequence of inter-pulse intervals of FIG. 5I using the method of FIG. 5E.

One embodiment is to increase the accuracy of the time measurement of the leading edge of each pulse. One traditional way of accurate time measurement is to use the GPS time, which generally gives an error of above 50 ns. Even the highly accurate GPS device has an error of about 10 ns, which corresponds to a distance error of 3 m. In some singular cases when the algorithm is very sensitive to the distance measurement, even this 3 m of error can cause a large error in the position calculation. Instead of using GPS, an Analog-to-Digital Converter (ADC) can be used to measure relative time. For example, with a high-speed ADC such as a 1 GS/s ADC, the time accuracy is 1 ns, which is ten times better than a good GPS receiver.

Figure 6A:
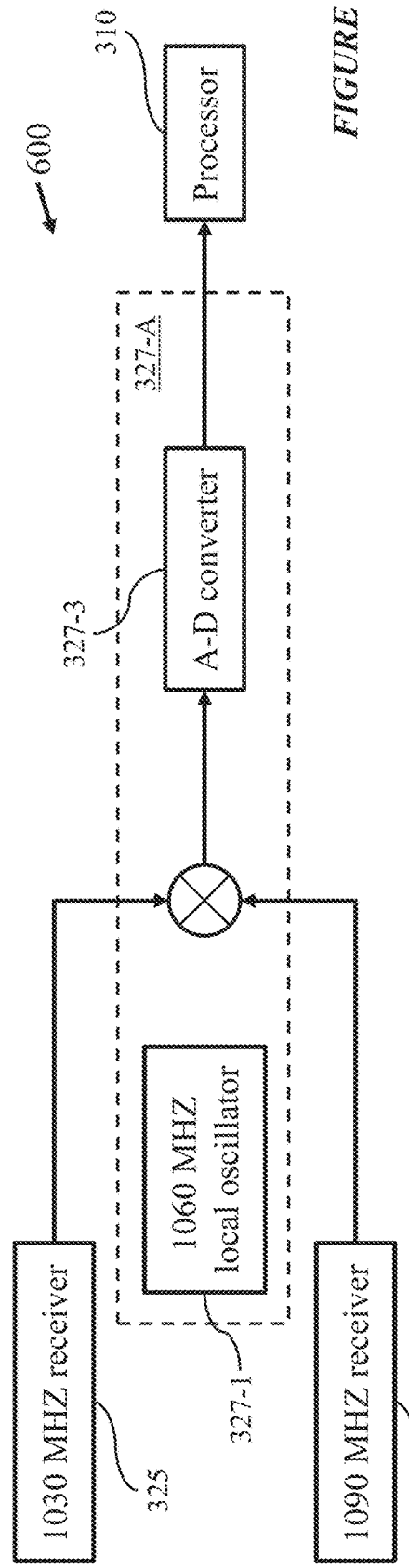
FIGS. 6A and 6B illustrate implementation of a receiver unit for detecting the P2 pulses.
Figure 6B:
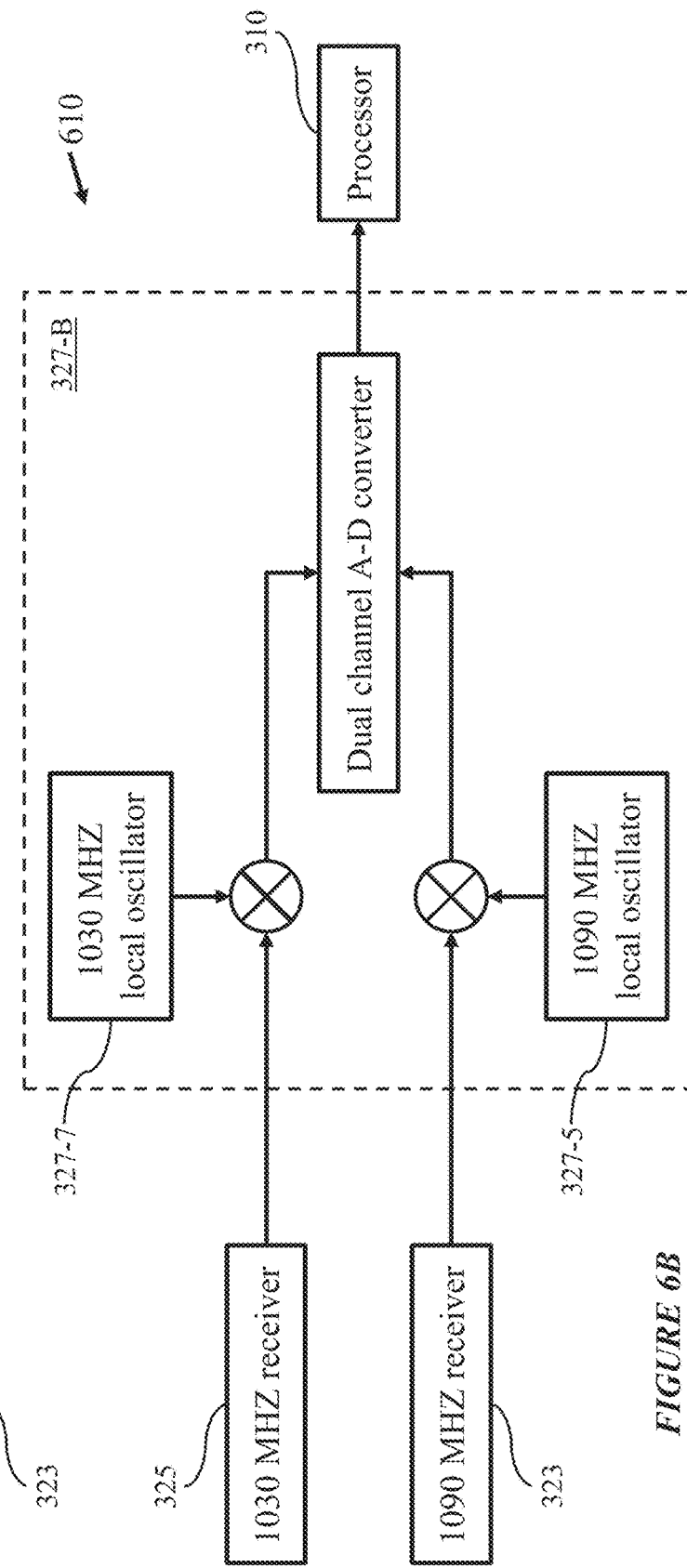

The present invention proposes an improved time measurement strategy that uses a high-speed ADC in the acquisition of the interrogation signals and the reply signals. In one embodiment, the BB/IF processing unit 327 of FIG. 3 includes a high-speed ADC. FIGS. 6A and 6B show different implementations of the BB/IF processing unit 327. In FIG. 6A a single channel high-speed ADC 327-3 is used, while in FIG. 6B a dual channel high-speed ADC 327-3 is used.

As shown in FIG. 6A, the signals from the 1030 MHz receiver 325 and 1090 MHz receiver 323 are mixed in the BB/IF processing unit 327 with a 1060 MHz Local Oscillator 327-1 using a single mixer to generate one channel of intermediate frequency (IF) signal. This signal is then sent to a single channel high-speed ADC 327-3 for A-to-D conversion and the digitized output signal is sent to the processor 310 for further processing as described in FIG. 3.

In FIG. 6B, each of the signals from the 1030 MHz receiver 325 and 1090 MHz receiver 323 is mixed separately in the BB/IF processing unit 327 with a corresponding local oscillator before being fed to a dual channel high-speed ADC 327-9. The signal from the 1030 MHz receiver 325 is mixed with a 1030 MHz Local Oscillator 327-7 in a mixer to generate a first baseband signal. The signal from the 1090 MHz receiver 323 is mixed with a 1090 MHz Local Oscillator 327-5 in a mixer to generate a second baseband signal. The two baseband signals are then sent to a dual channel high-speed ADC 327-9 to generate a digital output signal sent to the processor 310 for further processing as described in FIG. 3. In this embodiment, the two channels in the ADC 327-9 share the same clock keeping the time between the two baseband signals still accurate.

In the embodiments of the present invention, especially when the ownship needs to predict the time instance of a P2 pulse or interrogation when they are not received, depends heavily on the stability of the time of SSR transmission. If the SSR interrogation time changes slowly during time, due to time drift in the electronics of the PSSR, an error will accumulate and propagate so that the predicted/estimated P2 pulse or interrogation time no longer equals the real transmit time of the same P2 pulse/interrogation. In this case, the position calculation of the target object when none of the P1, P2, or P3 pulses is received may be incorrect. Therefore, it is necessary to calibrate the time instance of each of the interrogations in the stagger pattern frequently. The present invention discloses a method for calibrating the time-base using the P2 transmitted from the wide beam antenna of the SSR, which can be done once every several rotations or for every rotation.

The calibration procedure takes several successive P2 pulses or successive interrogations or successive combination of both, to match within the stagger pattern. Once a match is found, the method will compare the predicted time and the real ADC time that those pulses are received, and adjust the predicted time to the real time. The predicted time for other interrogations will also be adjusted by a same amount. To reduce the error of the match and calibration, averaging the real receiving time can be done. Because there are a lot more P2 pulses received in each rotation of the SSR than the P1-P3 pulses, using P2 pulses to calibrate the time drift is more accurate because a statistical process can be done more accurately using more samples, though P1-P3 pulses may be also used if required.

Generally, for faster positioning of the target object 160 after the PSSR 300 is turned on, the first PRF pattern determined according to the method described above will be used for predicting the interrogation transmit time. However, for the time measurement of the P2 pulses, there could be an error compared to the real P2 time. There are two causes for this error. Firstly, the time measurement of the leading edge of the P2 pulse could have several samples deviation. Secondly, the sampling time may not align with the real leading edge of the transmitted P2 pulses.

Therefore, as more P2 pulses are observed, the original PRF pattern calculated is updated statistically. In one embodiment, an exponential filter for better measuring the P2 pulse time is used. As an example, assuming the first time interval in the first determined PRF pattern is $p_1$, the first time interval in the second determined PRF pattern is $p_2$, ..., the first time interval in the nth determined PRF pattern is $p_n$, then the first time interval of the updated PRF pattern used in the algorithm can be calculated as average $p=(p1+p2+ \ldots +pn)/n$.

Alternatively, the first-time interval may be determined as a mean value among p1, p2, ... pn time interval measurements, or as a mean square, or another function of the time interval measurements.

For other time intervals between the adjacent interrogations in the PRF pattern, the same process is performed. This process keeps running at the background as more P2 observed (and hence the same PRF pattern can be determined more times). As the number of observed P2 increases, the filtered PRF pattern will approach the real PRF pattern used by the SSR 110, and hence increase the accuracy of the estimated position of the target object 160. Using P2 for this process can be much easier than only using the MA transmission.

Figure 7:
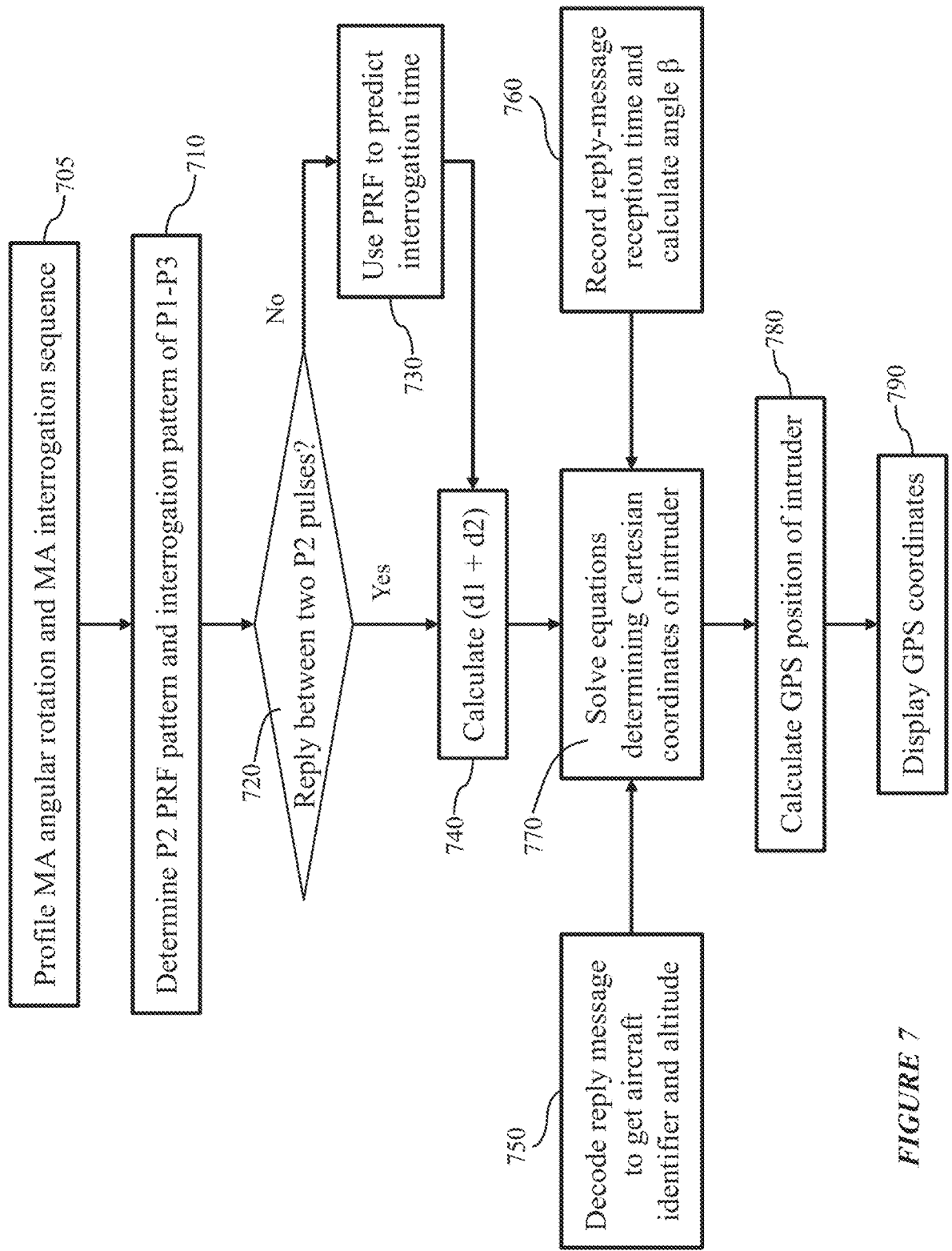
FIG. 7 illustrates an alternative method for determining a position of the target object, in accordance with an embodiment of the present invention.

In one exemplary embodiment, a method for finding the position of a target object such as target object 160 is shown in FIG. 7 based on the PRF pattern and the angular rotation profile of the SSR 110 Main Antenna (MA). The steps of the flowchart of FIG. 7 are described below.

Step 705: profile the Main Antenna Angular or mechanical Rotation based on a plurality of detections of SSR Main antenna signals at the ownship 140 by recording the time t1, t2, t3, ..., every time the ownship 140 is in the MA beam (ownship 140 receives valid interrogation). t2−t1 is the time that MA of SSR 110 rotates 360 degrees with a constant speed. Knowing t1 and angular rotation speed va=360/(t2−t1) degrees/sec, the pointing direction of MA can be calculated at any given time t. Additionally, the angular position may be also calibrated every time the MA illuminates the ownship 110 to prevent rotation drift error. This step also decodes the mode of the successive interrogation messages and determines the interrogation pattern sequence using the P1-P3 pulses or valid interrogation receive in MA.

Step 710: Use signal from wide-beam antenna to determine the PRF pattern of P2. The algorithm for determining the PRF pattern is executed by the processor 310 as stated earlier. After the staggered pattern is determined, the interrogation pattern for all the interrogations in the stagger pattern can be determined using the procedure in FIG. 5B.

Step 720: When a reply message from the target object 160 is received, we first check if it is within between two P2 pulses. Alternatively, the check can be performed based on P1-P3 combination or P1-P2-P3 combination from the MA of the SSR 110. If "yes", calculate d1+d2 (as shown in FIG. 2) in step 740. If "no", use the PRF and interrogation pattern to predict interrogation time in Step 730. If the prediction is correct, the reply message will be in between two estimated interrogation times. Then d1+d2 can still be calculated.

Step 750: Decode the reply message to get the aircraft ID and altitude.

Step 760: At the same time, record the receiving time of the reply message. Because the angular rotation of the MA is profiled, the angle β at which the target object is in the main lobe of MA (main antenna) beam is calculated.

Step 770: Solve the spheroidal equations to obtain the x,y,z coordinates of the target object in local coordinates system.

Step 780: Calculate the GPS position of the target object using local x, y and z coordinates.

Step 790: Input the GPS information into the display of the tracking system 360 and provide alarm to the ownship 140 when needed.

When P2 cannot be received, for example, the ownship 140 is too far from the SSR 110 so that only the main lobe interrogation signal can be received, it is still possible to only use the main lobe interrogation signal to determine the staggered pattern. However, this could take longer time because only part of (normally 5 to 10 interrogations depending on the signal strength) the staggered pattern can be received for each rotation of the SSR MA.

Figure 8:
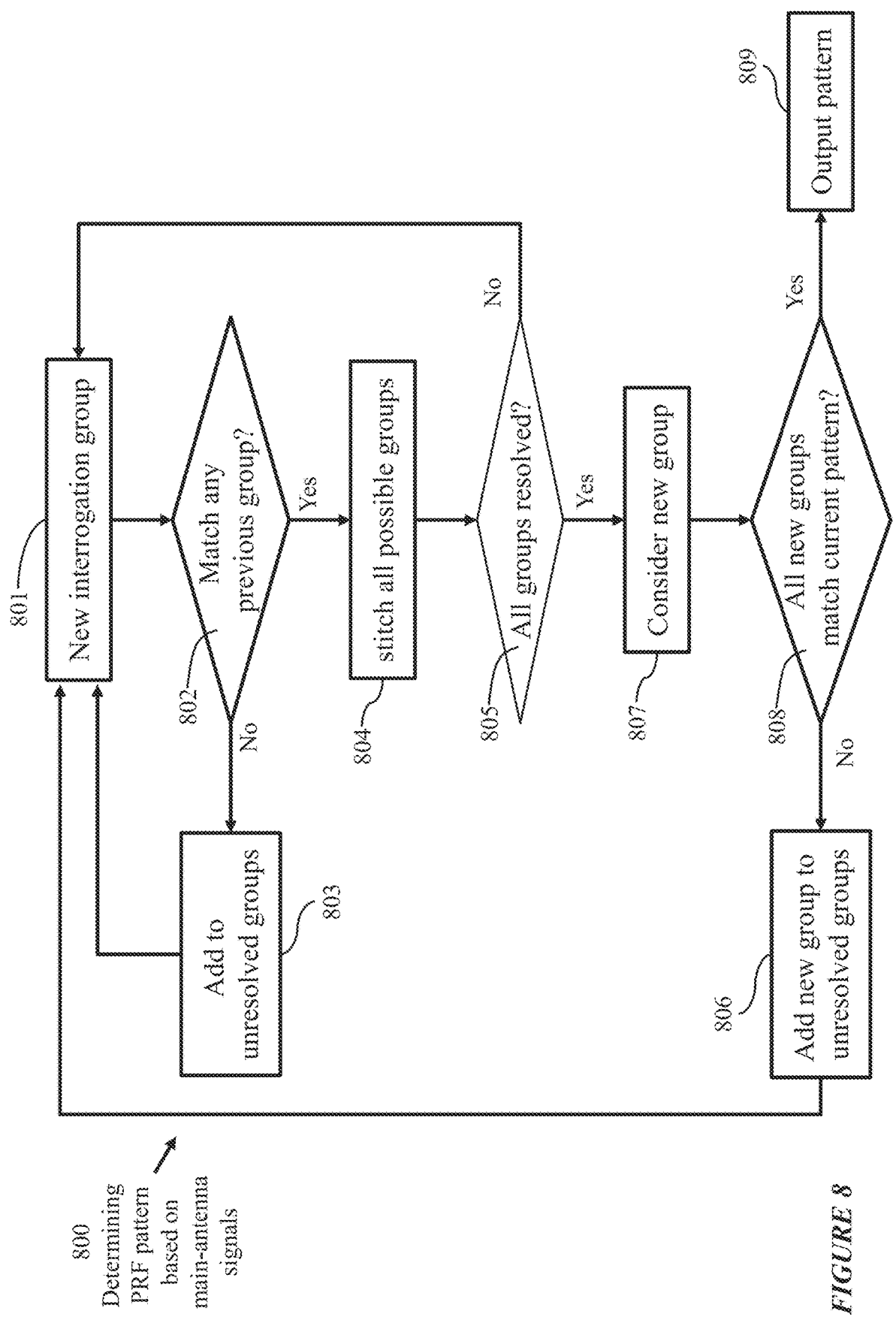
FIG. 8 is a flowchart depicting a method determining the PRF pattern using main antenna signals.

FIG. 8 illustrates a procedure for determining the staggered pattern using only the SSR MA signal. All the received successive MA pulses are treated and stored as a group as shown in block 801. For any new group, the algorithm first checks if any part of the new group, which should be at least 2 successive intervals, matches any part of the previous group (step 802). If there is no match, the algorithm will add the new group to the unresolved groups in step 803 and wait until new group is received. If there is a match, the algorithm will first stitch the new group with the matched group and then go through all the unresolved groups to see if there is any new match in 804 because the new group could bridge two existing unresolved groups. If there are still unresolved groups, all the stitched group will be stored as a longer new unresolved group, and the algorithm goes back to 801 to read new group. This process continues until all the unresolved groups are stitched together, which forms a temporary staggered pattern, and the algorithm goes to step 807. This step reads a new group and tries to match it in the temporary staggered pattern. In step 808, there is a timer that controls how many new matches are considered to be enough. For example, if the algorithm takes time T to form the current temporary staggered pattern, then it could be another nT (n can be 1, 2, 3, . . . ) time in step 808 to be considered. If all the new groups received in this nT interval match the temporary pattern, the algorithm will propose the temporary pattern to be a final staggered pattern (step 809). Once the ownship 140 can receive the wide-beam SLS signal, the algorithm will automatically verify the staggered pattern determined using the P2 pulses train to see if both staggered patterns match.

In another aspect of the invention, when the target object does not have a transponder, the principle of the embodiments of the present invention can still be used to determine a position of the target object 160. In this case, the ownship 140 will listen to the reflection of the interrogation signal from the target object 160. Because when the target object 160 is in the beam of the SSR 110, the energy of the interrogation signal will be reflected from the target object 160 and received by the ownship 140. This receive time gives the same information as the receive time of the reply message, which can be used to calculate $d_1+d_2$ in FIG. 2A together with the staggered and interrogation pattern. The information that is still missing is the altitude of the target object, without which only a 2D positioning is possible. The lack of the altitude information can be compensated by using a phased array receiver so that the angle of arrival (AOA) of the reflection is determined. With the AOA information, the 3D position of the target object can be now determined. The accuracy of the position depends on the accuracy of the AOA measurement, which means a larger array will give better position accuracy.

In another aspect of the invention, a coherent or non-coherent processing can be performed when multiple reflected interrogation signals are received. At any given time period, because of the mechanical rotation of the SSR antenna, the staggered pattern and the interrogation mode pattern are known, the time intervals between all the transmitted interrogations in this time period can be estimated. Therefore, expected time intervals between the reflections of these interrogations are also known. Hence a coherent processing can be done by adding samples separated with these time intervals to improve the signal to noise ratio (SNR). For example, if the expected interrogation time intervals are $t_1$, $t_2$ $t_3$, . . . , then the samples that are $t_1$, $t_2$ $t_3$ . . . from a start point of the received signal will be added together to compete with noise. This start point of the coherent process can be sliding within a reasonable window inside which the first reflected interrogation can arrive. By doing this, the reflected interrogations that are submerged within the noise floor can be enhanced and detected, and so will be the target object.

In a further embodiment, past measurements may be used to make the position of the target object 160 more precise, for example the target object 160 is interrogated every n seconds if SSR 110 rotates at delta rpm, where both the target object 160 and the ownship 140 (observer) are moving.

The teachings of the present disclosure can be applied in various scenarios including 1) whether or not the target object 160, the ownship 140 and the SSR 110 are coplanar; 2) whether or not the target object 160, the ownship 140 and the SSR 110 are co-linear, but not co-altitude; 3) whether or not the target object 160, the ownship 140 and the SSR 110 are co-linear and co-altitude (singularity scenario).

The present PSSR system for target object detection can be used as part of an advisory system to support a decision making during potential collision of a UAV or a manned aircraft.

The present invention can as well be used to predict the target object future trajectory for a certain time look-ahead, and graphical display of current and predicted trajectory in 4D on the display of the ownship 140 and/or a Ground Control Station (GCS) computer. It may further comprise a decision support engine in the situation of high probability of potential collision and use the tracking system 360 for graphical and audio warnings to the pilot. The target object 160 trajectory prediction may be made with a certain time lookahead, where the lookahead time depends on the estimated heading and speed of the target object 160 while approaching the ownship 140. The decision support engine during collision avoidance may use online discrete-event supervisory control based on a predicted TTC (time-to-collision) and a predicted trajectory of the target object 160 for the cases of full detectability and detection singularity that occurs when the ownship 140, and the SSR 110 are co-linear.

Figure 9:
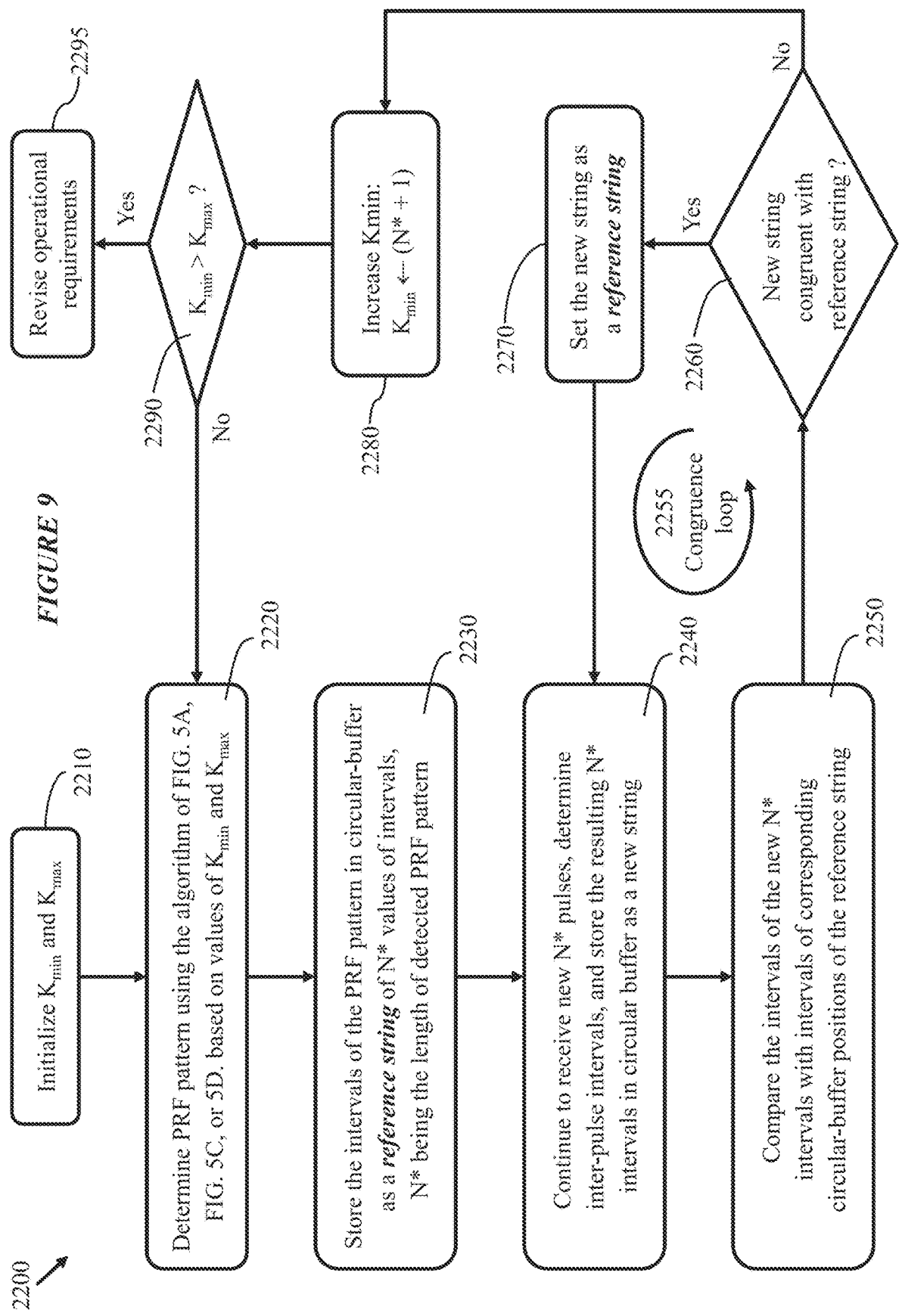
FIG. 9 illustrates a method 2200 of ensuring correctness of detection of the PRF pattern.

FIG. 9 illustrates a method 2200 of ensuring correctness of detection of the PRF pattern. A lower bound, denoted $K_{min}$, and an upper bound, denoted $K_{max}$, of the length o the PRF pattern are initialized in process 2210. Process 2220 detects a PRF pattern using any of the algorithm depicted in FIG. 5A, 5C, 5D, or 5E. The number, N*, of intervals of the detected PRF pattern are stored in a circular buffer and used as a reference string of intervals (process 2230).

Process 2240 continues to receive new pulses and determine new inter-pulse intervals. Process 2250 compares a number, N*, of the new intervals, forming a new string of intervals, with intervals stored in corresponding positions of the reference string stored in the circular buffer.

Process 2260 determines whether the new string of N* intervals is congruent with the reference string of N* intervals.

If congruence is ascertained, process 2270 sets the new string as the reference string and process 2240 is revisited. The loop of processes {2240, 2250, 2260, 2270, 2240}, referenced as the congruence loop 2255, may continue to be activated as long as new pulses are being received if the reference string is the true PRF pattern. Optionally, a count, denoted $\chi$, initiated as zero, of a number of contiguous activations of the loop may be used as a measure of successful acquisition of the PRF pattern. A minimum number, $\chi_{min}$, of contiguous circulations of the congruence loop 2255 may be specified and the latest reference string is considered to be the true PRF pattern when the count x reaches the value of $\chi_{min}$.

If process 2260 determines incongruence of the new string of N* intervals with the reference string, process 2280 increases the value of $K_{min}$: $K_{min} \leftarrow (N^*+1)$. As long as $K_{min}$ does not exceed $K_{max}$, process 2290 leads to process 2220 which restarts computation of a new reference string of intervals. using any of the algorithm depicted in FIG. 5A, 5C, 5D, or 5E, subject to a constraint of a minimum string size equal to the updated $K_{min}$. If the updated value of $K_{min}$ in process 2290 exceeds $K_{max}$, process 2295 starts a process of revising operational constraints that limit the value of $K_{max}$.

Two strings of intervals, of N* intervals each, are considered to be congruent if the absolute value (magnitude) of a difference between intervals of corresponding positions in the two strings is below a first prescribed tolerance level, and the sum of N* absolute values of the differences is below a second prescribed tolerance level.

Figure 10A:
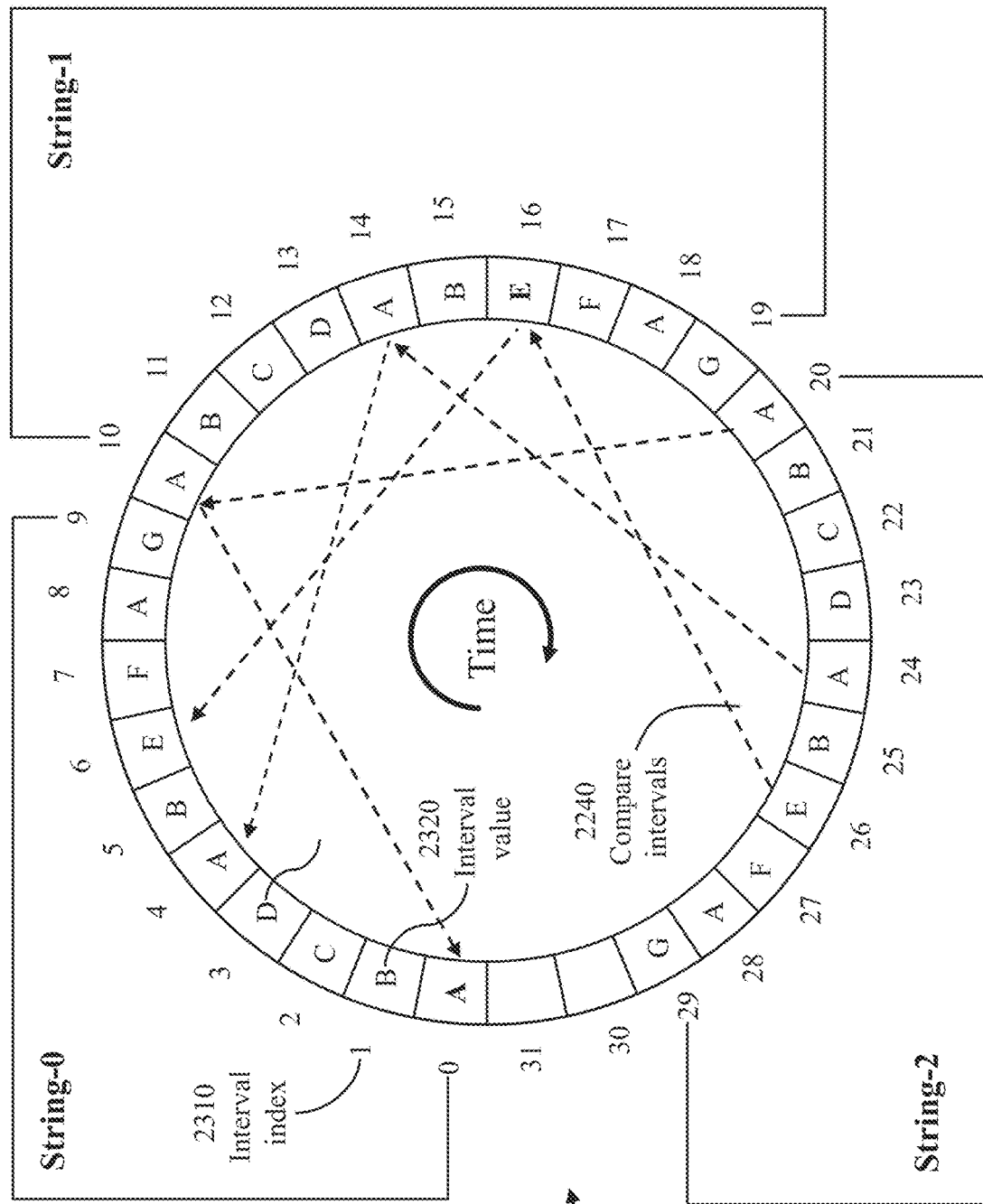
FIGS. 10A to 10E illustrate application of the method of FIG. 9 to exemplary PRF patterns.

FIG. 10A illustrates an implementation of processes 2230, 2240, and 2250 of FIG. 9. Specifying a maximum permissible pattern length $K_{max}$, a memory device 2310, operated as a circular buffer, of a storage capacity sufficient to hold a number, Λ, of records of intervals, at least equal to $2 \times K_{max}$, is used to store a reference string of length N*, $N^* \leq K_{max}$ (process 2230). Consecutive intervals are written in successive memory divisions of the memory 2310 where each new interval overwrites a previously stored interval in a respective memory division.

In the example of FIG. 10A, $K_{max}=16$, but the length, N*, of the cyclic PRF pattern is 10. With $\Lambda=2 \times K_{max}$, the memory divisions are indexed as 0 to 31. After receiving the first (N*+1) pulses and storing the corresponding N* intervals (process 2230), the time of receiving each newly received pulse is used to compute a value of a respective interval and store (overwrite) the value in a respective memory division (process 2240).

As illustrated, N* intervals (N*=10), of values denoted A, B, C, D, A, B, E, F, A, G, are stored in memory divisions 0 to 9 as the reference string (process 2230). Subsequent N* interval values forming a new string, determined in process 2240, are stored in memory divisions 10 to 19. A difference between a value written in a memory division of index μ|modulo κ, $N^* \leq \mu < (2 \times N^*)$ and a value stored in memory division $(\mu - N^*)|$modulo Λ is determined (process 2250) and a sum of absolute values of the differences is determined. If the absolute value of each difference is below a first prescribed tolerance level, and the sum of N* absolute values of the differences is below a second prescribed tolerance level, the reference string and the new string are considered to be congruent.

In the example of FIG. 10A, process 2260 determined that the new string occupying divisions 10 to 19 of the memory is congruent with the reference string occupying divisions 0 to 9. Then process 2270 promoted the new string in memory divisions 10 to 19 to be the reference string. The intervals occupying memory divisions 0 to 9 are now (logically) discarded and may be overwritten (the memory being operated as a circular buffer). The intervals of memory divisions 0 to 9 may, however, be stored for further analysis.

Process 2270 leads to process 2240, to continue executing processes of the congruence loop 2255, with N* new interval values, forming a new string, being written in memory divisions 20 to 29. A difference between a value written in a memory division of index μ|modulo Λ, $2 \times N^* \leq \mu < (3 \times N^*)$ and a value stored in memory division $N^* \leq \mu < (2 \times N^*)$ is determined, and a sum of absolute values of the differences is determined in process 2250.

Process 2260 again determined that the new string occupying memory divisions 20 to 29 is congruent with the reference string occupying divisions 10 to 19. Then process 2270 promoted the new string in memory divisions 20 to 29 to be the reference string. The intervals occupying memory divisions 10 to 19 are (logically) discarded and may be overwritten (the memory being operated as a circular buffer). The intervals of memory divisions 10 to 19 may be stored for further analysis.

Figure 10B:
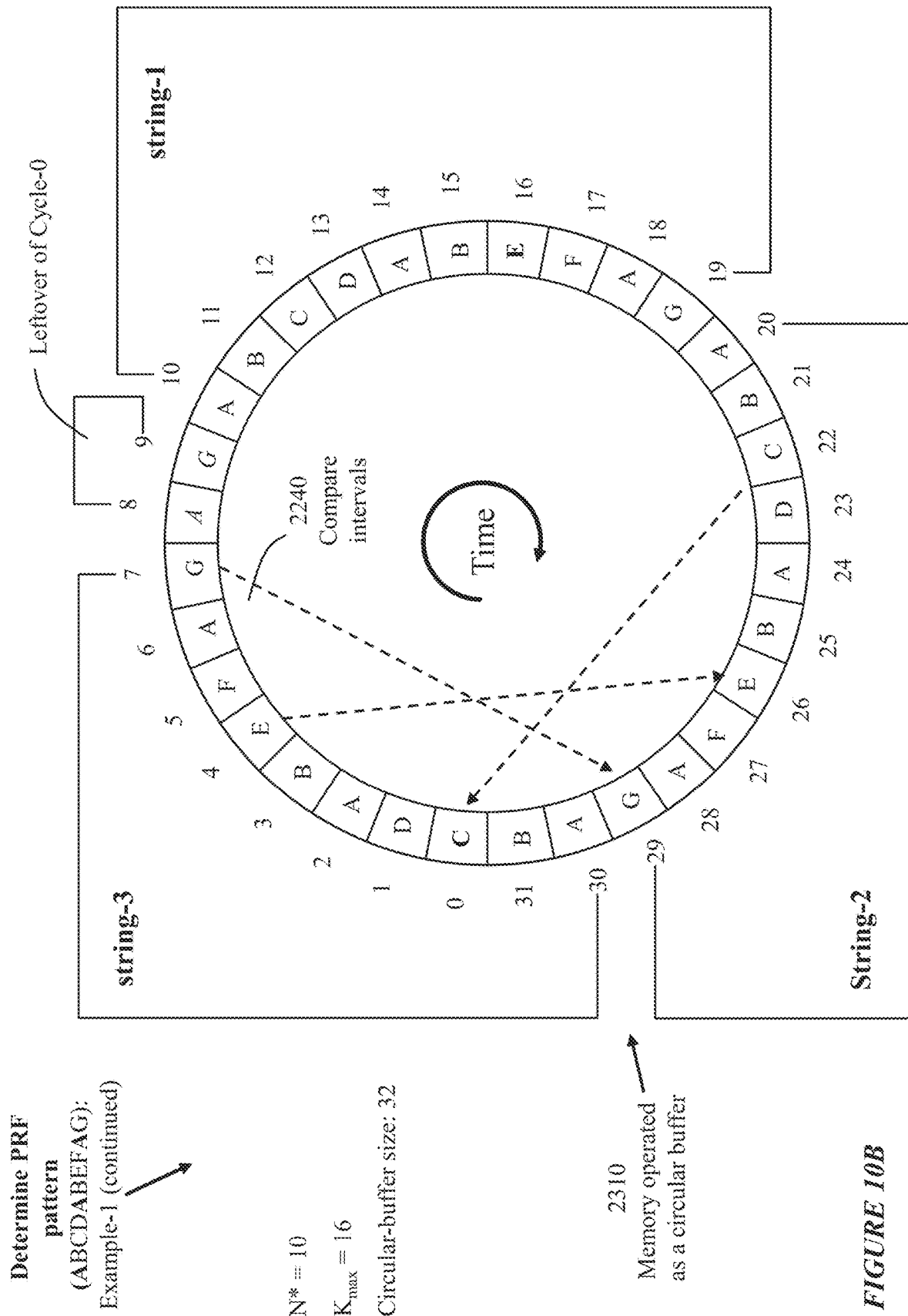

FIG. 10B is a continuation of FIG. 10A where process 2270 leads to process 2240, to continue executing processes of the congruence loop 2255, with N* new interval values, forming a new string, being written in memory divisions 30|modulo Λ to 39|modulo Λ, which are {30, 31, 0, 1, 2, 3, 4, 5, 6, 7} since $\kappa=2 \times K_{max}=32$.

A difference between a value written in a memory division of index μ|modulo Λ, $3 \times N^* \leq \mu < (4 \times N^*)$ and a value stored in memory division $2 \times N^* \leq \mu < (3 \times N^*)$ is determined, and a sum of absolute values of the differences is determined in process 2250.

Process 2260 again determined that the new string occupying memory divisions {30, 31, 0, 1, 2, 3, 4, 5, 6, 7} is congruent with the reference string occupying divisions 20 to 29. Then process 2270 promoted the new string in memory divisions {30, 31, 0, 1, 2, 3, 4, 5, 6, 7} to be the reference string. The intervals occupying memory divisions 20 to 29 are (logically) discarded and may be overwritten (the memory being operated as a circular buffer). The intervals of memory divisions 20 to 29 may be stored for further analysis.

At this point, the congruence loop has been consecutively traversed four times. If the parameter χmin is set to equal four, the congruence loop may be interrupted and the reference string treated as the true PRF pattern.

On the other hand, if the new string and the reference string are not congruent, process 2260 leads to process 228- to increase the lower bound of the length of the PRF pattern and the entire sequence of processes starting with process 2220 are repeated as described with reference to FIG. 9.

Figure 10C:
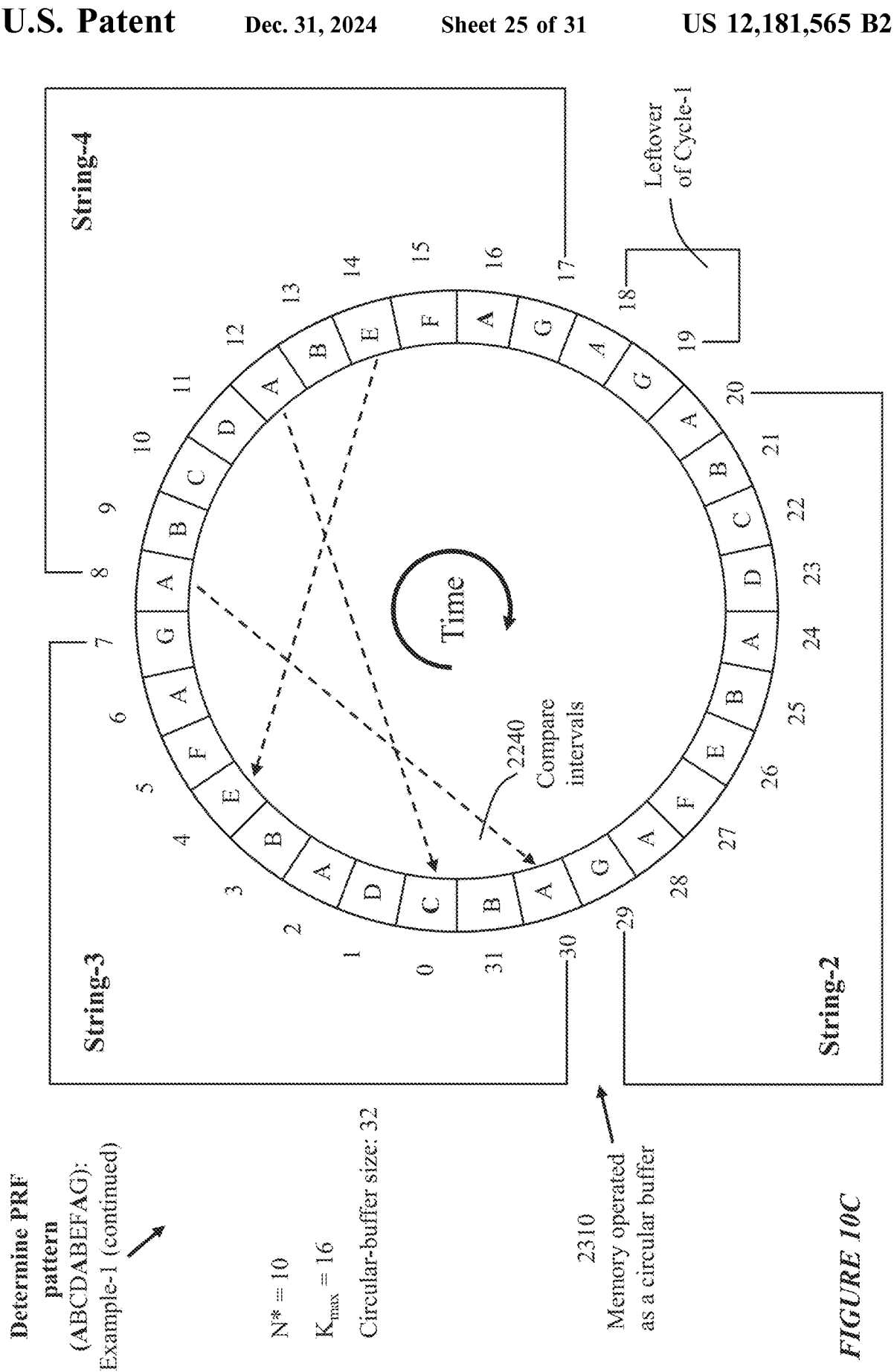

FIG. 10C is a continuation of FIG. 10B, illustrating a further round of the congruence loop 2250.

Figure 10D:
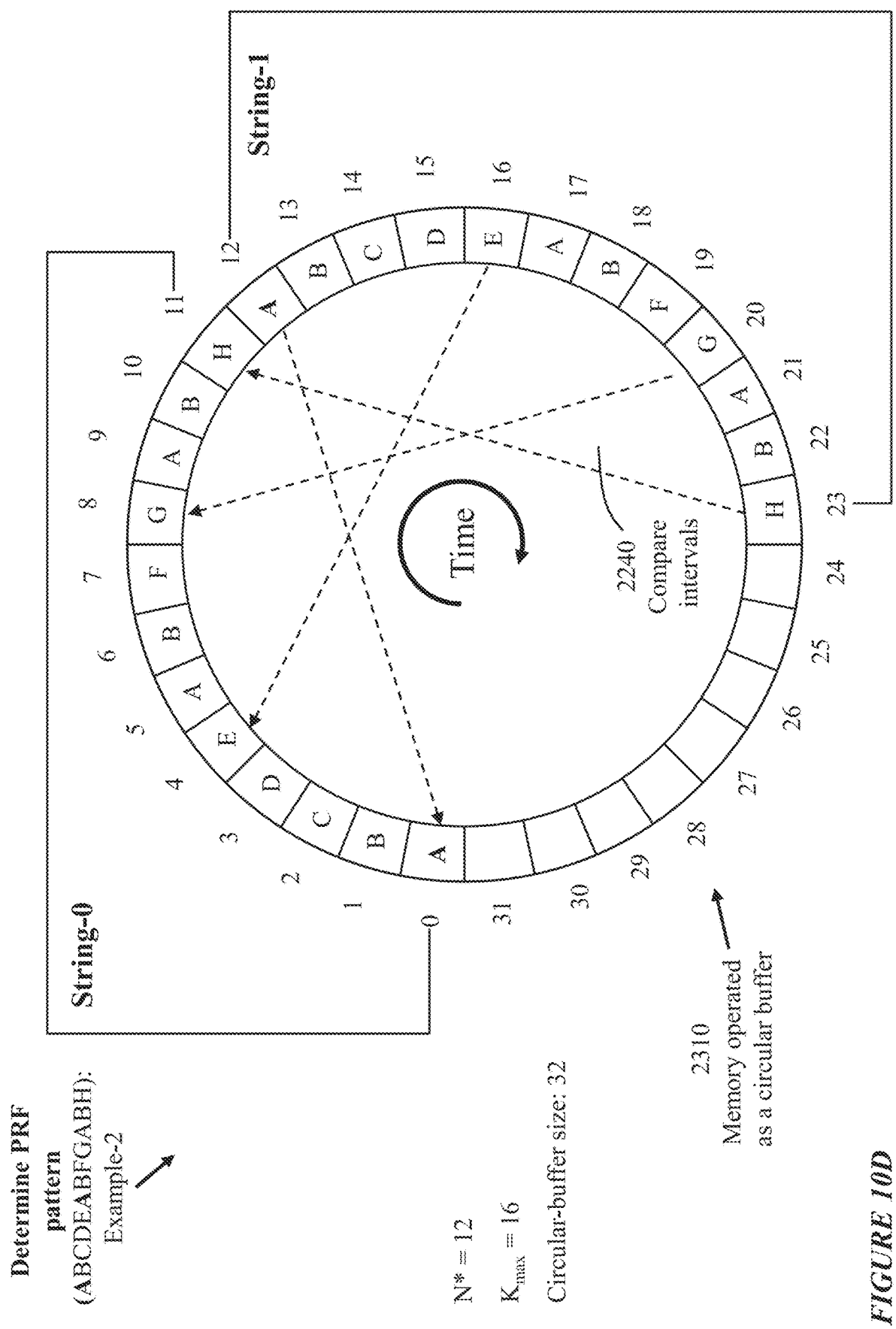

FIG. 10D illustrates two rounds of the congruence loop 2255 for a case where N*=12, using the same memory.

Figure 10E:
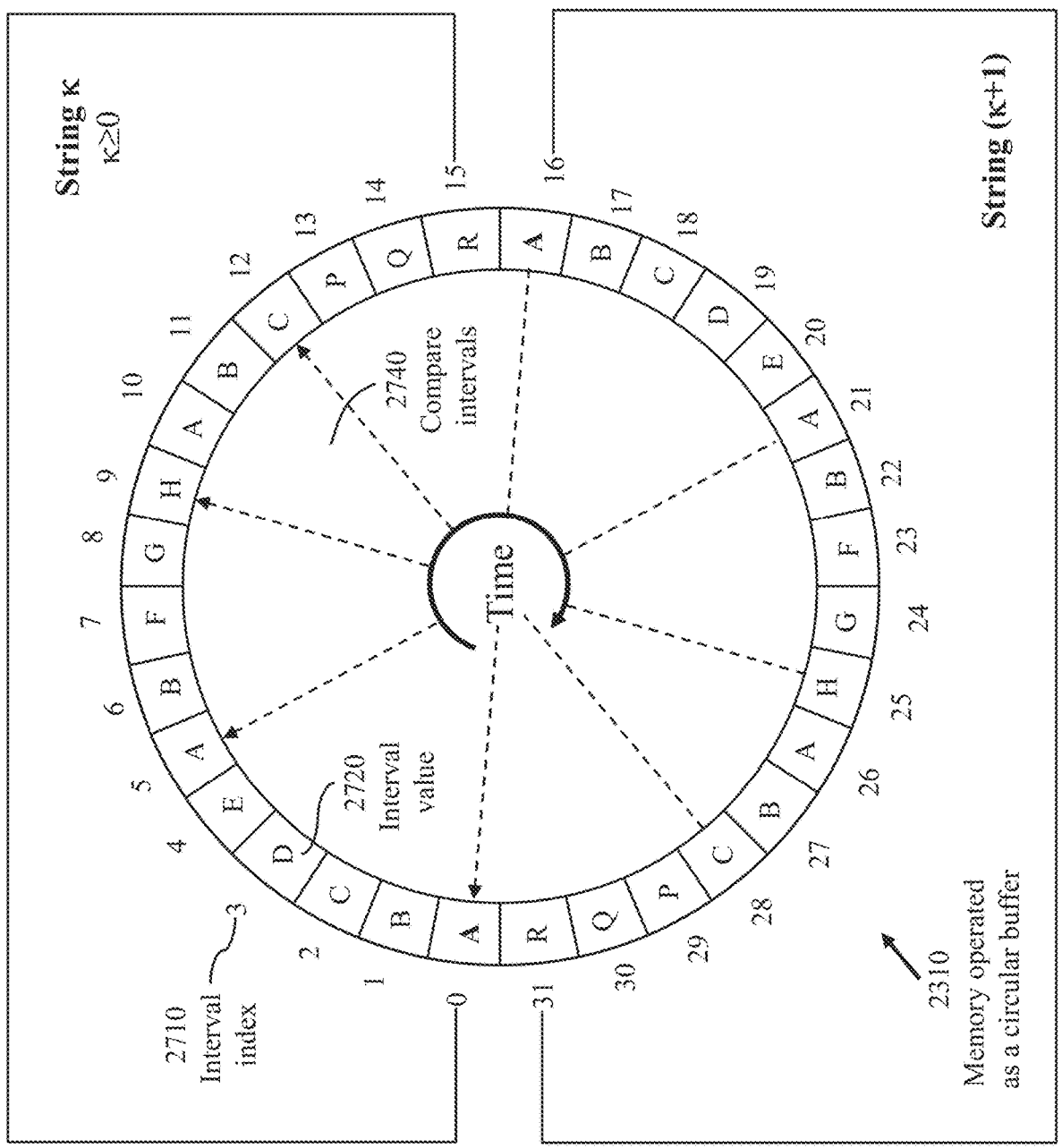

FIG. 10E illustrates two rounds of the congruence loop 2255 for a case where $N^*=K_{max}=16$, using the same memory.

Figure 11:
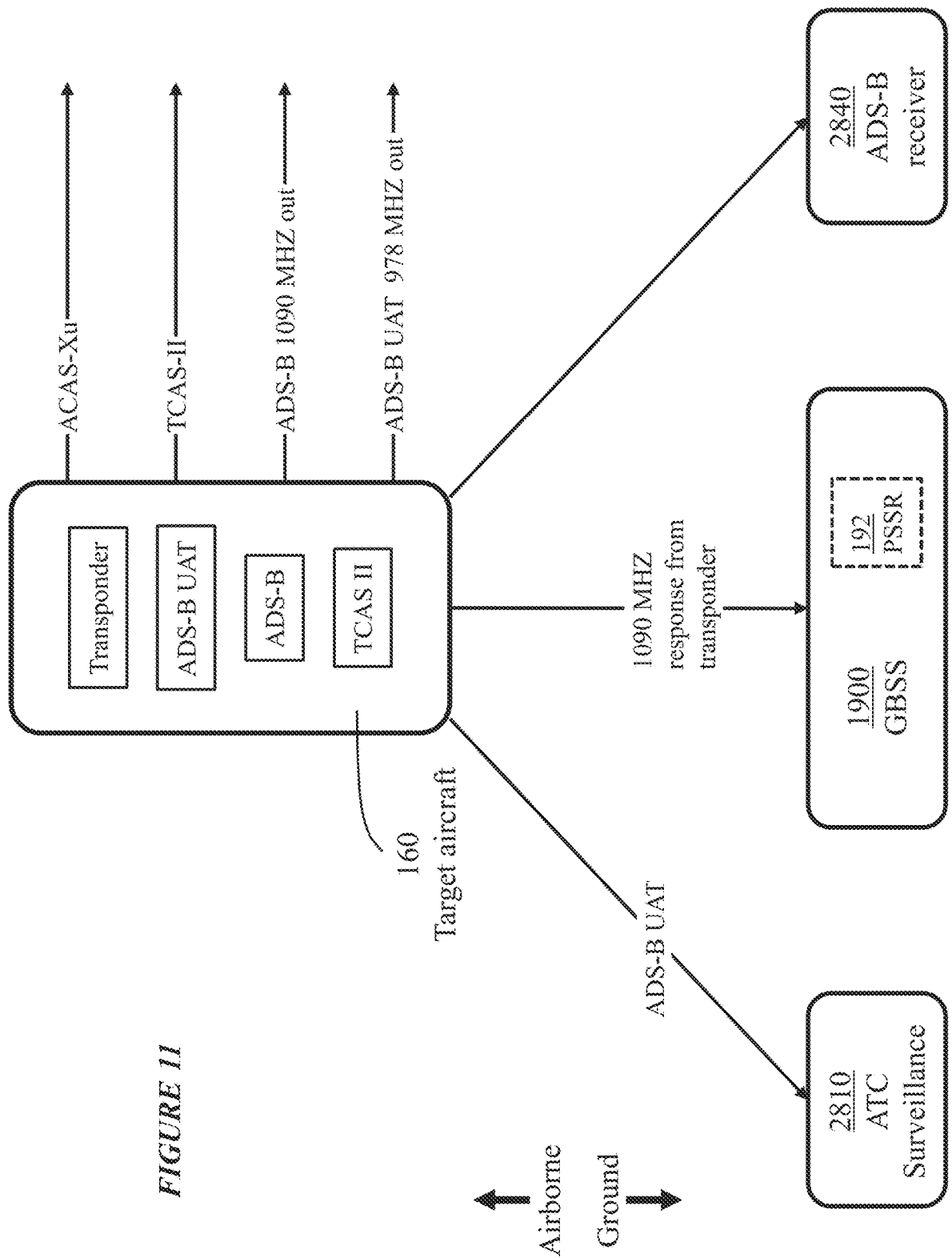
FIG. 11 illustrates DAA components provisioned in a target aircraft and ground installations.

FIG. 11 illustrates DAA components provisioned in a target aircraft and ground installations.

Figure 12:
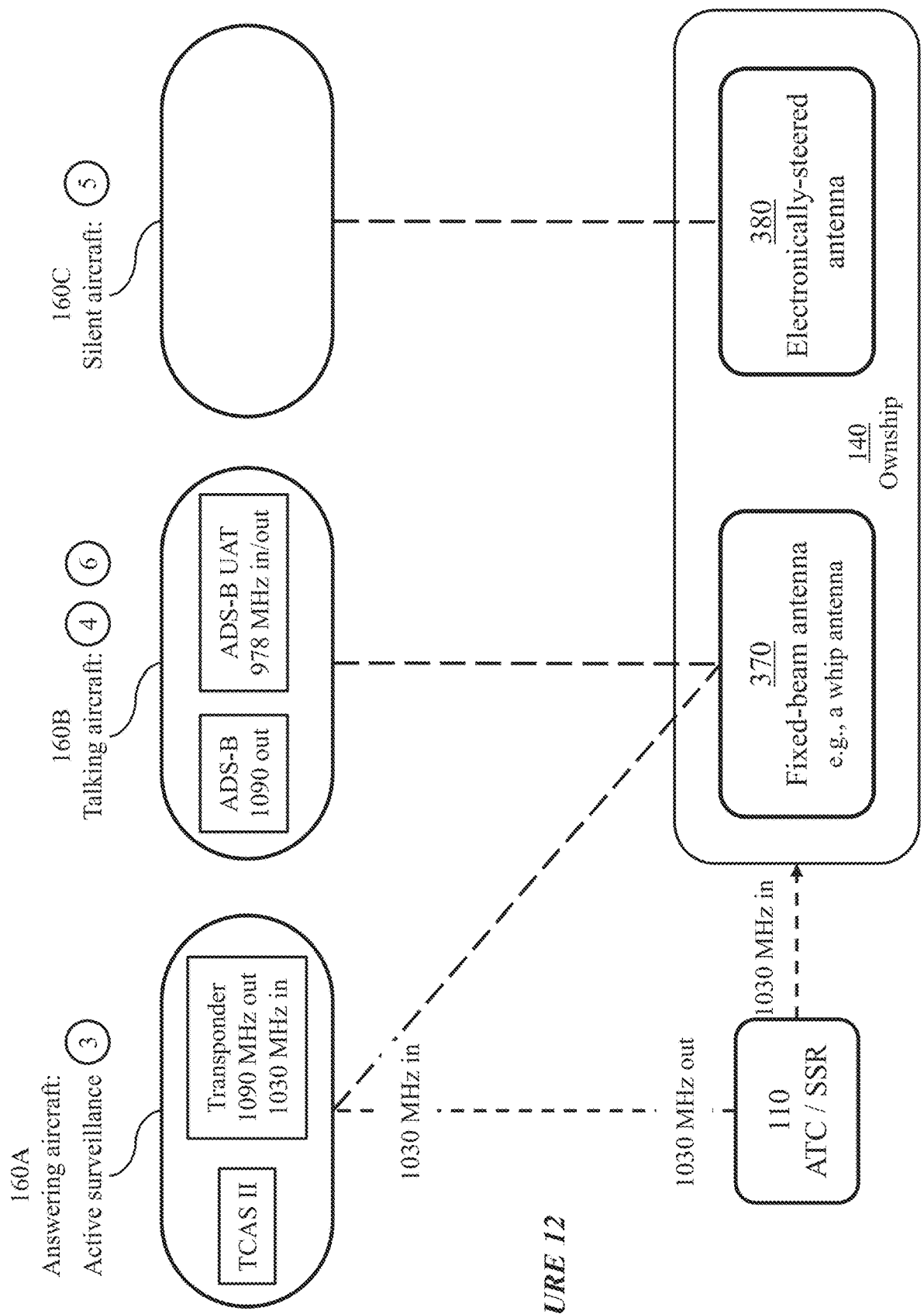
FIG. 12 illustrates communication paths between an ownship and different types of target aircraft.

FIG. 12 illustrates communication paths between an ownship and different types of target aircraft.

Figure 13:
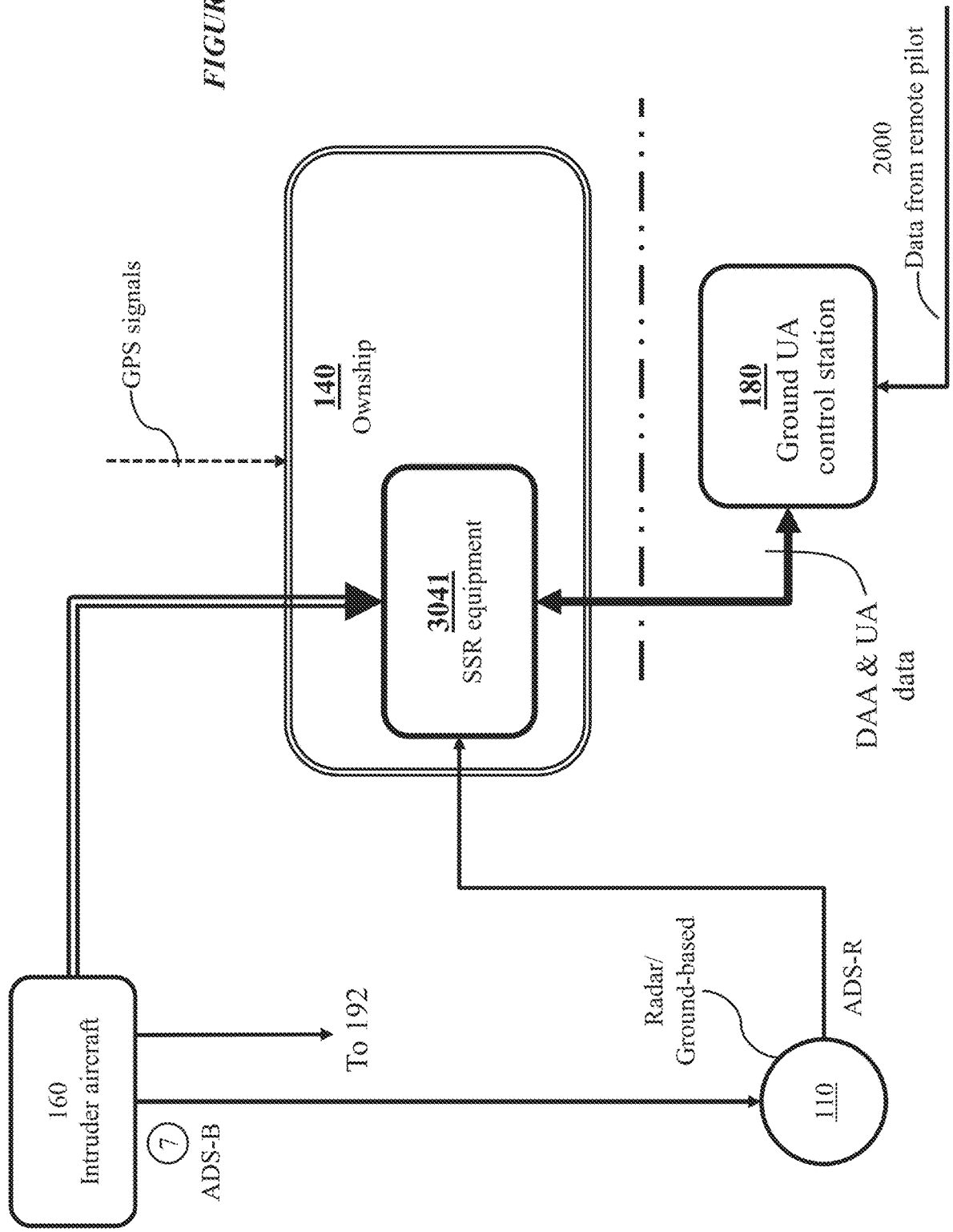
FIG. 13 illustrates communication paths between an ownship, a target aircraft and a UA (Unmanned Aircraft) control station.

FIG. 13 illustrates communication paths between an ownship, a target aircraft and a UA control station.

Figure 14:
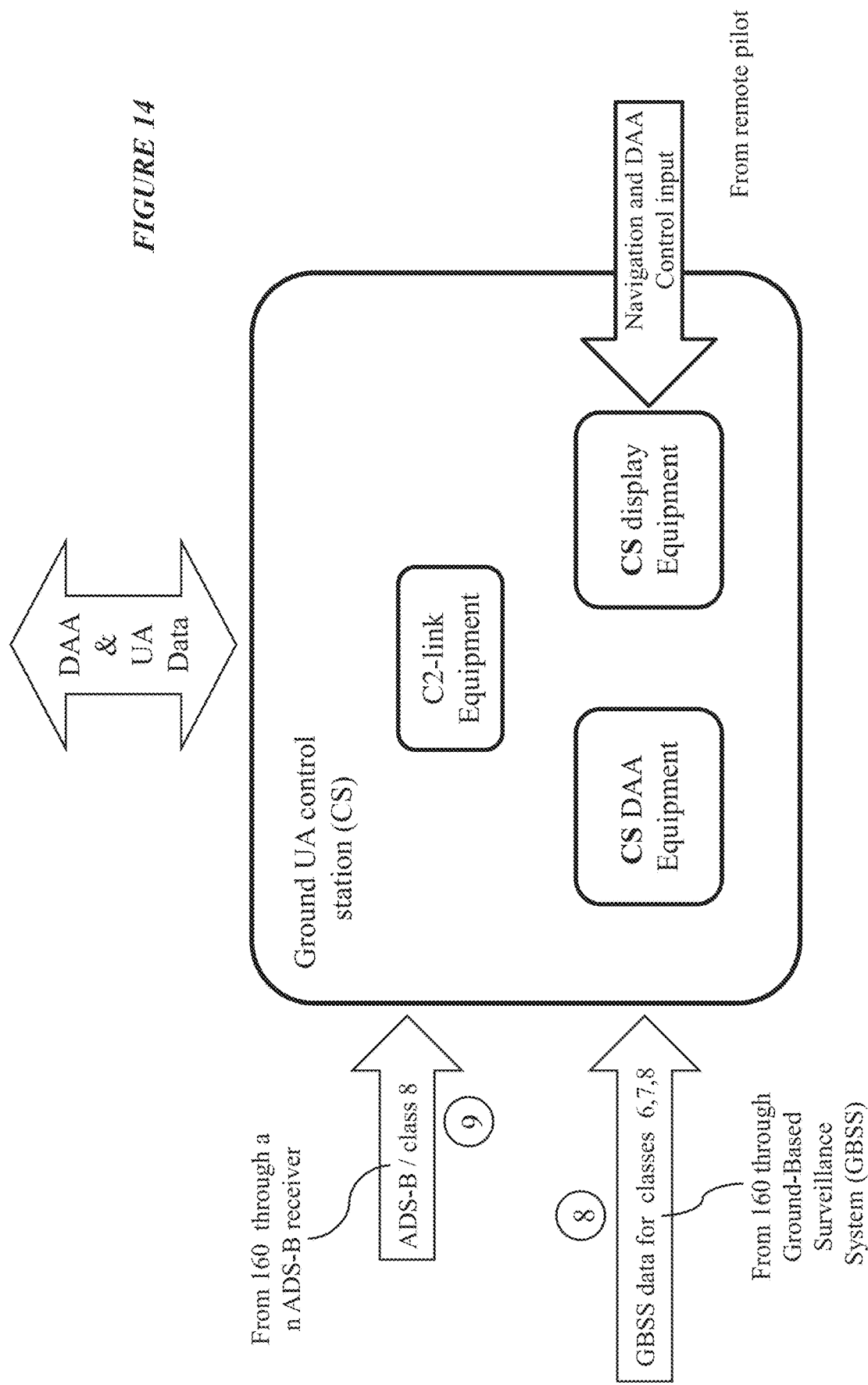
FIG. 14 illustrates components of a ground-based UA control station.

FIG. 14 illustrates components of a ground-based UA control station (or ownship 140 control station).

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. For example, the principles of the invention can be applied to other contexts such as marine or nautical and terrestrial context.

The processes described above, as applied to a social graph of a vast population, are computationally intensive requiring the use of multiple hardware processors. A variety of processors, such as microprocessors, digital signal processors, and gate arrays, may be employed. Generally, processor-readable media are needed and may include floppy disks, hard disks, optical disks, Flash ROMS, non-volatile ROM, and RAM.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Methods and systems of the present invention have tangible and practical advantages, providing more expedient and more reliable processing of vast amounts of data.

Thus, an improved avoid and detect method and system and a method and system for passive secondary surveillance radar tracking have been provided.

What is claimed is:

1. A method for detecting and avoiding a target object, comprising:
   determining a position of the target object, comprising:
   at a Passive Secondary Surveillance Radar (PSSR) spaced apart from a Secondary Surveillance Radar (SSR):
   determining a pulse repetition frequency (PRF) pattern for staggered interrogation pulses (P1, P2, P3) of a Secondary Surveillance Radar (SSR), the P2 and P3 pulses being synchronized to respective P1 pulses with respective first and second predefined time gaps;
   receiving a reply from the target object in response to an interrogation signal comprising a P3 pulse sent by the SSR to said target object;
   estimating a transmit time of said P3 pulse of the interrogation signal based on a reception time of said reply, and the PRF pattern; and
   determining the position of the target object using an altitude information h of the target object contained in said reply, a location of the SSR, said estimated transmit time of said P3 pulse of the interrogation signal, and said reception time of said reply;
   said determining said PRF pattern comprising:
   during a time-window where the PSSR is within range of a wide-beam antenna of the SSR:
   detecting successive P2 pulses;
   forming a time-ordered sequence of intervals separating the successive P2 pulses;
   identifying at least two successive congruent segments of the time-ordered sequence;
   determining a pulse repetition pattern of P2 pulses as one of the segments subject to the constraint that a number of intervals of said one of the segments is within an initial length lower bound and a predefined length upper bound;
   deriving the PRF pattern based on the pulse repetition pattern of P2 pulses and corresponding values of the first and second predefined time gaps;
   and
   controlling the target object so as to avoid the target object.

2. The method of claim 1 further comprising:
   during a time-window where the PSSR is within range of a narrow-beam antenna of the SSR:
   detecting P1 and P3 pulses; and
   determining a value of the second predefined time gap between P3 and P1 pulses, thereby determining an interrogation mode of the SSR.

3. The method of claim 1 wherein said forming comprises:
   initializing an array of said intervals and
   initializing a first pointer of said array.

4. The method of claim 1 wherein said identifying comprises:
   finding a primary string of adjoining intervals, of said time-ordered sequence, in which a first interval is distinct from any other interval with a last interval preceding an interval that equals said first interval;
   examining a candidate string of adjoining intervals of maximum congruence to said first string, following said last interval; and
   subject to a determination that said candidate string is fully congruent with said first string, determining said first string as said PRF pattern.

5. The method of claim 4 further comprising, subject to a determination that said candidate string is not fully congruent with said first string:
   appending said candidate string to said primary string; and
   updating said last interval to be the end interval of the candidate string.

6. The method of claim 4 further comprising continually storing said primary string and said candidate string in said array.

7. The method of claim 4 further comprising terminating said determining of the PRF pattern subject to a determination that at least one of said primary string and candidate string comprises a number of intervals exceeding said predefined length upper bound.

8. The method of claim 1 further comprising:
   using said pulse repetition pattern of P2 pulses as a reference string, and a number of intervals of the reference string as a reference length;
   continuing to receive P2 pulses;
   forming consecutive strings of intervals between successive pulses, each consecutive string comprising a number of intervals equal to the reference length;
   determining a number of consecutive strings that are congruent with the reference string; and
   subject to a determination that said number of consecutive strings at least equals a predefined congruence lower bound, ascertaining correctness of detected pattern.

9. The method of claim 8 further comprising, subject to a determination that said number of consecutive strings is less than said congruence lower bound:
   resetting said initial length lower bound to a higher value not exceeding said predefined length upper bound; and
   repeating said determining said PRF pattern.

10. The method of claim 8 wherein said determining a number of consecutive strings that are congruent comprises sequentially determining congruence of two successive strings, starting with said reference string.

11. The method of claim 10 wherein said determining congruence comprises:
    determining a respective absolute value of a difference between each interval of one of the strings and an interval of a corresponding positions of the other string; and
    ascertaining congruence subject to a determination that said respective absolute value is below a first prescribed tolerance level.

12. A detect-and-avoid system for an ownship aircraft comprising:
    a control station in communication with an ownship aircraft for controlling the ownship air-craft;
    at the ownship aircraft, a Passive Secondary Surveillance Radar (PSSR) system in communication with the control station, the PSSR comprising:
        a first receiver for receiving a reply from a target object wherein said reply is responsive to an interrogation signal comprising P1 and P3 pulses sent by a narrow-beam antenna of a Secondary Surveillance Radar (SSR) to said target object;
        a second receiver for receiving a stream of P2 pulses from the SSR, said P2 pulses being transmitted in a staggered pattern by a wide-beam antenna of the SSR;
        a first processor coupled to said first receiver and said second receiver,
        a second processor for executing instructions to:
            determine a pulse repetition frequency (PRF) pattern for staggered interrogation pulses (P1, P2, P3) of the SSR, the P2 and P3 pulses being synchronized to respective P1 pulses with respective first and second predefined time gaps;
            estimate a transmit time of said interrogation signal based on a reception time of said reply, and the PRF pattern;
            determine the position of the target object based on an altitude information of the target object provided in said reply, a location of the SSR, said transmit time of said interrogation signal, and said reception time of said reply; and
            during a time-window where the PSSR is within range of the wide-beam antenna:
                detect successive P2 pulses;
                form a time-ordered sequence of intervals separating the successive P2 pulses;
                identify at least two successive congruent segments of the time-ordered sequence; and
                determine a pulse repetition pattern of P2 pulses as one of the segments subject to the constraint that a number of intervals of said one of the segments is within predefined lower and upper bounds.

13. The detect-and-avoid system of claim 12 wherein said instructions further cause the second processor to:
    during a time-window where the PSSR is within range of the narrow-beam antenna:
        detect P1 and P3 pulses; and
        determine a value of the second predefined time gap between P3 and P1 pulses, thereby determining an interrogation mode of the SSR; and
        derive the PRF pattern based on the pulse repetition pattern of P2 pulses and corresponding values of the first and second predefined time gaps.

14. The detect-and-avoid system of claim 12 wherein:
    the first processor continually determines inter-pulse intervals and stores the intervals in a buffer; and
    the second processor independently reads individual inter-pulse intervals and executes said instructions,
    thereby decoupling pulse acquisition and inter-pulse measurement timescale from processing timescale.

15. The detect-and-avoid system of claim 12 wherein said second processor is configured to ensure that a mean execution time per interval does not exceed a mean inter-pulse interval.

16. The detect-and-avoid system of claim 12 further comprising ground-based PSSR equipment installed within a ground-based surveillance system, said PSSR equipment being communicatively coupled to respective interface equipment within said control station.

17. The detect-and-avoid system of claim 14 further comprising a comparator unit communicatively coupled to said respective interface, the comparator unit comprising a respective processor configured to:
    receive data relevant to safety of the ownship generated at the PSSR system of the ownship;
    receive data relevant to safety of the ownship generated at the ground-based PSSR equipment;
    perform comparative data analysis to enhance safety measures.

18. The detect-and-avoid system of claim 12 wherein said instructions further cause the second processor to:
    during a time-window where the PSSR is within range of the narrow-beam antenna:
        initialize an array of said intervals; and
        initialize a first pointer of said array.

19. The detect-and-avoid system of claim 12 wherein said instructions to identify further cause the second processor to:
    during a time-window where the PSSR is within range of the narrow-beam antenna:
        find a primary string of adjoining intervals, of said time-ordered sequence, in which a first interval is distinct from any other interval with a last interval preceding an interval that equals said first interval;
        examine a candidate string of adjoining intervals of maximum congruence to said first string, following said last interval; and
        subject to a determination that said candidate string is fully congruent with said first string, determining said first string as said PRF pattern.

20. The detect-and-avoid system of claim 12 wherein said instructions further cause the second processor to:
    during a time-window where the PSSR is within range of the narrow-beam antenna:
        use said pulse repetition pattern of P2 pulses as a reference string, and a number of intervals of the reference string as a reference length;
        continue to receive P2 pulses;
        form consecutive strings of intervals between successive pulses, each consecutive string comprising a number of intervals equal to the reference length;
        determine a number of consecutive strings that are congruent with the reference string; and
    subject to a determination that said number of consecutive strings at least equals a predefined congruence lower bound, ascertaining correctness of detected pattern.

* * * * *